United States Patent
Cole et al.

(10) Patent No.: US 12,215,223 B2
(45) Date of Patent: Feb. 4, 2025

(54) CRYSTALLIZABLE RESINS

(71) Applicant: Align Technology, Inc., San Jose, CA (US)

(72) Inventors: Michael Christopher Cole, San Jose, CA (US); Jennifer Chavez, Fremont, CA (US)

(73) Assignee: Align Technology, Inc., San Jose, CA (US)

( * ) Notice: Subject to any disclaimer, the term of this patent is extended or adjusted under 35 U.S.C. 154(b) by 432 days.

(21) Appl. No.: 17/083,641

(22) Filed: Oct. 29, 2020

(65) Prior Publication Data
US 2021/0147672 A1 May 20, 2021

Related U.S. Application Data

(60) Provisional application No. 63/073,301, filed on Sep. 1, 2020, provisional application No. 62/928,865, filed on Oct. 31, 2019.

(51) Int. Cl.
*C08L 67/04* (2006.01)
*A61C 7/08* (2006.01)
(Continued)

(52) U.S. Cl.
CPC .............. *C08L 67/04* (2013.01); *A61C 7/08* (2013.01); *A61C 7/10* (2013.01); *B33Y 70/00* (2014.12); *B33Y 80/00* (2014.12); *C08F 299/024* (2013.01); *C08L 67/02* (2013.01); *A61C 2201/00* (2013.01); *C08L 2205/22* (2013.01); *C08L 2207/02* (2013.01)

(58) Field of Classification Search
None
See application file for complete search history.

(56) References Cited

U.S. PATENT DOCUMENTS 2,467,432 A   4/1949   Kesling
3,113,907 A   12/1963  Tacker
(Continued)

FOREIGN PATENT DOCUMENTS

AU    3031677 A    5/1979
AU    517102 B2    7/1981
(Continued)

OTHER PUBLICATIONS

Gibson et al., "Sheet Lamination Processes," Additive Manufacturing Technologies, 2010, vol. 238, pp. 223-252.
(Continued)

*Primary Examiner* — Sanza L. McClendon
(74) *Attorney, Agent, or Firm* — Seed IP Law Group LLP

(57) ABSTRACT

This disclosure provides polymeric materials comprising polymer crystals, methods and resins for making the same, and objects and appliances made from said polymeric materials. Polymeric materials having polymer crystals provide favorable properties, such as enhanced durability and rigidity. This disclosure also provides polymeric materials comprising a crystalline phase comprising at least one polymer crystal, as well as an amorphous phase comprising at least one amorphous polymer. The crystalline phase can confer rigidity to the polymeric material, while the amorphous phase can confer elasticity and flexibility.

35 Claims, 7 Drawing Sheets

(51) Int. Cl.
*A61C 7/10* (2006.01)
*B33Y 70/00* (2020.01)
*B33Y 80/00* (2015.01)
*C08F 299/02* (2006.01)
*C08L 67/02* (2006.01)

(56) References Cited

U.S. PATENT DOCUMENTS

| | | |
|---|---|---|
| 3,407,500 A | 10/1968 | Kesling |
| 3,600,808 A | 8/1971 | Reeve et al. |
| 3,660,900 A | 5/1972 | Andrews et al. |
| 3,683,502 A | 8/1972 | Wallshein et al. |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling et al. |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut et al. |
| 4,500,294 A | 2/1985 | Lewis et al. |
| 4,504,225 A | 3/1985 | Yoshii |
| 4,505,673 A | 3/1985 | Yoshii et al. |
| 4,526,540 A | 7/1985 | Dellinger et al. |
| 4,575,330 A | 3/1986 | Hull et al. |
| 4,575,805 A | 3/1986 | Moermann et al. |
| 4,591,341 A | 5/1986 | Andrews et al. |
| 4,609,349 A | 9/1986 | Cain et al. |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling et al. |
| 4,676,747 A | 6/1987 | Kesling et al. |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz et al. |
| 4,798,534 A | 1/1989 | Breads et al. |
| 4,836,778 A | 6/1989 | Baumrind et al. |
| 4,837,732 A | 6/1989 | Brandestini et al. |
| 4,850,864 A | 7/1989 | Diamond et al. |
| 4,850,865 A | 7/1989 | Napolitano et al. |
| 4,856,991 A | 8/1989 | Breads et al. |
| 4,877,398 A | 10/1989 | Kesling et al. |
| 4,880,380 A | 11/1989 | Martz et al. |
| 4,889,238 A | 12/1989 | Batchelor et al. |
| 4,890,608 A | 1/1990 | Steer et al. |
| 4,935,635 A | 6/1990 | O'Harra et al. |
| 4,936,862 A | 6/1990 | Walker et al. |
| 4,937,928 A | 7/1990 | van der Zel et al. |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell et al. |
| 5,011,405 A | 4/1991 | Lemchen |
| 5,017,133 A | 5/1991 | Miura et al. |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman et al. |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax et al. |
| 5,184,306 A | 2/1993 | Erdman et al. |
| 5,186,623 A | 2/1993 | Breads et al. |
| 5,219,896 A | 6/1993 | Coady et al. |
| 5,257,203 A | 10/1993 | Riley et al. |
| 5,260,476 A | 11/1993 | Ohno et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson et al. |
| 5,342,202 A | 8/1994 | Deshayes et al. |
| 5,368,478 A | 11/1994 | Andreiko et al. |
| 5,382,164 A | 1/1995 | Stern et al. |
| 5,395,238 A | 3/1995 | Andreiko et al. |
| 5,431,562 A | 7/1995 | Andreiko et al. |
| 5,440,326 A | 8/1995 | Quinn et al. |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,545,676 A | 8/1996 | Palazzotto et al. |
| 5,549,476 A | 8/1996 | Stern et al. |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. et al. |
| 5,621,648 A | 4/1997 | Crump et al. |
| 5,645,420 A | 7/1997 | Bergersen et al. |
| 5,645,421 A | 7/1997 | Slootsky et al. |
| 5,655,653 A | 8/1997 | Chester et al. |
| 5,683,243 A | 11/1997 | Andreiko et al. |
| 5,692,894 A | 12/1997 | Schwartz et al. |
| 5,725,376 A | 3/1998 | Poirier et al. |
| 5,725,378 A | 3/1998 | Wang et al. |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,879,158 A | 3/1999 | Doyle et al. |
| 5,880,961 A | 3/1999 | Crump et al. |
| 5,880,962 A | 3/1999 | Andersson et al. |
| 5,934,288 A | 8/1999 | Avila et al. |
| 5,957,686 A | 9/1999 | Anthony et al. |
| 5,964,587 A | 10/1999 | Sato et al. |
| 5,971,754 A | 10/1999 | Sondhi et al. |
| 5,975,893 A | 11/1999 | Chishti et al. |
| 6,015,289 A | 1/2000 | Andreiko et al. |
| 6,017,973 A | 1/2000 | Tamura et al. |
| 6,044,309 A | 3/2000 | Honda et al. |
| 6,049,743 A | 4/2000 | Baba |
| 6,062,861 A | 5/2000 | Andersson |
| 6,068,482 A | 5/2000 | Snow et al. |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier et al. |
| 6,398,548 B1 | 6/2002 | Muhammad et al. |

(56) References Cited

U.S. PATENT DOCUMENTS

| | | |
|---|---|---|
| 6,402,707 B1 | 6/2002 | Ernst et al. |
| 6,450,807 B1 | 9/2002 | Chishti et al. |
| 6,482,298 B1 | 11/2002 | Bhatnagar et al. |
| 6,524,101 B1 | 2/2003 | Phan et al. |
| 6,554,611 B2 | 4/2003 | Shishti et al. |
| 6,572,372 B1 | 6/2003 | Phan et al. |
| 6,629,840 B2 | 10/2003 | Chishti et al. |
| 6,705,863 B2 | 3/2004 | Phan et al. |
| 6,722,880 B2 | 4/2004 | Chishti et al. |
| 6,749,414 B1 | 6/2004 | Hanson et al. |
| 6,830,450 B2 | 12/2004 | Knopp et al. |
| 6,833,425 B1 | 12/2004 | Hecht et al. |
| 7,115,674 B2 | 10/2006 | Park et al. |
| 7,210,926 B2 | 5/2007 | Tadros et al. |
| 7,641,828 B2 | 1/2010 | DeSimone et al. |
| 7,892,474 B2 | 2/2011 | Shkolnik et al. |
| 8,404,757 B2 | 3/2013 | Maruta et al. |
| 8,455,566 B2 | 6/2013 | Anton et al. |
| 8,758,009 B2 | 6/2014 | Chen et al. |
| 8,765,031 B2 | 7/2014 | Li et al. |
| 8,807,999 B2 | 8/2014 | Kuo et al. |
| 8,883,065 B2 | 11/2014 | Kodama et al. |
| 8,999,221 B2 | 4/2015 | Kodama et al. |
| 9,655,691 B2 | 5/2017 | Li et al. |
| 10,201,409 B2 | 2/2019 | Mason et al. |
| 10,492,888 B2 | 12/2019 | Chen et al. |
| 10,781,274 B2 | 9/2020 | Liska et al. |
| 2002/0006597 A1 | 1/2002 | Andreiko et al. |
| 2003/0003172 A1 | 1/2003 | Stange et al. |
| 2003/0009252 A1 | 1/2003 | Pavlovskaia et al. |
| 2003/0139834 A1 | 7/2003 | Nikolskiy et al. |
| 2003/0224311 A1 | 12/2003 | Cronauer et al. |
| 2004/0128010 A1 | 7/2004 | Pavlovskaia et al. |
| 2005/0038135 A1 | 2/2005 | Jin et al. |
| 2005/0055118 A1 | 3/2005 | Nikolskiy et al. |
| 2006/0078841 A1 | 4/2006 | Desimone et al. |
| 2007/0142498 A1 | 6/2007 | Brennan et al. |
| 2008/0108760 A1 | 5/2008 | Mano et al. |
| 2008/0145820 A1 | 6/2008 | Karmaker et al. |
| 2008/0306724 A1 | 12/2008 | Kitching et al. |
| 2009/0275720 A1 | 11/2009 | Hunt et al. |
| 2009/0309220 A1 | 12/2009 | Katogi et al. |
| 2010/0113643 A1 | 5/2010 | Dershem |
| 2011/0108191 A1 | 5/2011 | Sanai et al. |
| 2012/0202909 A1 | 8/2012 | Chen |
| 2012/0231232 A1 | 9/2012 | Xu et al. |
| 2012/0296061 A1 | 11/2012 | Naruse et al. |
| 2013/0078594 A1 | 3/2013 | Leslie-Martin et al. |
| 2014/0061974 A1 | 3/2014 | Tyler |
| 2014/0265034 A1 | 9/2014 | Dudley |
| 2014/0302459 A1 | 10/2014 | Wang |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0159059 A1 | 6/2015 | Zhang et al. |
| 2015/0305918 A1 | 10/2015 | Chodorow et al. |
| 2015/0321497 A1 | 11/2015 | Lingier et al. |
| 2017/0007365 A1 | 1/2017 | Kopelman et al. |
| 2017/0007366 A1 | 1/2017 | Kopelman et al. |
| 2017/0007368 A1 | 1/2017 | Boronkay |
| 2017/0007386 A1 | 1/2017 | Mason et al. |
| 2017/0158803 A1 | 6/2017 | Amin et al. |
| 2019/0338067 A1 | 11/2019 | Liska et al. |

FOREIGN PATENT DOCUMENTS

| | | | |
|---|---|---|---|
| AU | 5598894 A | 6/1994 | |
| CA | 1121955 A | 4/1982 | |
| CA | 2024482 A1 | 3/1991 | |
| CN | 1235173 A | 11/1999 | |
| CN | 1976963 A | 6/2007 | |
| CN | 101385687 A | 3/2009 | |
| CN | 101410071 A | 4/2009 | |
| CN | 101448479 A | 6/2009 | |
| CN | 102770465 A | 11/2012 | |
| CN | 103975014 A | 8/2014 | |
| CN | 106103585 A | 11/2016 | |
| CN | 107118313 A | * 9/2017 | ......... C08F 290/061 |
| CN | 108698310 A | 10/2018 | |
| CN | 109996773 A | 7/2019 | |
| CN | 110267812 A | 9/2019 | |
| DE | 2749802 A1 | 5/1978 | |
| DE | 69327661 T2 | 7/2000 | |
| EP | 0091876 A1 | 10/1983 | |
| EP | 0142172 A2 | 5/1985 | |
| EP | 0299490 A2 | 1/1989 | |
| EP | 0376873 A2 | 7/1990 | |
| EP | 0490848 A2 | 6/1992 | |
| EP | 0541500 A1 | 5/1993 | |
| EP | 0562826 A1 | 9/1993 | |
| EP | 0667753 B1 | 1/2000 | |
| EP | 0774933 B1 | 12/2000 | |
| EP | 0731673 B1 | 5/2001 | |
| EP | 1637926 A2 | 3/2006 | |
| EP | 3813764 A2 | 5/2021 | |
| EP | 4049841 A1 | 8/2022 | |
| ES | 463897 A1 | 1/1980 | |
| FR | 2369828 A1 | 6/1978 | |
| FR | 2652256 A1 | 3/1991 | |
| GB | 496892 A | 12/1938 | |
| GB | 1550777 A | 8/1979 | |
| JP | S5358191 A | 5/1978 | |
| JP | S59223772 A | 12/1984 | |
| JP | H0428359 A | 1/1992 | |
| JP | H08508174 A | 9/1996 | |
| JP | H09208525 A | 8/1997 | |
| JP | 2001302744 A | 10/2001 | |
| JP | 2001310918 A | 11/2001 | |
| JP | 2004514759 A | 5/2004 | |
| JP | 2013112631 A | 6/2013 | |
| JP | 2013116886 A | 6/2013 | |
| JP | 2013121942 A | 6/2013 | |
| JP | 2016146152 A | 8/2016 | |
| JP | 2018512465 A | 5/2018 | |
| KR | 20130044178 A | 5/2013 | |
| KR | 101379612 B1 | 4/2014 | |
| WO | WO-9008512 A1 | 8/1990 | |
| WO | WO-9104713 A1 | 4/1991 | |
| WO | WO-9410935 A1 | 5/1994 | |
| WO | WO-9528431 A1 | 10/1995 | |
| WO | WO-9832394 A1 | 7/1998 | |
| WO | WO-9844865 A1 | 10/1998 | |
| WO | WO-9858596 A1 | 12/1998 | |
| WO | WO-2006071520 A2 | 7/2006 | |
| WO | WO-2012151494 A2 | 11/2012 | |
| WO | WO-2013052105 A2 | 4/2013 | |
| WO | WO-2013171124 A1 | 11/2013 | |
| WO | WO-2014020021 A2 | 2/2014 | |
| WO | WO-2014078537 A1 | 5/2014 | |
| WO | WO-2014098956 A1 | 6/2014 | |
| WO | WO-2014099317 A1 | 6/2014 | |
| WO | WO-2015028855 A1 | 3/2015 | |
| WO | WO-2015075094 A1 | 5/2015 | |
| WO | WO-2015200201 A1 | 12/2015 | |
| WO | WO-2016078838 A1 | 5/2016 | |
| WO | WO-2016187155 A1 | 11/2016 | |
| WO | WO-2017007962 A1 | 1/2017 | |
| WO | WO-2017007964 A1 | 1/2017 | |
| WO | WO-2018032022 A1 | 2/2018 | |
| WO | WO-2018047806 A1 | 3/2018 | |
| WO | WO-2020104873 A1 | 5/2020 | |

OTHER PUBLICATIONS

Hao et al., "Synthesis, Crystal Structure and Biological Activity of 3-(2-Chloro-4-trifluoromethylphenoxy)benzoate," Chinese Journal of Organic Chemistry, Sep. 2013, pp. 1993-1997.

Kwei T.K., "Introduction to Physical Polymer Science," Second Edition, by L. H. Sperling, Wiley, New York, 1992.

Allnex Product Catalog (Year: 2019), 20 pages.

AADR. American Association for Dental Research, Summary of Activities, Mar. 20-23, 1980, Los Angeles, CA, p. 195.

(56) References Cited

OTHER PUBLICATIONS

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler, "3D Mapping of Maxillo-Facial Prosthesis," AADR Abstract #607, 2 pages total, (1980).
Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial Inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).
Andrews, The Six Keys to Optimal Occlusion Straight Wire, Chapter 3, pp. 13-24 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL http://astronomy.swin.edu.au/-pbourke/prolection/coords.
Boyd et al., "Three Dimensional Diagnosis and Orthodontic Treatment of Complex Malocclusions With the Invisalign Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on the Uses of the Computer in Orthodontic Practice (Part 1)," J. Clin. Orthod., 13(7):442-453 (Jul. 1979).
BURSTONE (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at http://www.cardinalpaint.com on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision," Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004 http://reference.com/search/search?q=gingiva.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at http://www.dent-x.com/DentSim.htm, 6 pages.
Doyle, "Digital Dentistry," Computer Graphics World, pp. 50-52, 54 (Oct. 2000).
DuraClearTM product information, Allesee Orthodontic Appliances-Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.

(56) References Cited

OTHER PUBLICATIONS

Duret,"Vers Une Prosthese Informatisee," (English translation attached), Tonus, vol. 75, pp. 55-57 (Nov. 15, 1985).

Economides, "The Microcomputer in the Orthodontic Office," JCO, pp. 767-772 (Nov. 1979).

Elsasser, Some Observations on the History and Uses of the Kesling Positioner, Am. J. Orthod. (1950) 36:368-374.

English translation of Japanese Laid-Open Publication No. 63-11148 to inventor T. Ozukuri (Laid-Open on Jan. 18, 1998) pp. 1-7.

Felton et al., "A Computerized Analysis of the Shape and Stability of Mandibular Arch Form," Am. J. Orthod. Dentofacial Orthop., 92(6):478-483 (Dec. 1987).

Friede et al., "Accuracy of Cephalometric Prediction in Orthognathic Surgery," Abstract of Papers, J. Dent. Res., 70:754-760 (1987).

Futterling et al., "Automated Finite Element Modeling of a Human Mandible with Dental Implants," JS WSCG '98—Conference Program, retrieved from the Internet: http://wscg.zcu.cz/wscg98/papers98/Strasser 98.pdf, 8 pages.

Gao et al., "3-D element Generation for Multi-Connected Complex Dental and Mandibular Structure," Proc. Intl Workshop on Medical Imaging and Augmented Reality, pp. 267-271 (Jun. 12, 2001).

Gim-Alldent Deutschland, "Das DUX System: Die Technik," (with Certified English Translation), 5 pages total (2002).

Gottleib et al., "JCO Interviews Dr. James A. McNamura, Jr., on the Frankel Appliance: Part 2: Clinical 1-1 Management, "J. Clin. Orthod., 16(6):390-407 (Jun. 1982).

Grayson, "New Methods for Three Dimensional Analysis of Craniofacial Deformity, Symposium: JW Computerized Facial Imaging in Oral and Maxillofacial Surgery," AAOMS, 3 pages total, (Sep. 13, 1990).

Guess et al., "Computer Treatment Estimates in Orthodontics and Orthognathic Surgery," JCO, pp. 262-28 (Apr. 1989).

Heaven et al., "Computer-Based Image Analysis of Artificial Root Surface Caries," Abstracts of Papers, J. Dent. Res., 70:528 (Apr. 17-21, 1991).

Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressput-onfa . . . .

Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 page total).

Hoffmann, et al., "Role of Cephalometry for Planning of Jaw Orthopedics and Jaw Surgery Procedures," (Article Summary in English, article in German), Informationen, pp. 375-396 (Mar. 1991).

Hojjatie et al., "Three-Dimensional Finite Element Analysis of Glass-Ceramic Dental Crowns," J. Biomech., 23(11):1157-1166 (1990).

Huckins, "CAD-CAM Generated Mandibular Model Prototype from MRI Data," AAOMS, p. 96 (1999).

Important Tip About Wearing the Red White & Blue Active Clear Retainer System. Allesee Orthodontic Appliances-Pro Lab. 1 page (1998).

JCO Interviews, "Craig Andreiko, DDS, MS on the Elan and Orthos Systems," JCO, pp. 459-468 (Aug. 1994).

JCO Interviews, "Dr. Homer W. Phillips on Computers in Orthodontic Practice, Part 2," JCO. 1997; 1983:819-831.

Jerrold, "The Problem, Electronic Data Transmission and the Law," AJO-DO, pp. 478-479 (Apr. 1988).

Jones et al., "An Assessment of the Fit of a Parabolic Curve to Pre- and Post-Treatment Dental Arches," Br. J. Orthod., 16:85-93 (1989).

JP Faber et al., "Computerized Interactive Orthodontic Treatment Planning," Am. J. Orthod., 73(1):36-46 (Jan. 1978).

Kamada et.al., Case Reports on Tooth Positioners Using LTV Vinyl Silicone Rubber, J. Nihon University School of Dentistry (1984) 26(1): 11-29.

Kamada et.al., Construction of Tooth Positioners with LTV Vinyl Silicone Rubber and Some Case KJ Reports, J. Nihon University School of Dentistry (1982) 24(1):1-27.

Kamigaito et al.: Stereospecific Living Radical Polymerization forSimultaneous Control of Molecular Weight and Tacticity. Journal of Polymer Science: Part A: Polymer Chemistry (44): 6147-6158 (2006).

Kanazawa et al., "Three-Dimensional Measurements of the Occlusal Surfaces of Upper Molars in a Dutch Population," J. Dent Res., 63(11):1298-1301 (Nov. 1984).

Kesling, Coordinating the Predetermined Pattern and Tooth Positioner with Conventional Treatment, KN Am. J. Orthod. Oral Surg. (1946) 32:285-293.

Kesling et al., The Philosophy of the Tooth Positioning Appliance, American Journal of Orthodontics and Oral surgery. 1945; 31:297-304.

Kleeman et al., The Speed Positioner, J. Clin. Orthod. (1996) 30:673-680.

Kochanek, "Interpolating Splines with Local Tension, Continuity and Bias Control," Computer Graphics, ri 18(3):33-41 (Jul. 1984).

KM Oral Surgery (1945) 31 :297-30.

Kunii et al., "Articulation Simulation for an Intelligent Dental Care System," Displays 15:181-188 (1994).

Kuroda et al., Three-Dimensional Dental Cast Analyzing System Using Laser Scanning, Am. J. Orthod. Dentofac. Orthop. (1996) 110:365-369.

Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991).

Leinfelder, et al., "A New Method for Generating Ceramic Restorations: a CAD-CAM System," J. Am. 1-1 Dent. Assoc., 118(6):703-707 (Jun. 1989).

Lutz et al.: Stereoblock copolymers and tacticity control in controlled/living radical polymerization. J Am Chem Soc.125(23): 6986-6993 (2003).

Manetti, et al., "Computer-Aided Cefalometry and New Mechanics in Orthodontics," (Article Summary in English, article in German), Fortschr Kieferorthop. 44, 370-376 (Nr. 5), 1983.

McCann, "Inside the ADA," J. Amer. Dent. Assoc., 118:286-294 (Mar. 1989).

McNamara et al., "Invisible Retainers," J. Clin. Orthod., pp. 570-578 (Aug. 1985).

McNamara et al., Orthodontic and Orthopedic Treatment in the Mixed Dentition, Needham Press, pp. 347-353 (Jan. 1993).

Moermann et al., "Computer Machined Adhesive Porcelain Inlays: Margin Adaptation after Fatigue Stress," IADR Abstract 339, J. Dent. Res., 66(a):763 (1987).

Moles, "Correcting Mild Malalignments—as Easy as One, Two, Three," AOA/Pro Corner, vol. 11, No. 1, 2 pages (2002).

Mormann et al., "Marginale Adaptation von adhasuven Porzellaninlays in vitro," (with Certified English Translation), Separatdruck aus: Schweiz. Mschr. Zahnmed. 95: 1118-1129, 1985, (total of 24 pages).

Nahoum, "The Vacuum Formed Dental Contour Appliance," N. Y. State Dent. J., 30(9):385-390 (Nov. 1964).

Nash, "CEREC CAD/CAM Inlays: Aesthetics and Durability in a Single Appointment," Dent. Today, 9(8):20, 22-23 (Oct. 1990).

Nishiyama et al., "A New Construction of Tooth Repositioner by LTV Vinyl Silicone Rubber," J. Nihon Univ. Sch. Dent., 19(2):93-102 (1977).

Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.

Pinkham, "Foolish Concept Propels Technology," Dentist, 3 pages total, Jan./Feb. 1989.

Pinkham, "Inventor's CAD/CAM May Transform Dentistry," Dentist, 3 pages total, Sep. 1990.

Ponitz, "Invisible Retainers," Am. J. Orthod., 59(3):266-272 (Mar. 1971).

(56) References Cited

OTHER PUBLICATIONS

Porter et al.: Chiral auxiliary control of tacticity in free radical polymerization. J. Am. Chem. Soc. 114(20): 7676-7683 (1992).
Procera Research Projects, "PROCERA Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances, http:// www.essix.com/magazine/defaulthtml Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording the Dental Cast in Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolaryngol Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," (with Certified English Translation), High Tech in der Zahnmedizin, 29 pages total (2004).
Sinclair, "The Readers' Corner," J. Clin. Orthod., 26(6):369-372 (Jun. 1992).
Sirona Dental Systems GmbH, Cerec 3D, Manuel utilisateur, Version 2.0X (in French with Certified English Translation), 2003, 229 pages total.
Stoll et al., "Computer-aided Technologies in Dentistry," (article summary in English, article in German), Dtsch Zahnarztl Z 45, pp. 314-322 (1990).
Sturman, "Interactive Keyframe Animation of 3-D Articulated Models," Proceedings Graphics Interface '84, May-Jun. 1984, pp. 35-40.

The Choice Is Clear: Red, White & Blue . . . The Simple, Affordable, No-Braces Treatment, Allesee Orthodontic Appliances-Pro Lab product information, 6 pages (2003).
The Choice Is Clear: Red, White & Blue . . . the Simple, Affordable, No-Braces Treatment, Allesee HI Orthodontic Appliances-Pro Lab product information for doctors. http://ormco.com/aoa/appliancesservices/RWB/doctorhtml, 5 pages (May 19, 2003).
The Choice is Clear: Red, White & Blue . . . the Simple, Affordable, No-Braces Treatment, Allesee HJ Orthodontic Appliances-Pro Lab product information for patients, (http://ormco.com/aoa/appliancesservices/RWB/patients.html), 2 pages (May 19, 2003).
The Red, White & Blue Way to Improve Your Smile!, Allesee Orthodontic Appliances-Pro Lab product information for patients, 2 pages (1992).
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
Tumbleston et al., Continuous Liquid Interface Production of 3D Objects. Science, 347.6228 (Mar. 2015): 1349-1352.
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering of Geometric Models—An Introduction," Computer-Aided Design, 29(4):255-268, 1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 388-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL(http://wscg.zcu.cz/wscg98/wscg98.h).
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).

(56) References Cited

OTHER PUBLICATIONS

Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be a Candidate for This Invisible No-Braces Treatment, Allesee Orthodontic Appliances-Pro Lab product information for patients, 2 pages (2002).
Emmetcosten: "The Stress Strain Curve | Intro to Structural Engineering," Aug. 14, 2019, pp. 1-5. Retrieved from internet URL: https://asrengineering.com/2019/08/14/the-stress-strain-curve-intro-to-structural-engineering/.
European Boards of Appeal dated May 6, 2022 issued in Patent Application No. 16739543.3.
Allnex. Ebecryl 8808: Aliphatic Urethane Diacrylate. Technical Data Sheet Sep. 11, 2013. 2 pages (2013).
Cai L., et al., "Parabolic Dependence of Material Properties and Cell Behavior on the Composition of Polymer Networks Via Simultaneously Controlling Crosslinking Density and Crystallinity", Biomaterials, Elsevier, Oct. 1, 2010, vol. 31(29), pp. 7423-7434, XP027185928.
Cavex, Cavex LC Dental Tray, Safety Data Sheet, Date of the previous issue and revision Apr. 14, 2015, 6 pages (2015).
Chaconas et al., The DigiGraph Work Station Part 1 Basic Concepts, Journal of Clinical Orthodontics, 24(6), pp. 360-367, (Author Manuscript), Jun. 1990.
Mappes Orthodontics. Types of orthodontic appliances. (a href="http://www.mappesortho.com/types-of-appliances" title="Link: http://www.mappesortho.com/types-of-appliances"http://www.mappesortho.com/types-of-appliances/a) Apr. 17, 2016. 5 pages (Accessed on Jun. 5, 2020).
Mappes Orthodontics., "Types of Orthodontics Appliances", Retrieved on May 11, 2021, 6 pages.
Roylance., Engineering Viscoelasticity. MIT Press, Cambridge, Oct. 2001. 37 pages.
Selvamalar C.S.J., et al., "Copolymerization of 4-Benzyloxycarbonylphenyl Methacrylate With Glycidyl Methacrylate: Synthesis, Characterization, Reactivity Ratios and Application as Adhesives," Reactive and Functional Polymers, Aug. 2003, vol. 56 (2), pp. 89-101, XP004460494.
Selvamalar C.S.J., et al., "Copolymers of 4-Benzyloxycarbonylphenyl Methacrylate with Methyl Methacrylate: Synthesis, Characterization, and Reactivity Ratios," Journal of Macromolecular Science, Part A Pure and Applied Chemistry, Jan. 2003, vol. 40 (10), pp. 1019-1033, XP055621964.
Selvamalar C.S.J., et al., "Homopolymer and Copolymers of 4-Benzyloxycarbonylphenyl Acrylate With Glycidyl Methacrylate: Synthesis, Characterization, Reactivity Ratios, and Application as Adhesive for Leather," Journal of Applied Polymer Science, Mar. 2004, vol. 91(6), pp. 3604-3612, XP055621954.
Swetly et al.; "Capabilities of Additive Manufacturing Technologies (AMT) in the validation of the automotive cockpit" RTejournal—Forum for Rapid Technology, 2014, vol. 1, urn:nbn:de:0009-2-39579, 10 pages.
VIJAYANAND P.S., et al., "Copolymerization of 4-Benzyloxycarbonylphenyl Acrylate with Methyl Methacrylate: Synthesis, Characterization, and Determination of Reactivity Ratios," Journal of Macromolecular Science Part A, Jan. 2003, vol. 40 (2), pp. 125-140, XP055621966.
Fertig J., et al., "Ultraviolet Stabilizing Monomers and Polymers. I. Synthesis and Polymerization of Phenyl5-Methacryloxymethylsalicylate," Journal of applied polymer science, 1965, vol. 9, pp. 903-910.
Structure Search performed by USPTO STIC, Jan. 25, 2023, 213 pages.

\* cited by examiner

CRYSTALLIZABLE RESINS

CROSS-REFERENCE

This application claims the benefit of U.S. Provisional Application No. 62/928,865, filed Oct. 31, 2019, and U.S. Provisional Application No. 63/073,301, filed Sep. 1, 2020, each of which are incorporated herein by reference in their entirety.

BACKGROUND OF THE INVENTION

Appliances and devices having a combination of elasticity and stiffness are desirable in some applications, such as during the fabrication of orthodontic devices. Polymeric materials can be used to fabricate orthodontic devices, enabling the use of fabrication techniques such as 3D printing. Singular polymeric materials typically do not have characteristics that meet the needs of appliances and devices that are now manufactured, such as both modulus (e.g., stiffness) and elasticity. Some practitioners attempt to adjust the characteristics of the polymeric materials by adding fillers to the resin from which the polymeric material is formed. However, fillers, such as silica, can raise viscosity of resins and make them incompatible with desirable fabrication techniques. Such fillers can also increase modulus, but at the cost to elasticity. A resin that can increase internal modulus of a material without sacrificing needed elasticity is desired.

Orthodontic procedures typically involve repositioning a patient's teeth to a desired arrangement in order to correct malocclusions and/or improve aesthetics. To achieve these objectives, orthodontic appliances such as braces, retainers, shell aligners, and the like can be applied to the patient's teeth by an orthodontic practitioner and/or a patient. The appliance is configured to exert force on one or more teeth in order to effect desired tooth movements. The application of force can be periodically adjusted (e.g., by altering the appliance or using different types of appliances) in order to incrementally reposition the teeth to a desired arrangement. Polymeric materials can be used to fabricate appliances to be used to reposition a patient's teeth. Polymeric materials that have dual characteristics of stiffness and elasticity are desirable, as are 3D printable resins that can form such polymeric materials.

SUMMARY

Provided herein are polymeric materials comprising a crystalline phase and an amorphous phase and resins and methods for making the same. Also provided herein are objects manufactured using the crystalline materials, providing beneficial properties such as increased durability.

In various aspects, the present disclosure provides a polymeric material comprising: at least one crystalline phase comprising at least one polymer crystal having a melting temperature above 20° C.; and an amorphous phase comprising at least one amorphous polymer having a glass transition temperature less than 40° C. In some aspects, the amorphous polymer has a glass transition temperature less than 30° C., less than 20° C., less than 10° C., or less than 0° C. In some aspects, the at least one polymer crystal has a melting temperature above 30° C., above 40° C., above 50° C., above 60° C., or above 70° C. In some aspects, the polymer crystal comprises greater than 40 wt %, greater than 50 wt %, greater than 60 wt %, greater than 70 wt %, greater than 80 wt %, or greater than 90 wt % of linear polymers and/or linear oligomers. In some aspects, the polymeric material characterized by one or more of: an elongation at break greater than or equal to 5%; a storage modulus greater than or equal to 500 MPa; a tensile modulus greater than or equal to 500 MPa; and a stress remaining greater than or equal to 0.01 MPa. In some aspects, the polymeric material is characterized by a stress remaining of 5% to 45% of the initial load, or a stress remaining of 20% to 45% of the initial load. In some aspects, the polymeric material is characterized by a tensile modulus from 500 MPa to 2000 MPa or a tensile modulus from 800 MPa to 2000 MPa. In some aspects, the polymeric material is characterized by two or more of: an elongation at break greater than or equal to 5%; a storage modulus greater than or equal to 500 MPa; a tensile modulus greater than or equal to 500 MPa; and a stress remaining greater than or equal to 0.01 MPa. In some aspects, the polymeric material is characterized by: an elongation at break greater than or equal to 5%; a storage modulus greater than or equal to 500 MPa; a tensile modulus greater than or equal to 500 MPa; and a stress remaining greater than or equal to 0.01 MPa. In some aspects, the polymeric material is characterized by an elongation at break greater than 10%, an elongation at break greater than 20%, an elongation at break greater than 30%, an elongation at break of 5% to 250%, an elongation at break of 20% to 250%, or an elongation at break value between 40% and 250%. In some aspects, the polymeric material is characterized by a storage modulus of 0.1 MPa to 4000 MPa, a storage modulus of 300 MPa to 3000 MPa, or a storage modulus of 750 MPa to 3000 MPa. In some aspects, the polymeric material is characterized by a stress remaining of 0.01 MPa to 15 MPa, or a stress remaining of 2 MPa to 15 MPa. In some aspects, the at least one polymer crystal comprises a solid crystal, a liquid crystal, a lamellar crystal, a spherulite, a semicrystal, or a combination thereof. In some aspects, the amorphous phase and the at least one crystalline phase comprises a crystallizable polymeric material. In some aspects, each of the amorphous polymer and the at least one polymer crystal comprises the crystallizable polymeric material. In some aspects, the polymeric material has a crystalline content between 10% and 90%, as measured by X-ray diffraction. In some aspects, the polymeric material comprises a weight ratio of the at least one polymer crystal to the amorphous polymer, said ratio having a value between 1:99 and 99:1. In some aspects, the polymeric material comprises a plurality of crystalline domains. In some aspects, the plurality of crystalline domains each have a polymer crystal melting temperature within 5° C. of each other. In some aspects, the plurality of crystalline domains each have a polymer crystal melting temperature, and wherein at least some of the polymer crystal melting temperatures have a difference of greater than 5° C. In some aspects, each of the polymer crystal melting temperatures is from 40° C. to 100° C. In some aspects, at least 80% of the crystalline domains comprise a polymer crystal having a melting temperature between 40° C. and 100° C. In some aspects, the polymeric material comprises an average crystalline domain size of less than 5 µm. In some aspects, the difference of refractive index between the crystalline domain and the amorphous domain is less than 0.1. In some aspects, greater than 70% of visible light passes through the polymeric material. In some aspects, the polymeric material is biocompatible, bioinert, or a combination thereof. In some aspects, the at least one crystalline phase has a storage modulus and/or a tensile modulus greater than the amorphous phase. In some aspects, the amorphous phase has an elongation at yield and/or an elongation at break greater than the at least one crystalline phase. In some aspects, the at least one polymer crystal is bonded to or entangled with the amorphous polymer.

In various aspects, the present disclosure provides an orthodontic appliance comprising the polymeric material as described herein. In some aspects, the orthodontic appliance is an aligner, expander or spacer. In some aspects, the orthodontic appliance comprises a plurality of tooth receiving cavities configured to reposition teeth from a first configuration toward a second configuration. In some aspects, orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In some aspects, the orthodontic appliance is an aligner.

In various aspects the present disclosure provides a method of repositioning a patient's teeth, the method comprising: generating a treatment plan for a patient, the plan comprising a plurality of intermediate tooth arrangements for moving teeth along a treatment path from an initial arrangement toward a final arrangement; producing a 3D printed orthodontic appliance; and moving on-track, with the orthodontic appliance, at least one of the patient's teeth toward an intermediate arrangement or a final tooth arrangement. In some aspects, the method further comprising tracking progression of the patient's teeth along the treatment path after administration of the orthodontic appliance, the tracking comprising comparing a current arrangement of the patient's teeth to a planned arrangement of the teeth. In some aspects, greater than 60% of the patient's teeth are on track with the treatment plan after 2 weeks of treatment. In some aspects, the orthodontic appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth. In some aspects, the method further comprising achieving on-track the movement of the at least one of the patient's teeth to the intermediate arrangement or the final tooth arrangement. In some aspects, the method further comprising achieving on-track the movement of a plurality of the patient's teeth to the intermediate arrangement or the final tooth arrangement. In some aspects, further comprising achieving on-track the movement of a majority of the patient's teeth receiving treatment to the intermediate arrangement or the final tooth arrangement.

In various aspects, the present disclosure provides a method as described herein that comprises prior to moving on-track, with the orthodontic appliance, the at least one of the patient's teeth toward the intermediate arrangement or the final tooth arrangement, the orthodontic appliance comprises a first flexural modulus; and after achieving on-track the movement of the at least one of the patient's teeth to the intermediate arrangement or the final tooth arrangement, the orthodontic appliance comprises a second flexural modulus, wherein the second flexural modulus is at least 90%, at least 80%, at least 70%, at least 60%, or at least 50% of the first flexural modulus. In some aspects, the method comprises: prior to moving on-track, with the orthodontic appliance, the at least one of the patient's teeth toward the intermediate arrangement or the final tooth arrangement, the orthodontic appliance comprises a first elongation at break; and after achieving on-track the movement of the at least one of the patient's teeth to the intermediate arrangement or the final tooth arrangement, the orthodontic appliance comprises a second elongation at break, wherein the second elongation at break is at least 90%, at least 80%, at least 70%, at least 60%, or at least 50% of the first elongation at break. In some aspects, the producing comprises direct fabrication, and optionally wherein the direct fabrication comprises crosslinking a crystallizable resin. In some aspects, the 3D printed orthodontic appliance is the orthodontic appliance of any one of claims 30-35.

In various aspects, the present disclosure provides a resin comprising: a monomer of a crystallizable polymeric material, the crystallizable polymeric material having a melting temperature above 20° C.; a monomer of an amorphous polymeric material, the amorphous polymeric material having a glass transition temperature less than 40° C.; and an initiator. In some aspects, the amorphous polymeric material has a glass transition temperature less than 30° C., less than 20° C., less than 10° C., or less than 0° C. In some aspects, the crystallizable polymeric material has a melting temperature above 30° C., above 40° C., above 50° C., above 60° C., or above 70° C. In some aspects, the resin has a viscosity from 0.5 PaS to 20 PaS at 90° C. In some aspects, the crystallizable polymeric material comprises greater than 40 wt %, greater than 50 wt %, greater than 60 wt %, greater than 70 wt %, greater than 80 wt %, or greater than 90 wt % of linear polymers and/or linear oligomers. In some aspects, the resin further comprising a polymer crystal, said polymer crystal comprising the monomer of the crystallizable polymeric material. In some aspects, at least a portion of the crystallizable polymeric material is a polymer or an oligomer comprising the monomer of the crystallizable polymeric material. In some aspects, at least a portion of the amorphous polymeric material is a polymer or an oligomer comprising the monomer of the amorphous polymeric material. In some aspects, the resin has less than 10% crystalline content at 90° C., as measured by X-ray diffraction. In some aspects, the crystallizable material comprises an aromatic polyester. In some aspects, the resin comprises greater than 25% of the aromatic polyester, by weight. In some aspects, the aromatic polyester is selected from the group consisting of a polyethylene terephthalate, a polytrimethylene terepthalate, a polypropylene terephthalate, a polyhexylene terephthalate, a polyethylene naphthalate, a polyalkylene naphthalate, a polybutylene naphthalate, a polyhexylene naphthalate, a polycyclohexylenedimethylene terephthalate, a polybutylene terephthalate, any combination thereof, and any derivative thereof. In some aspects, the crystallizable polymeric material comprises a naphthalate group. In some aspects, the naphthalate group comprises 6,6'-bis(2-(allyloxy)ethyl) O'2,O2-(((naphthalene-2,6-dicarbonyl)bis(oxy)) bis(butane-4,1-diyl)) bis(naphthalene-2,6-dicarboxylate), bis(2-mercaptoethyl) naphthalene-2,6-dicarboxylate, or a combination thereof. In some aspects, the crystallizable polymeric material comprises a polycaprolactone. In some aspects, the crystallizable material comprises: Formula (I), Formula (II), Formula (III), Formula (IV), a derivative thereof, or a combination thereof. In some aspects, at least 90% of the crystallizable polymeric material is in a liquid phase at an elevated temperature. In some aspects, the elevated temperature is between 40° C. and 100° C. In some aspects, the resin further comprising a linking monomer, a modifying polymer, or a combination thereof. In some aspects, the initiator is a photoinitiator. In some aspects, the resin further comprising at least one of a thermal initiator, a polymerization catalyst, an inhibitor, a light blocker, a plasticizer, a solvent, a surface energy modifier, a pigment, a dye, a filler, a crystallization seed, a crystallization catalyst, or a biological agent. In some aspects, at least a portion of the crystallizable polymeric material is a liquid at 60° C. In some aspects, the resin is capable of being 3D printed.

In various aspects, the present disclosure provides a method of forming a cured polymeric material, the method comprising: providing the as disclosed herein; and curing the resin with a light source, thereby forming a cured polymeric material. In some aspects, the method further comprising growing at least one polymer crystal in a crystalline domain of the cured polymeric material, the at least one crystal comprising the crystallizable polymeric material. In some aspects, the method further comprising fabricating an object with the cured polymeric material. In some aspects, the fabricating comprises printing with a 3D printer. In some aspects, the object is an orthodontic appliance. In some aspects, the orthodontic appliance is an aligner, expander or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In some aspects, the orthodontic appliance is an aligner. In some aspects, the method further comprising triggering the formation of at least one polymer crystal, the at least one polymer crystal comprising the crystallizable polymeric material. In some aspects, the triggering comprises cooling the cured material, adding seeding particles to the resin, providing a force to the cured material, providing an electrical charge to the resin, or any combination thereof. In some aspects, the at least one polymer crystal forms spontaneously.

In various aspects, the present disclosure provides a cured polymeric material formed from by any of the methods described herein.

In various aspects, the present disclosure provides a resin comprising a plurality of monomers, wherein: the plurality of monomers form a polymer comprising tacticity when cured; and the resin is capable of being 3D printed. In some aspects, the plurality of monomers are stereoselective. In some aspects, the polymer is a crystallizable polymeric material. In some aspects, the plurality of monomers are in the form of an oligomer having tacticity. In some aspects, the plurality of monomers are in the form of a polymer chain having tacticity. In some aspects, the plurality of monomers are functionalized with reactive functional groups. In some aspects, the plurality of monomers form the polymer comprising tacticity naturally. In some aspects, the plurality of monomers form the polymer comprising tacticity in the presence of a chiral catalyst or a chiral co-catalyst. In some aspects, the plurality of monomers for the polymer comprising tacticity in the presence of a chiral coordinating photo-initiator. In some aspects, the plurality of monomers comprise a chiral acrylate, a chiral methacrylate, a chiral epoxide, a chiral vinyl, a chiral thiol, or a combination thereof. In some aspects, the resin further comprising a tactic catalyst and/or a chiral coordinating photo-initiator. In some aspects, the resin has a viscosity from 0.5 PaS to 20 PaS at 90° C. In some aspects, the plurality of monomers comprise a common stereocenter. In some aspects, the resin comprises low melt temperature materials. In some aspects, the resin comprises a melt temperature greater than 60° C., greater than 80° C., greater than 100° C., greater than 120° C., or greater than 140° C. In some aspects, the resin comprises a crystalline domain having a crystalline melt temperature greater than 60° C., greater than 80° C., greater than 100° C., greater than 120° C., or greater than 140° C. In some aspects, the polymer comprising tacticity comprises a property of: being isotactic, being syndiotactic, having a plurality of meso diads, having a plurality of racemo diads, having a plurality of isotactic triads, having a plurality of syndiotactic triads, or having a plurality of heterotactic triads. In some aspects, the tacticity is relative to the polymer backbone. In some aspects, the plurality of monomers each comprise a ring structure and a stereocenter. In some aspects, the crystalline phase comprises a tactic property.

In various aspects, the present disclosure provides a polymeric material comprising: an amorphous phase; and a crystalline phase comprising a polymer having a tactic property. In some aspects, the tactic property comprises being isotactic, being syndiotactic, having a plurality of meso diads, having a plurality of racemo diads, having a plurality of isotactic triads, having a plurality of syndiotactic triads, or having a plurality of heterotactic triads. In some aspects, the polymeric material comprising the crystalline phase comprising the polymer having the tactic property has increased crystallinity compared to a comparable polymeric material comprising a comparable atactic polymer. In some aspects, greater than 50%, greater than 60%, greater than 70%, greater than 80%, greater than 90%, greater than 95%, or greater than 99% of the crystalline phase comprises the tactic property. In some aspects, greater than 50%, greater than 60%, greater than 70%, greater than 80%, greater than 90%, greater than 95%, or greater than 99% of the polymeric material comprises the tactic property. In some aspects, the polymeric material comprising the polymer having the tactic property is characterized by at least one of: an elongation at break greater than or equal to 5%; a storage modulus greater than or equal to 500 MPa; a tensile modulus greater than or equal to 500 MPa; and a stress remaining greater than or equal to 0.01 MPa. In some aspects, a comparable polymeric material comprising an atactic polymer comparable to the polymer having the tactic property is characterized by at least one of: an elongation at break less than 5%; a storage modulus less than 500 MPa; a tensile modulus less than 500 MPa; and a stress remaining less than 0.01 MPa. In some aspects, the polymeric material is crosslinked. In some aspects, the polymeric material is a thermoset or a thermoplastic. In some aspects, the polymeric material comprises semi-crystalline segments.

In various aspects, the present disclosure provides a method of forming a cured polymeric material, the method comprising: providing the resin; and curing the resin, thereby forming a cured polymeric material comprising tacticity. In some aspects, the method further comprising fabricating an object with the cured polymeric material. In some aspects, the fabricating comprises printing the resin with a 3D printer. In some aspects, the fabricating comprises stereolithography, digital light processing, two photon-induced photopolymerization, inkjet printing, multijet printing, fused deposition modeling, or any combination thereof. In some aspects, the plurality of monomers are incorporated into the cured polymeric material during the curing step. In some aspects, the plurality of monomers are incorporated into the cured polymeric material following the curing step. In some aspects, curing the resin comprises exposure to a light source. In some aspects, curing the resin comprises radical curing, ionic curing, or a combination thereof. In some aspects, curing the resin forms a polymeric material comprising an interpenetrated network comprising the polymer comprising tacticity. In some aspects, the tacticity is formed during or after the curing step. In some aspects, curing the resin comprises polymerizing the plurality of monomers, and wherein polymerizing the plurality of monomers comprises a plurality of ring-opening reactions. In some aspects, the plurality of monomers have tacticity. In some aspects, the method further comprising synthesizing and purifying the plurality of monomers. In some aspects, the method further comprising controlling crystallinity of the cured polymeric material by controlling the relative amount of the plurality of monomers. In some aspects, the cured polymeric material comprises the polymeric material as provided herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Figure 1A:
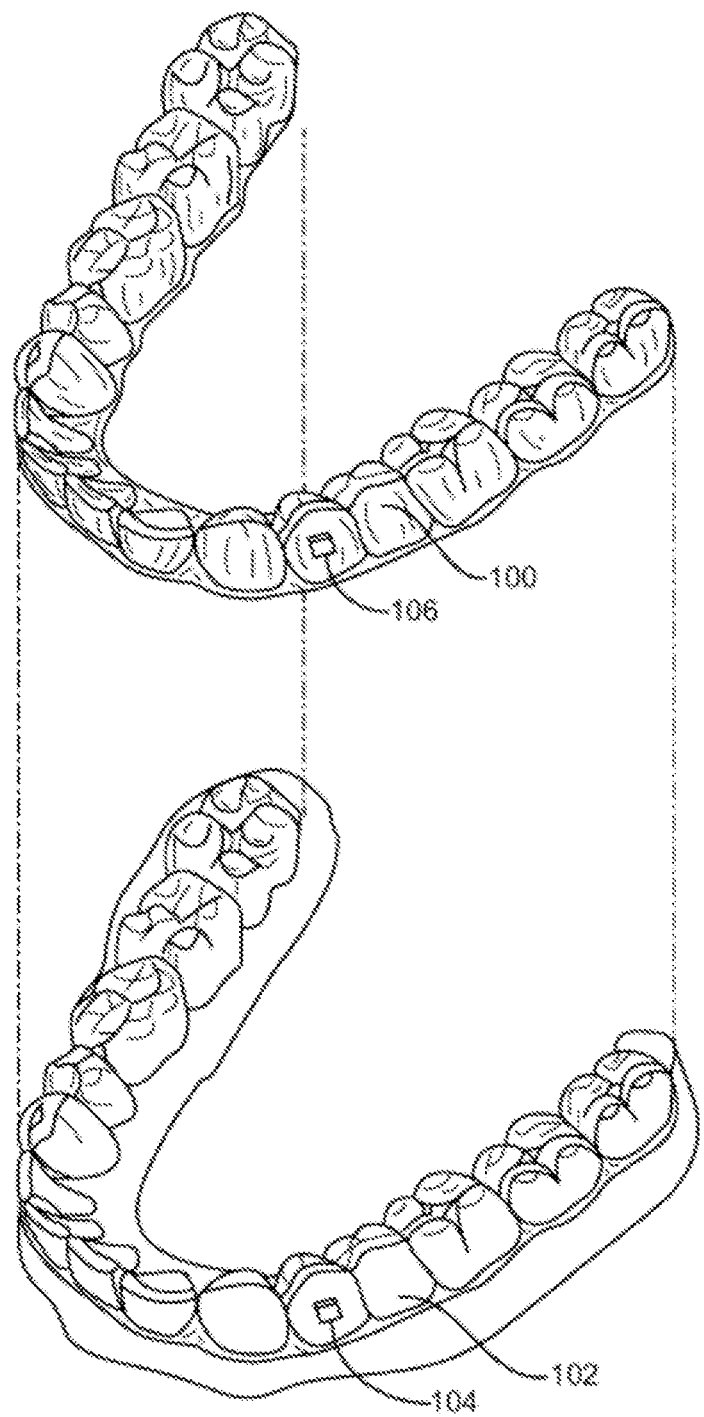
FIG. 1A illustrates a tooth repositioning appliance, in accordance with embodiments.

This disclosure provides polymeric materials comprising polymer crystals, methods and resins for making the same, and objects and appliances made from said polymeric materials. Polymeric materials having polymer crystals provide favorable properties, such as enhanced durability and rigidity. In preferred embodiments, this disclosure provides polymeric materials comprising a crystalline phase comprising at least one polymer crystal, as well as an amorphous phase comprising at least one amorphous polymer. In certain embodiments, the crystalline phase confers rigidity to the polymeric material, while the amorphous phase confers elasticity and flexibility. As used herein the terms "rigidity" and "stiffness" are used interchangeably, as are the corresponding terms "rigid" and "stiff."

In some embodiments, this disclosure provides a resin comprising a crystallizable polymeric material. The crystallizable polymeric material can comprise a crystallizable polymer, a crystallizable oligomer, and/or a monomer that be polymerized to form a crystallizable polymer or crystallizable oligomer. The crystallizable polymer and/or crystallizable oligomer can form polymer crystals, wherein chain segments of the polymer or oligomer can overlap to form aligned regions (e.g., aligned in parallel segments), which increase stiffness and flexural modulus in comparison to amorphous chain segments of the same material (e.g., not aligned or overlapping in parallel segments). In preferred embodiments, the resin further comprises an amorphous polymeric material. As a non-limiting example of favorable qualities found using resins comprising crystallizable polymeric materials, aligners formed with a standard polymeric material can degrade over time, following multiple applications to and withdrawal from a patient's teeth, which can damage the polymer chains within the aligner; in contrast, polymer materials having polymer crystals and amorphous regions can retain their physical properties for longer periods of use, as the amorphous phase allows the aligner to have some flexibility without breaking the polymer chains, the polymer crystals can provide the stiffness necessary to move teeth, and in some embodiments, the polymer crystals can further serve as a source for polymer chains to pull out of the crystal (increasing the amorphous phase) and reduce the stress on the polymer chains.

In certain embodiments, this disclosure provides a polymeric material comprising a composition of two materials: a crystallizable or crystalline polymeric material, and an amorphous polymeric material. The combination of two materials can provide different properties to the polymeric material as a whole (e.g., the crystals can be rigid and stiff, while the amorphous polymeric material can be elastic). This combination of properties results in a material that can, for example, stretch and not break. Without being held to the theory, the polymer crystals can be exposed to higher levels of physical force and retain a high level of stiffness, as the crystals can unfold to relieve pressure without breaking the polymer chains of the amorphous polymeric material and/or the crystalline polymeric material.

As provided further herein, the polymeric material comprising a crystalline phase (also referred to herein as a crystalline domain) and an amorphous phase (also referred to herein as an amorphous domain) have improved characteristics, such as the ability to act quickly (e.g., vibrate quickly and react upon application of strain, from the elastic characteristics of the amorphous domain) and also provide strong modulus (e.g., are stiff and provide strength, from the crystalline domain). The polymer crystals disclosed herein can comprise closely stacked and/or packed polymer chains. In some embodiments, the polymer crystals comprise long oligomer or long polymer chains that are stacked in an organized fashion, overlapping in parallel. The polymer crystals can in some cases be pulled out of a crystalline phase, resulting in an elongation as the polymer chains of the polymer crystal are pulled (e.g., application of a force can pull the long polymer chain of the polymer crystal, thus introducing disorder to the stacked chains, pulling at least a portion out of its crystalline state without breaking the polymer chain). This is in contrast with fillers that are traditionally used in the formation of resins for materials with high flexural modulus, which can simply slip through the amorphous phase as forces are applied to the polymeric material or when the fillers are covalently bonded to the polymers causing a reduction in the elongation to break for the material. The use of polymer crystals in the resulting polymeric material thus provide a less brittle product that retains more of the original physical properties following use (i.e., are more durable), and retains elastic characteristics through the combination of amorphous and crystalline phases.

Crystallizable Resins
Crystallizable Polymeric Material

In some embodiments, the present disclosure provides resins comprising crystallizable domains (the resins are also referred to herein as "crystallizable resins"). In certain embodiments, the resins comprise a crystallizable or crystalline polymeric material. The crystallizable polymeric material can form a crystalline phase comprising polymer crystals, said polymer crystals comprising the crystallizable polymeric material. In some embodiments, the crystallizable resins comprise polymer crystals (the resins are also referred to herein as "crystalline resins"). The polymer crystals can comprise the crystallizable polymeric material. In some embodiments, the crystallizable polymeric material can form at least one crystalline phase.

In some embodiments, the crystallizable polymeric material has a melting temperature greater than room temperature. In some embodiments, the crystallizable polymeric material has a melting temperature greater than the temperature of a human oral cavity. As a non-limiting example, it can be favorable that the polymer crystals have a melting temperature above the temperature of a human oral cavity, so the polymer crystals remain solid in such a setting. In some embodiments, the crystallizable polymeric material has a melting temperature greater than 20° C., greater than 25° C., greater than 30° C., greater than 35° C., greater than 40° C., greater than 45° C., greater than 50° C., greater than 55° C., greater than 60° C., greater than 65° C., greater than 70° C., greater than 75° C., or greater than 80° C. In some embodiments, the crystallizable polymeric material has a melting temperature from 20° C. to 250° C., from 30° C. to 180° C., from 40° C. to 160° C., or from 50° C. to 140° C. In preferred embodiments, the crystallizable polymeric material has a melting temperature greater than 60° C. In preferred embodiments, the crystallizable polymeric material has a melting temperature from 80° C. to 110° C. The melting temperature of the crystallizable polymeric material can refer to the melting point of the crystalline material before polymerization, after polymerization, or a combination thereof. As a non-limiting example, a polymeric crystalline material can have a melting temperature of about 80° C. before polymerization, and after polymerization the polymerized crystalline material can have a melting temperature of about 100° C. In some embodiments of such a non-limiting examples, the melting temperature of a resin or of a cured resin refers to the melting temperature of the crystalline domains and/or the melting temperature of the resin as a whole. In preferred aspects of the present disclosure, the melting temperature refers to the melting temperature of the crystalline domains. In preferred embodiments, the polymerized crystalline material has a melting point greater than or equal to 80° C.

In some embodiments, the present disclosure provides resins comprising a crystallizable polymeric material or crystalline polymeric material and an amorphous polymeric material. In some embodiments, the crystallizable polymeric material or crystalline polymeric material can form at least one crystalline phase. In certain embodiments, the resin comprises a monomer of the crystallizable polymeric material. In some embodiments, the resin comprises a plurality of monomers of the crystallizable polymeric material, which can be polymerized to form the crystallizable polymeric material. As a non-limiting example, the resin can comprise a plurality of monomers of a crystallizable polymeric material that undergo polymerization (e.g., photopolymerization) to form the crystallizable polymeric material. In some embodiments, the crystalline phase is a semicrystalline phase, comprising both crystalline and amorphous domains.

In some embodiments, the resin comprises an amorphous polymeric material. In certain embodiments, the resin comprises a monomer of the amorphous polymeric material. In some embodiments, the resin comprises a plurality of monomers of the amorphous polymeric material, which can be polymerized to form the amorphous polymeric material. As a non-limiting example, the resin can comprise a plurality of monomers of an amorphous polymeric material that undergo polymerization (e.g., photopolymerization) to form the amorphous polymeric material.

In preferred embodiments, the amorphous polymeric material has a glass transition temperature less than 40° C. The glass transition temperature ($T_g$), as used herein, may refer to the range of temperatures over which glass transition occurs. $T_g$, in particular, characterizes the transition from a glassy state to a rubbery state, and is characterized as having a temperature range or a "leathery region." See, e.g., Modern Plastics Handbook. Harper (McGraw-Hill 2000) 1.2 and FIG. 1.1. Accordingly, "onset of the glass transition temperature" refers to a temperature at which the transition begins. Techniques are available to measure glass transition onset temperature. Techniques include, for example, Differential Scanning calorimetry (DSC), Thermo Mechanical Analysis (TMA), and Dynamic Mechanical Analysis (DMA). In some embodiments, the amorphous polymeric material has a glass transition temperature of less than 40° C., less than 30° C., less than 20° C., less than 10° C., or less than 0° C. In some embodiments, the amorphous polymeric material has a glass transition temperature from −40° C. to 40° C., from −30° C. to 30° C., from −20° C. to 20° C., or from −10° C. to 10° C. In some embodiments, the amorphous polymeric material has a glass transition temperature of less than −40° C. An amorphous material can be selected by the parameter of having a glass transition temperature less than the use temperature. In some embodiments, the amorphous material has a glass transition temperature and/or an onset temperature less than the use temperature. As a non-limiting example, if a material is tough at a use temperature of 100° C., then the amorphous polymeric material can have a glass transition temperature less than 100° C. and/or have an onset temperature of less than 100° C.

The resin can be used to form a polymeric material comprising a crystalline phase, which comprises at least one polymer crystal, the at least one polymer crystal comprising the crystallizable polymeric material or the crystalline polymeric material of the resin. In some embodiments, the crystalline phase comprises a plurality of polymer crystals, each of the plurality of crystals comprising the crystallizable polymeric material and/or the crystalline polymeric material. In some embodiments, the at least one crystal is a lamellar crystal, a spherulite, a semicrystal, a solid crystal, a liquid crystal, or any combination thereof. A semicrystalline domain comprises at least one polymer crystal comprising the crystallizable polymeric material or crystalline polymeric material, and further comprises the crystallizable polymeric material in an amorphous state. In some embodiments, the semicrystalline domain comprises a plurality of polymer crystals, each of the plurality of crystals comprising the crystallizable polymeric material and/or the crystalline polymeric material, and further comprises at least some of the crystallizable polymeric material in an amorphous state.

In some embodiments, the crystallizable polymeric material forms linear sections of the polymer chains, aligning with other linear portions of other polymeric chains as a way to form a crystal. In some embodiments, the crystallizable polymeric material forms linear sections of the polymer that aligns with different portions of the same polymeric chain, and thus forms a crystal with the polymeric material folding onto itself. In some embodiments, the crystallizable polymeric material can form both amorphous and crystalline domains. In some embodiments, the crystallizable polymeric material comprises a high weight percent of a polymer shape. In some embodiments, the polymer shape facilitates crystallization of the material. In certain embodiments, the crystallizable polymeric material comprises greater than 40 wt %, greater than 50 wt %, greater than 60 wt %, greater than 70 wt %, greater than 80 wt %, or greater than 90 wt % of polymers having a specified shape and/or oligomers having a specified shape. In some embodiments, the specified shape is linear, a star, a ring, a coil, a cycle, or another specified shape. In some embodiments, the crystallizable polymeric material comprises greater than 40 wt %, greater than 50 wt %, greater than 60 wt %, greater than 70 wt %, greater than 80 wt %, or greater than 90 wt % of linear polymers and/or linear oligomers. In some embodiments, the polymer crystal comprises greater than 40 wt %, greater than 50 wt %, greater than 60 wt %, greater than 70 wt %, greater than 80 wt %, or greater than 90 wt % of linear polymers and/or linear oligomers. In certain embodiments, the crystallizable polymeric material comprises less than or equal to 40 wt % of linear polymers and/or linear oligomers in the final cured material.

In some embodiments, the crystallizable polymeric material can have or form side chains from the main polymeric chain, and the side chains, the main polymeric chain, or both can form a crystal. In some embodiments, the crystallizable polymeric material comprises a backbone and at least one side chain. In certain embodiments, the side chain can crystallize, while the backbone is an amorphous polymer (i.e., does not crystallize in the cured polymeric material). In some embodiments, the side chain is an amorphous polymer, while the backbone can crystallize. In certain embodiments, the side chain can crystallize and the backbone can crystallize. The characteristics of the side chain crystals and the backbone crystals can be different from one another (e.g., having different melting temperatures, different flexural modulus).

In certain embodiments, crystalline domains can comprise a liquid crystalline material (i.e., a liquid crystal). Liquid crystalline materials have order to disorder temperatures. In certain embodiments, liquid crystalline domains may form different morphologies depending on the temperature. In preferred embodiments, the liquid crystalline domain comprises an ordered lattice (e.g., a liquid crystal) when at a temperature from 20° C. to 250° C., from 30° C. to 180° C., from 40° C. to 160° C., or from 50° C. to 140° C. In some embodiments, the liquid crystalline domain comprises a disordered (e.g., not crystalline) morphology when at a temperature greater than 50° C., greater than 60° C., greater than 70° C., or greater than 80° C. In some embodiments, the liquid crystalline domain comprises an ordered lattice at a use temperature, and a disordered morphology when at a temperature greater than the use temperature. As a non-limiting example, material having a use temperature of about 37° C. can have a liquid crystalline domain comprising an ordered lattice at 37° C., and a disordered morphology when warmed to greater than 37° C.

In certain circumstances, it is favorable that the crystallizable polymeric material or crystalline polymeric material is in a liquid phase at an elevated temperature. As a non-limiting example, a resin comprising polymer crystals may be viscous, and difficult to use in the fabrication of objects (e.g., using 3D printing). Polymer crystals that melt at an elevated temperature, such as the temperature of fabrication (e.g., during 3D printing) can decrease viscosity of the resin and thus make the resin more applicable for such uses. In some embodiments, the crystallizable polymeric material is a liquid when the resin is at an elevated temperature. In some embodiments, the elevated temperature is at or above the melting temperature (Tm) of the crystallizable material. In certain embodiments, the elevated temperature is a temperature in the range from 40° C. to 100° C., from 60° C. to 100° C., from 80° C. to 100° C., from 40° C. to 150° C., or from 150° C. to 350° C. In some embodiments, the elevated temperature is a temperature above 40° C., above 60° C., above 80° C., or above 100° C. In some embodiments, the crystallizable polymeric material at the elevated temperature is a liquid with a viscosity less than 50 PaS, less than 20 PaS, less than 10 PaS, less than 5 PaS, or less than 1 PaS. In preferred embodiments, the crystallizable polymeric material at the elevated temperature is a liquid with a viscosity less than 20 PaS. In more preferred embodiments, the crystallizable polymeric material at the elevated temperature is a liquid with a viscosity less than 1 PaS.

In some embodiments, at least a portion of the crystallizable polymeric material has a melting temperature below 100° C., below 90° C., below 80° C., below 70° C., or below 60° C. In some embodiments, at least a portion of the crystallizable polymeric material melts at an elevated temperature between 100° C. and 20° C., between 90° C. and 20° C., between 80° C. and 20° C., between 70° C. and 20° C., between 60° C. and 20° C., between 60° C. and 10° C., or between 60° C. and 0° C. In some embodiments, the crystallizable material at the elevated temperature is a liquid with a viscosity less than 50 PaS, less than 20 PaS, less than 10 PaS, less than 5 PaS, or less than 1 PaS.

In some embodiments, the resin has a plurality of crystallizable polymeric materials, at least some of which melt at different temperatures. In certain embodiments, at least one of the crystallizable polymeric materials melts at a temperature below 100° C., below 90° C., below 80° C., below 70° C., or below 60° C. In some embodiments, at least one of the crystallizable polymeric materials melts at an elevated temperature between 100° C. and 20° C., between 90° C. and 20° C., between 80° C. and 20° C., between 70° C. and 20° C., between 60° C. and 20° C., between 60° C. and 10° C., or between 60° C. and 0° C. In some embodiments, the crystalline domain of a resin melts at a temperature greater than 60° C., greater than 80° C., greater than 100° C., greater than 120° C., or greater than 140° C. In some embodiments, the crystallizable polymeric material at the elevated temperature is a liquid with a viscosity less than 50 PaS, less than 20 PaS, less than 10 PaS, less than 5 PaS, or less than 1 PaS. In certain embodiments, the crystallizable polymeric material at the elevated temperature is liquid in character as a whole, but comprises at least one unmelted polymer crystal or a plurality of unmelted polymer crystals (e.g., a crystallizable polymeric material can comprise a domain that melts above the melting temperature, and can also comprise a domain that remains crystalline at the same temperature). In some embodiments, the unmelted polymer crystals have a melting temperature greater than 60° C., greater than 70° C., greater than 80° C., greater than 90° C., greater than 100° C., or greater than 110° C. In some embodiments, the at least one crystallizable polymeric material melts at a temperature greater than the use temperature. As a non-limiting example, a material having a use temperature of about 37° C. can comprise at least one crystallizable polymeric material that is a crystalline at 37° C., and melts when warmed to a temperature greater than 37° C. (e.g., 60° C.). As used herein, the use temperature can be a temperature less than or equal to 20° C., from 20° C. to 40° C., or greater than or equal to 40° C. In preferred embodiments, the use temperature comprises a temperature from 20° C. to 40° C. In other preferred embodiments, the use temperature is between 50° C. and 100° C. In still other embodiments, the use temperature is between 100° C. and 150° C. In still other embodiments, the use temperature is above 150° C. In some embodiments, the resin has a melt temperature wherein at least a portion of the resin melts, and the melt temperature is less than 100° C., less than 90° C., less than 80° C., less than 70° C., less than 60° C., less than 50° C., or less than 40° C. In some embodiments, the resin has a melt temperature greater than 60° C., greater than 80° C., greater than 100° C., greater than 120° C., or greater than 140° C.

In certain embodiments, the crystallizable resin at an elevated temperature comprises at least 50%, at least 60%, at least 70%, at least 80%, at least 90%, at least 95%, or at least 99% of the crystallizable polymeric material in a liquid phase (i.e., has a melting point below said elevated temperature). In some embodiments, the crystallizable resin at 60° C. comprises at least 50%, at least 60%, at least 70%, at least 80%, at least 90%, at least 95%, or at least 99% of the crystallizable polymeric material in a liquid phase. In some embodiments, the crystallizable resin at 70° C. comprises at least 50%, at least 60%, at least 70%, at least 80%, at least 90%, at least 95%, or at least 99% of the crystallizable polymeric material in a liquid phase. In some embodiments, the crystallizable resin at 80° C. comprises at least 50%, at least 60%, at least 70%, at least 80%, at least 90%, at least 95%, or at least 99% of the crystallizable polymeric material in a liquid phase. In some embodiments, the crystallizable resin at 90° C. comprises at least 50%, at least 60%, at least 70%, at least 80%, at least 90%, at least 95%, or at least 99% of the crystallizable polymeric material in a liquid phase. In some embodiments, the crystallizable resin at 100° C. comprises at least 50%, at least 60%, at least 70%, at least 80%, at least 90%, at least 95%, or at least 99% of the crystallizable polymeric material in a liquid phase.

When the resin returns to a temperature below the elevated temperature, the crystallizable polymeric material can form polymer crystals in situ. In some embodiments, the temperature below the elevated temperature is below the melting temperature of the crystallizable material. In some embodiments, the resin is a liquid, or comprises mostly liquid, and crystals form during the polymerization or at the print temperature after polymerization of the resin. As a non-limiting example, a liquid resin can be photopolymerized, and crystals form during or shortly after polymerization of the resin at the printing temperature. In some embodiments, the polymerized resin will need to be heated, potentially above the printing temperature, to induce crystallization and/or change the crystalline form from one form to another. In certain embodiments, the polymerized resin is heated to an elevated temperature to induce crystallization and/or to change the crystalline form from one form to another. In some embodiments, the elevated temperature is a temperature greater than the printing temperature.

As disclosed further herein, the resins disclosed herein can comprise a crystallizable polymeric material, said crystallizable polymeric material comprising a crystallizable polymer, a crystallizable oligomer, and/or monomer of the crystallizable polymer or crystallizable oligomer. A monomer, as used herein, can refer to a reagent which can undergo polymerization under one or more specified conditions. A monomer reagent may comprise at least one monomer molecule, where a monomer molecule is a molecule which can undergo polymerization, thereby contributing constitutional units to the structure of a macromolecule or oligomer. In an embodiment, a monomer reagent may be represented by an average or dominant chemical structure and comprise monomer molecules having that chemical structure but may also contain components with other chemical structures. For example, a monomer reagent may comprise impurities having chemical structures other than the average or dominant structure of the reagent. An oligomer or oligomeric reagent is also a reagent which can undergo polymerization under appropriate conditions. An oligomeric reagent comprises an oligomer molecule, the oligomer molecule comprising a small plurality of units derived from molecules of lower relative molecular mass. In an embodiment, hyperbranched crosslinking reagents suitable for use with the invention may be regarded as oligomeric reagents.

In some embodiments, the crystallizable polymeric material comprises a crystallizable polymer, a crystallizable monomer, or a combination thereof. The crystallizable polymers can be homopolymers, copolymers, or mixtures of different polymers. In some embodiments, the crystallizable polymeric material can have a crystalline domain and an amorphous domain. In some embodiments, the crystallizable polymer consists of crystalline polymeric material. In certain embodiments, the crystallizable polymer comprises crystallizable polymeric material and amorphous polymeric material, which provides crystalline domains when cured.

Polymer, as used herein, can refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). In some embodiments, the distribution of molecular weights can be narrow or can be broad. Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. The term polymer also includes dendrimers, branched polymers, and crosslinked polymers. The term polymer can refer to inorganic polymers, organic polymers, or hybrid polymers. Useful polymers include organic polymers or inorganic polymers that may be in amorphous, semi-amorphous, crystalline or semi-crystalline states.

In some embodiments, the crystallizable polymeric material can be made in situ (e.g., the crystallizable polymeric material can comprise a plurality of monomers that form a crystallizable polymeric material in situ). As a non-limiting example, the crystallizable polymeric material can comprise a plurality of monomer units that undergo photopolymerization following exposure to light, such as during the creation of an object using stereolithographic 3D printing. Non-limiting examples of materials that can form a crystallizable polymeric material in situ include monomers that make a crystallizable material (e.g., crystalline monomers). In some embodiments, the crystallizable polymeric material is a crystallizable polymer that is created during polymerization of the resin. In some embodiments, the crystallizable polymeric material is a plurality of monomers that can form a crystallizable polymer. In some embodiments, the polymerization uses light (e.g., photopolymerization) and/or another mechanism (e.g., ionic polymerization, free radical polymerization, or condensation reactions). As a non-limiting example, a resin can comprise a plurality of monomers that create a crystallizable polymer when said resin is cured (e.g., photocured by exposure to light). As provided further herein, the resin can comprise additional components, but can still create a crystallizable polymer when said resin is cured. In some embodiments, the crystallizable polymeric material can exist prior to the formulation of the resin (for example, it can be a synthesized or purchased material that is used as the resin, or added to the resin). Non-limiting examples of polymeric materials that can exist prior to formation of the resin include oligomers or polymers in a resin formulation.

In some embodiments, the crystallizable polymeric material comprises a homopolymer, a linear copolymer, a block copolymer, an alternating copolymer, a periodic copolymer, a statistical copolymer, a random copolymer, a gradient copolymer, a branched copolymer, a brush copolymer, a comb copolymer, a dendrimer, or any combination thereof.

In some embodiments, the crystallizable polymeric material is a polymer comprising an aromatic ester. In some embodiments, the crystallizable polymeric material is a monomer comprising an aromatic polyester. In certain embodiments, the crystallizable polymeric material comprises greater than 10%, greater than 20%, greater than 30%, greater than 40%, greater than 50%, greater than 60%, greater than 70%, greater than 80%, greater than 90%, greater than 95%, or greater than 98% of the aromatic polyester, by weight. In certain embodiments, the aromatic ester is selected from the group consisting of a polyethylene terephthalate (PET), a polytrimethylene terepthalate (PTT), a polypropylene terephthalate (PPT), a polyhexylene terephthalate (PHT), a polyethylene naphthalate (PEN), a polyalkylene naphthalate (PAN), a polybutylene naphthalate (PBN), a polyhexylene naphthalate (PHN), a polycyclohexylenedimethylene terephthalate (PCT), a polybutylene terephthalate (PBT), any combination thereof, and any derivative thereof. In some embodiments, the aromatic ester is any aromatic ester having a regular repeat unit that crystallizes. In certain embodiments, the regular repeat unit facilitates interactions between the polar ester groups, and/or facilitates pi-stacking of the aromatic rings during the formation and/or growth of a crystal. In preferred embodiments, the crystallizable polymeric material is a polymer comprising a polyester comprising aromatic esters having at least one alkyl chain of 2 carbons, 3 carbons, 4 carbons, 5 carbons, and/or 6 carbons.

In some embodiments, the crystallizable polymeric material comprises a monomer unit comprising a naphthalate group. Exemplary monomers comprising a naphthalate group include 6,6'-bis(2-(allyloxy)ethyl) O'2,O2-(((naphthalene-2,6-dicarbonyl)bis(oxy))bis(butane-4,1-diyl)) bis (naphthalene-2,6-dicarboxylate) and bis(2-mercaptoethyl) naphthalene-2,6-dicarboxylate:

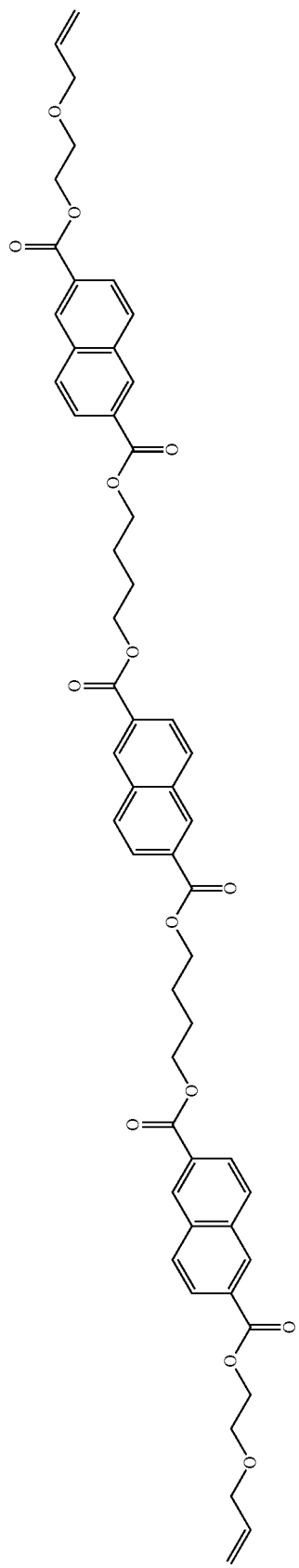
6,6'-bis(2-(allyloxy)ethyl) $O^2,O^2$-(((naphthalene-2,6-dicarbonyl)bis(oxy))bis(butane-4,1-diyl)) bis(naphthalene-2,6-dicarboxylate)
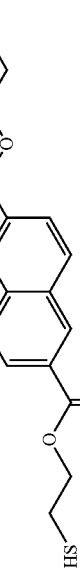
bis(2-mercaptoethyl) naphthalene-2,6-dicarboxylate In some embodiments, the crystallizable polymeric material is a block copolymer. In certain embodiments, the block copolymer comprises a polycaprolactone block and a naphthalate block. In some embodiments, the polycarprolactone has an average molecular mass from 1,000 to 15,000, from 2,000 to 13,000, from 3,000 to 10,000, from 4,000 to 8,000, or from 5,000 to 7,000. In some embodiments, the polycarpolactone has an average molecular mass from 1,000 to 15,000, from 3,000 to 15,000, from 5,000 to 15,000, from 7,000 to 15,000, or from 9,000 to 15,000. Exemplary crystallizable polymeric materials comprising a polycaprolactone and a naphthalate include Formula (I), Formula (II), Formula (III), and Formula (IV):

Formula (I)

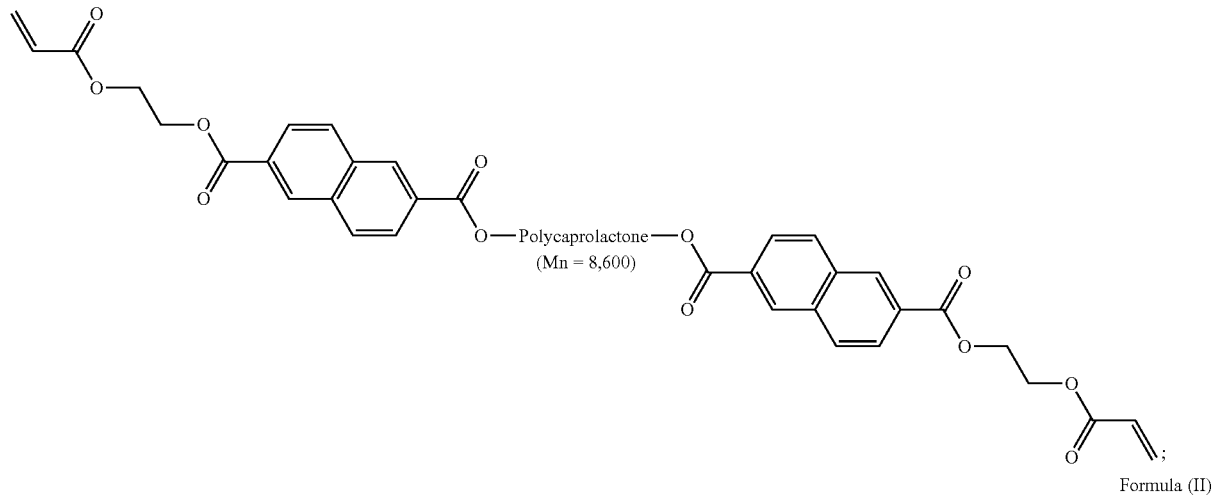

Formula (II)

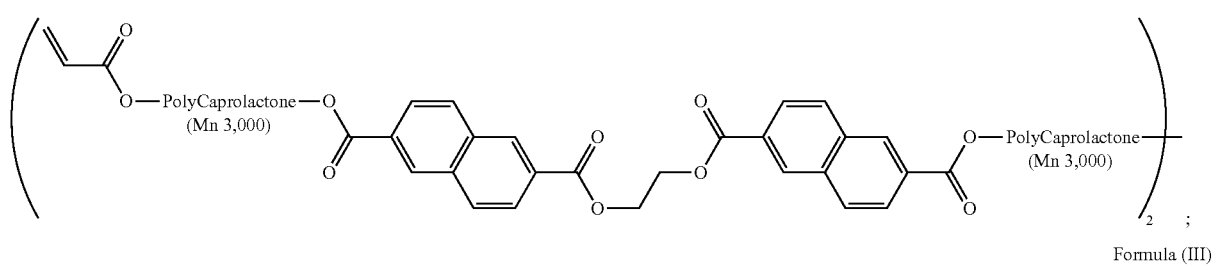

Formula (III)

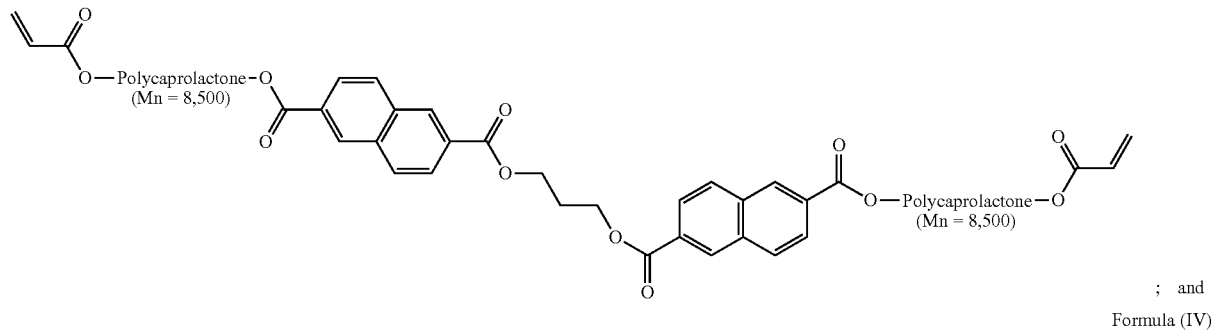

; and

Formula (IV)

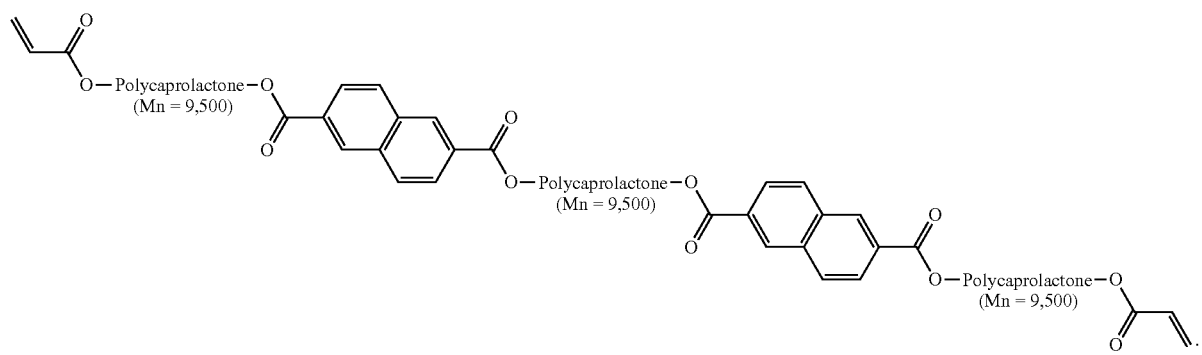

In some embodiments, the crystallizable polymeric material is a polymer comprising an aliphatic ester. In some embodiments, the crystallizable polymeric material is a monomer comprising an aliphatic ester. In certain embodiments, the crystallizable polymeric material comprises greater than 10%, greater than 20%, greater than 30%, greater than 40%, greater than 50%, greater than 60%, greater than 70%, greater than 80%, greater than 90%, greater than 95%, or greater than 98% of the aliphatic ester by unit percent. In certain embodiments, the aliphatic ester is selected from the group consisting of 1,4-cyclohexanedicarboxylate, a diethyl norbornanedicarboxylate, bicyclo[2.2.2]octane-1,4-dicarboxylate, bicyclo[3.2.2] nonane-1,5-dicarboxylate, an aliphatic ring dicarboxylate, an aliphatic chain dicarboxylate, an aliphatic ester, polycaprolactone (PLC), any combination thereof, and any derivative thereof. A non-limiting example of a crystallizable polymeric material comprising 1,4-cyclohexane dicarboxylate as an aliphatic ester includes poly(1,4-cyclohexanedimethyl-1,4-cyclohexanedicarboxylate) (PCCD). In some embodiments, the aliphatic ester is any aliphatic ester having a regular repeat unit that crystallizes. In certain embodiments, the regular repeat unit facilitates interactions between the polar ester groups, and/or facilitates packing of rigid structures within the crystallizable polymeric material during the formation and/or growth of a crystal. In some embodiments, the crystallizable polymeric material is a polymer comprising at least one aliphatic ester comprising various polycarbonate linkages, for example poly(hexamethylene carbonate) and other carbonate derivatives. In some embodiments, the crystallizable polymeric material is a polymer comprising at least one aliphatic ester comprising a cyclobutene ester.

In some embodiments, the crystallizable polymeric material is a polymer comprising an amide unit, the amide unit comprising 6, 7, 8, 9, 10, 11, 12, 13, 14, 15, 16, 17, 18, 19, 20, or greater than 20 carbons. In some embodiments, the crystallizable polymeric material is a monomer comprising an amide unit, the amide unit comprising 6, 7, 8, 9, 10, 11, 12, 13, 14, 15, 16, 17, 18, 19, 20, or greater than 20 carbons. In some embodiments, the amide unit comprises fewer than 6 carbon atoms, with the understanding that water uptake may increase with decreased carbon atoms. In certain embodiments, the crystallizable polymeric material comprises greater than 10%, greater than 20%, greater than 30%, greater than 40%, greater than 50%, greater than 60%, greater than 70%, greater than 80%, greater than 90%, greater than 95%, or greater than 98% of the amide by unit percent. In certain embodiments, the amide unit is selected from the group consisting of a terephthalamide, a $C_{6-20}$ aliphatic diamide, a $C_{6-20}$ aromatic diamide, a $C_{6-20}$ aliphatic amide, a $C_{6-20}$ aromatic amide, a nylon (e.g., nylon-6, nylon-6,6, nylon-11, or nylon-12), any combination thereof, and any derivative thereof. A non-limiting example of a crystallizable polymeric material comprising a $C_{6-20}$ aliphatic diamide as an amide unit includes nylon-6,6, which can be synthesized from a $C_6$ aliphatic diamine (hexamethylenediamine) and adipic acid, forming a $C_6$ aliphatic diamide. In some embodiments, the amide unit facilitates interactions between the polar amide groups, and/or facilitates packing of rigid structures within the crystallizable polymeric material during the formation and/or growth of a crystal.

In some embodiments, the crystallizable polymeric material comprises a rigid structure. In certain embodiments, the rigid structure comprises a biphenyl, a naphthylene, a cholesterol, any combination thereof, or any derivative thereof. In some embodiments, the rigid structure comprises a rigid diol. Non-limiting examples of rigid diols include cyclohexanedimethanol (CHDM), 2,2-Bis(4-hydroxycyclohexyl)propane (HBPA), 2,2,4,4-tetramethyl-1,3-cyclobutanediol (TMCBD), a norbornane ring (e.g., norbornane-2,3-trans-dimethanol, perhydro-1,4:5,8-dimethanonaphthalene-2,3-trans-dimethanol, or perhydro-1,4:5,8:9,10-trimethanoanthracene-2,3-trans-dimethanol), bicyclo[2.2.2]octane rings (e.g., 1,4-bis(hydroxymethyl)bicyclo [2.2.2] octane), and bicyclo[3.2.2] nonane rings (e.g., 1,5-bis(hydroxymethyl) bicyclo[3.2.2] nonane). A non-limiting example of a rigid diol in the formation of a crystallizable polymeric material includes the use of HBPA to synthesize poly[2,2-bis(4-oxycyclohexyl)propane adipate].

In some embodiments, hydrogen bonding facilitates the formation and/or growth of crystals in the crystalline or semicrystalline domain. In some embodiments, ionic bonding facilitates the formation and/or growth of crystals in the crystalline or semicrystalline domain. In certain embodiments, a low amount of hydrogen bonding is present in the crystalline or semicrystalline domain. In certain embodiments, the polymer crystals have a low amount of hydrogen bonding. The polymer crystals can have less than 15 wt %, less than 14 wt %, less than 13 wt %, less than 12 wt %, less than 11 wt %, less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % hydrogen bonding units (i.e., the combined weight of the hydrogen donor system and the hydrogen acceptor system). As a non-limiting example, the NHCO of an amide bond acts as both hydrogen donor and hydrogen acceptor; accordingly, a polymeric material comprising less than 15 wt % of the NHCO unit has less than 15 wt % hydrogen bonding units.

In some embodiments, the crystallizable polymeric material comprises at least one reactive functional group. In certain embodiments, the reactive functional groups allow for further modification of the polymeric material, such as additional polymerization. In some embodiments, the crystallizable polymeric material comprises 1, 2, 3, 4, 5, 6, 7, 8, 9, 10, or more than 10 reactive functional groups. The reactive functional groups can be the same, or they can be of different functionality. In some embodiments, the crystallizable polymeric material is a telechelic polymer (i.e., a polymer having end functionalization, wherein both ends have the same functionality). In some embodiments, the one or more functional groups are at the terminal end(s) of the crystallizable polymeric material. In some embodiments, the one or more reactive functional groups are located at positions other than the terminal end(s) of the crystallizable polymeric material (e.g., in-chain and/or pendant functional groups). In some embodiments, the crystallizable polymeric material comprises a plurality of reactive functional groups, and the reactive functional groups are located at one or both terminal ends of the crystallizable material, in-chain, at a pendant (e.g., a side group attached to the polymer backbone), or any combination thereof. In some embodiments, the plurality of reactive functional groups are the same. In other embodiments, the plurality of reactive functional groups are different from one another. In some embodiments, the plurality of reactive functional groups comprises at least two functional groups that are the same.

Non-limiting examples of reactive functional groups include free radically polymerizable functionalities, photoactive groups, groups facilitating step growth polymerization, thermally reactive groups, and/or groups that facilitate bond formation (e.g., covalent bond formation). In some embodiments, the functional groups comprise an acrylate, a methacrylate, an acrylamide, a vinyl group, a vinyl ether, a thiol, an allyl ether, a norbornene, a vinyl acetate, a maleate, a fumarate, a maleimide, an epoxide, a ring-strained cyclic ether, a ring-strained thioether, a cyclic ester, a cyclic carbonate, a cyclic silane, a cyclic siloxane, a hydroxyl, an amine, an isocyanate, a blocked isocyanate, an acid chloride, an activated ester, a Diels-Alder reactive group, a furan, a cyclopentadiene, an anhydride, a group favorable toward photodimerization (e.g., an anthracene, an acenaphthalene, and/or a coumarin), a group that photodegrades into a reactive species (e.g., Norrish Type 1 and 2 materials), an azide, a derivative thereof, or a combination thereof.

Tacticity

Control of tacticity of a polymer can lead to the production of highly crystalline polymeric materials. Such polymeric materials having tacticity can have enhanced properties over atactic polymeric materials that are otherwise the same. As provided herein, the control of tacticity and incorporation into the materials and methods described herein provide further control of the crystallizable materials disclosed herein. In some aspects, the present disclosure provides the synthesis and manufacture of monomers or oligomers that have controlled tacticity, increasing uniqueness of resin formation. Through stereoselective and tactic control, radical, ionic, and/or mixed polymerization mechanisms can be applied to access diverse material properties and expanded chemical space. In some embodiments, by controlling the degree of tacticity, the crystalline content can be tuned. As a non-limiting example, by controlling and selecting a stereocenter for a plurality of monomers in a resin, control over the backbone tacticity of the cured polymer can be achieved. Thus in some aspects, the present disclosure provides for control of crystallinity induced by using tactic components and/or components that induce tacticity. It is more favorable for the species of polymeric material to align and form a crystalline or semi-crystalline segment in a thermoset when they share stereoisomeric content and/or tacticity.

In certain embodiments, control of tacticity controls physical polymer properties, such as color or clarity of the polymeric material. In some embodiments, control of tacticity controls mechanical properties, such as tensile strength or stress relaxation. In some embodiments, control of tacticity controls thermo-polymer properties, such as melt temperature or glass transition temperature. Through control of multiple variable parameters, including tacticity, competing mechanical properties can be achieved, such as a polymeric material having high stress remaining accompanied by increased toughness, tear resistance accompanied by high stress remaining, or relatively low insertion forces accompanied by high stress remaining.

In some embodiments, the crystallizable resins described herein comprise a plurality of monomers wherein the plurality of monomers form a polymer comprising tacticity when cured, and the resin is capable of being 3D printed In some embodiments, the plurality of monomers are stereoselective. In some embodiments, the plurality of monomers are stereoselective when cured. In some embodiments, the formed polymer is a crystallizable polymeric material.

In some embodiments, the resin comprises a plurality of monomers in the form of an oligomer having tacticity. An oligomer having tacticity is an oligomer comprising an arranged order of chiral centers. In some embodiments, the resin comprises a plurality of monomers in the form of a polymer chain having tacticity. In some embodiments, the plurality of monomers are functionalized with reactive functional groups as further described herein. In some embodiments, the plurality of monomers are in the form of a polymer comprising tacticity naturally. In some embodiments, polymers comprising tacticity naturally comprise tacticity prior to a curing step. In some embodiments, the plurality of monomers comprise a common stereocenter.

In some aspects, control of crystallization in-situ corresponds with control of tacticity. In certain embodiments, control of tacticity facilitates control of crystallization. In some embodiments described herein, crystallinity is induced without the presence of high molecular weight moieties or without high melt temperature prepolymers. In some embodiments, an in situ ring opening of a stereoselective (i.e., a tacticity controlled) monomer is applied in the formation of a tactic polymer. In some embodiments, the viscosity of the uncured resin is constant throughout the print process. In some embodiments, the polymerizations described herein comprise living polymerization. In some embodiments, a polymeric material described herein, such as high molecular weight polymers (e.g., used as crystallizable material) is produced with a living polymerization.

In some embodiments, the plurality of monomers form the polymer comprising tacticity while in the presence of a chiral catalyst or a chiral co-catalyst. A chiral catalyst (also referred to herein as a tactic catalyst) or chiral co-catalyst is a catalyst or co-catalyst that facilitates the formation of chirality e.g. leading to the formation of a polymer having tacticity. In some embodiments, the plurality of monomers for the polymer comprising tacticity in the presence of a chiral coordinating photo-initiator. A chiral coordinating photo-initiator is a photo-initiator that facilitates the coordination of chirality, e.g., leading to the formation of a polymer having tacticity. In some embodiments, a specific solvent is selected to aid in control of tacticity during polymerization. In some embodiments, a specific monomer is selected to aid in control of tacticity during polymerization.

In some embodiments, the plurality of monomers comprise a chiral acrylate, a chiral methacrylate, a chiral epoxide, a chiral vinyl, a chiral thiol, or a combination thereof. In some embodiments, the plurality of monomers comprise a chiral acrylate. In some embodiments, the plurality of monomers comprise a chiral methacrylate. In some embodiments, the plurality of monomers comprise a chiral epoxide. In some embodiments, the plurality of monomers comprise a chiral vinyl. In some embodiments, the plurality of monomers comprise a chiral thiol.

In certain embodiments, the resin is a 3D printable resin comprising a plurality of monomers that, when polymerized, form a polymer chain comprising tacticity. In some embodiments, the resin comprises a chiral catalyst, a chiral co-catalyst, a chiral coordinating photo-initiator, or any combination thereof.

In some embodiments, the resin has low viscosity. In certain embodiments, the resin has a viscosity from 0.5 PaS to 20 PaS at 90° C. In some embodiments, the resin has a low melt temperature. In some embodiments, the resin comprises a melt temperature of greater than 60° C., greater than 80° C., greater than 100° C., greater than 120° C., or greater than 140° C. In some embodiments, the resin comprises a crystalline domain having a crystalline melt temperature greater than 60° C., greater than 80° C., greater than 100° C., greater than 120° C., or greater than 140° C. In some embodiments, the melt temperature is a use temperature as further described herein.

In some embodiments, the polymer comprising tacticity comprises a property of: being isotactic, being syndiotactic, having a plurality of meso diads, having a plurality of racemo diads, having a plurality of isotactic triads, having a plurality of syndiotactic triads, or having a plurality of heterotactic triads. In some embodiments, the polymer comprising tacticity comprises a property of being isotactic. In some embodiments, the polymer comprising tacticity comprises a property of being syndiotactic. In some embodiments, the polymer comprising tacticity comprises a property of having a plurality of meso diads. In some embodiments, the polymer comprising tacticity comprises a property of having a plurality of racemo diads. In some embodiments, the polymer comprising tacticity comprises a property of having a plurality of isotactic triads. In some embodiments, the polymer comprising tacticity comprises a property of having a plurality of syndiotactic triads. In some embodiments, the polymer comprising tacticity comprises a property of having a plurality of heterotactic triads.

In some embodiments, the polymer comprising tacticity is relative to the polymer backbone when cured. In certain embodiments, the plurality of monomers of the resin each comprise a ring structure and a stereocenter.

In some embodiments, the crystallizable polymeric material comprises tacticity. In some embodiments, the polymeric materials described herein comprise a tactic property. In some embodiments, the crystalline phases described herein comprise a tactic property.

In some aspects, the present disclosure provides a polymeric material comprising an amorphous phase and a crystalline phase, the crystalline phase comprising a polymer having a tactic property. In some embodiments, the tactic property comprises being isotactic, being syndiotactic, having a plurality of meso diads, having a plurality of racemeo diads, having a plurality of isotactic triads, having a plurality of syndiotactic triads, or having a plurality of heterotactic triads.

In some embodiments, the tactic polymeric material facilitates crystallinity in comparison to comparable atactic polymeric materials. In some embodiments, the polymeric material comprising the crystalline phase comprising the polymer having the tactic property has increased crystallinity compared to a comparable polymeric material comprising a comparable atactic polymer. In some embodiments, greater than 50%, greater than 60%, greater than 70%, greater than 80%, greater than 90%, greater than 95%, or greater than 99% of the crystalline phase comprises the tactic property. In some embodiments, greater than 50%, greater than 60%, greater than 70%, greater than 80%, greater than 90%, greater than 95%, or greater than 99% of the polymeric material comprises the tactic property.

In some embodiments, the polymeric material comprising the polymer having the tactic property is characterized by at least one of an elongation at break greater than or equal to 5%, a storage modulus greater than or equal to 500 MPa, a tensile modulus greater than or equal to 500 MPa, and a stress remaining greater than or equal to 0.01 MPa. In some embodiments, the polymeric material comprising the polymer having the tactic property is characterized by an elongation at break greater than or equal to 5%. In some embodiments, the polymeric material comprising the polymer having the tactic property is characterized by a storage modulus greater than or equal to 500 MPa. In some embodiments, the polymeric material comprising the polymer having the tactic property is characterized by a tensile modulus greater than or equal to 500 MPa. In some embodiments, the polymeric material comprising the polymer having the tactic property is characterized by as tress remaining greater than or equal to 0.01 MPa.

In certain embodiments, the polymeric material comprising the polymer having the tactic property is compared to a comparable polymeric material comprising a comparable atactic polymer. A comparable atactic polymer is a polymer that is otherwise the same as a tactic polymer, differing in that the tactic polymer comprises a tactic property as described herein and the atactic polymer does not have said tactic property. As a non-limiting example, an isotactic polymer formed from a plurality of stereopure chiral epoxides (i.e., a polymer having a tactic property) can be compared to an atactic polymer formed from a plurality of otherwise-comparable epoxides as an isomeric mixture (i.e., an atactic polymer). In some embodiments, a comparable polymeric material comprising an atactic polymer comparable to the polymer having the tactic property is characterized by at least one of an elongation at break less than 5%, a storage modulus less than 500 MPa, a tensile modulus less than 500 MPa, and a stress remaining less than 0.01 MPa. In some embodiments, the comparable polymeric material comprising an atactic polymer comparable to the polymer having the tactic property is characterized by an elongation at break less than 5%. In some embodiments, the comparable polymeric material comprising an atactic polymer comparable to the polymer having the tactic property is characterized by a storage modulus less than 500 MPa. In some embodiments, the comparable polymeric material comprising an atactic polymer comparable to the polymer having the tactic property is characterized by a tensile modulus less than 500 MPa. In some embodiments, the comparable polymeric material comprising an atactic polymer comparable to the polymer having the tactic property is characterized by as tress remaining less than 0.01 MPa.

In some embodiments, the polymeric material is cross-linked. In some embodiments, the polymeric material is a thermoset or a thermoplastic. In some embodiments, the polymeric material comprises semi-crystalline segments.

In some aspects, the present disclosure provides a method of forming a cured polymeric material, the method comprising: providing a resin as described herein; and curing the resin, thereby forming a cured polymeric material comprising tacticity.

In some embodiments, the method further comprises fabricating an object with the cured polymeric material. In certain embodiments, the fabricating comprises additive manufacturing, as further described herein. In some embodiments, the fabricating comprises printing the resin with a 3D printer. In some embodiments, the fabricating comprises stereolithography, digital light processing, two photon-induced photopolymerization, inkjet printing, multijet printing, fused deposition modeling, or any combination thereof.

In some embodiments, a plurality of monomers as described further herein are incorporated into the cured polymeric material during the curing step. In some embodiments, the plurality of monomers are incorporated into the cured polymeric material following the curing step. In certain embodiments, curing the resin comprises exposure to a light source. In some embodiments, curing the resin comprises radical curing, ionic curing, or a combination thereof.

In some embodiments, curing the resin forms a polymeric material comprising an interpenetrated network comprising the polymer comprising tacticity. In certain embodiments, the tacticity is formed during the curing step. In some embodiments, the tacticity is formed after the curing step. In some embodiments, the curing step facilitates the formation of tacticity. In some embodiments, the plurality of monomers have tacticity. In certain embodiments, the method further comprises synthesizing and purifying the plurality of monomers.

In some embodiments, curing the resin comprises polymerizing the plurality of monomers. In some embodiments, polymerizing the plurality of monomers comprises a plurality of ring-opening reactions. In some embodiments, the method further comprises controlling crystallinity of the cured polymeric material by controlling the relative amount of the plurality of monomers. In some embodiments, the cured polymeric material comprises the polymeric materials described further herein.

In certain embodiments, the crystallizable polymeric material has repeating units, wherein greater than 50%, greater than 60%, greater than 70%, greater than 80%, greater than 90%, greater than 95%, or greater than 99% of the repeating units have tacticity. In some embodiments, the crystallizable polymeric material is isotactic. In some embodiments, the crystallizable polymeric material is syndiotactic. In some embodiments, the crystallizable polymeric material comprises a plurality of diads (e.g., meso diads or racemo diads), a plurality of triads (e.g., isotactic triads, heterotactic triads, or syndiotactic triads), a plurality of tetrads, a plurality of pentads, or a plurality of greater than 5 repeating units having a stereochemical pattern. In some embodiments, the repeating units comprise a side chain as further described herein.

Figure 5:
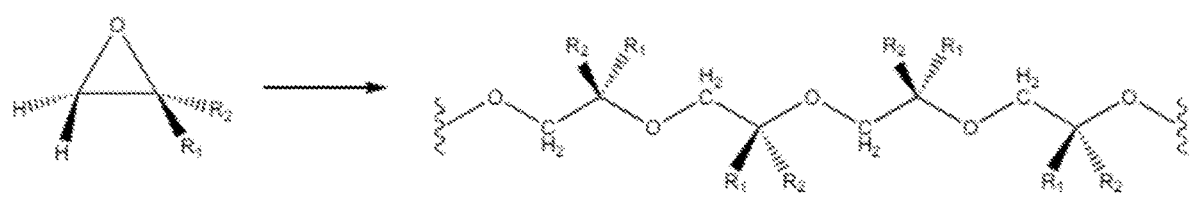
FIG. 5 shows an example polymerization forming a crystallizable polymer having tacticity.

In some embodiments, the resin comprises a plurality of monomers that, when polymerized, form a tactic polymer chain as described herein. FIG. 5 provides a non-limiting example of a monomer that, when polymerized, forms a tactic polymer chain. The chiral epoxide monomer of FIG. 5 can be polymerized (e.g., by ionic curing) to form the resulting polymer chain, having a defined tacticity (forming an isotactic polymer). In some embodiments, the tactic (e.g., isotactic or syndiotactic) polymer has more rigidity and crystallinity than the same polymer chain lacking the defined tacticity. As a non-limiting example, turning to FIG. 5, the tactic polymer chain has higher crystallinity than a comparable polymer chain formed from a plurality of monomers having varying stereocenters. In some embodiments, a polymer with a tacticity that leads to crystallinity is formed from a plurality of monomers having one chirality. In certain embodiments, the plurality of monomers are free radically polymerized monomers. In some embodiments, the plurality of monomers are ionic monomers. In some embodiments, polymerization is performed in the presence of a catalyst that induces tacticity during polymerization. In some embodiments, a catalyst that induces tacticity is a coordinating species having a specific chirality. In some embodiments, such a catalyst is used during the polymerization step during 3D printing. In some embodiments, a tactic polymer is made as a tactic oligomer or a tactic polymer before 3D printing and is added to the resin as a polymerizable polymer or oligomer. In some embodiments, the crystallizable tactic polymer comprises one or more blocks in a block copolymer. Exemplary embodiments of tacticity include the disclosures of *J. Am. Chem. Soc.* 1992, 114, 7676-7683, *J. Am. Chem. Soc.* 2003, 125, 6986-6993, and *J. Polym. Sci. Pol. Chem.* 2006, 44, 6147-6158, each of which are incorporated herein in their entireties.

Amorphous Polymeric Material

In some embodiments, the present disclosure provides resins comprising crystallizable polymeric material and an amorphous polymeric material. The amorphous polymeric material can provide materials having fast response times, which confer favorable properties to the polymeric materials comprising the crystalline phase and the amorphous phase. The amorphous material can, for example, provide flexibility to the cured polymeric material, which can increase its durability (e.g., the material can be stretched or bent while retaining its structure, while a similar material without the amorphous material can crack). In certain embodiments, the resins comprise an amorphous polymeric material and a polymer crystal. The amorphous polymeric material can form amorphous phases, which can be characterized by randomly oriented polymer chains (e.g., not stacked in parallel or in crystalline structures). In some embodiments, the amorphous polymeric material can form at least one amorphous phase. In some embodiments, the amorphous polymeric material has a glass transition temperature of less than 40° C., less than 30° C., less than 20° C., less than 10° C., or less than 0° C. In some embodiments, the amorphous polymeric material has a glass transition temperature from −40° C. to 40° C., from −30° C. to 30° C., from −20° C. to 20° C., or from −10° C. to 10° C. In some embodiments, the amorphous polymeric material has a glass transition temperature greater than 40° C., from 40° C. to 60° C., from 40° C. to 80° C., from 40° C. to 100° C., greater than 100° C. In some embodiments, the glass transition temperature of the amorphous material is less than the use temperature. In certain embodiments, the amorphous polymeric material has a glass transition temperature less than or equal to −40° C. or less than −60° C.

The amorphous phase comprises the amorphous polymeric material in an amorphous state. In some embodiments, the amorphous phase (also referred to herein as the amorphous domain) comprises at least 5% amorphous polymeric material, at least 10% amorphous polymeric material, at least 20% amorphous polymeric material, at least 30% amorphous polymeric material, at least 40% amorphous polymeric material, at least 50% amorphous polymeric material, at least 60% amorphous polymeric material, at least 70% amorphous polymeric material, at least 80% amorphous polymeric material, or at least 90% amorphous polymeric material in an amorphous state. The percentage of amorphous polymeric material in an amorphous state refers to total volume percent. An amorphous state is characterized by a lack of order (e.g., without polymer chain stacking) and increased randomness.

In some embodiments, the amorphous polymeric material comprises an amorphous polymer and/or an amorphous monomer that forms amorphous polymers. In some embodiments, the amorphous polymeric material comprises a homopolymer, a linear copolymer, a block copolymer, an alternating copolymer, a periodic copolymer, a statistical copolymer, a random copolymer, a gradient copolymer, a branched copolymer, a brush copolymer, a comb copolymer, a dendrimer, or any combination thereof. In certain embodiments, the amorphous polymeric material comprises a random copolymer. In some embodiments, the amorphous polymeric material comprises poly(ethylene) glycol (PEG), poly(ethylene) glycol diacrylate, PEG-THF, polytetrahydrofuran, poly(tert-butyl acrylate), poly(ethylene-co-maleic anhydride), any derivative thereof, or any combination thereof. In some embodiments, the amorphous polymeric material is selected from the group consisting of poly(ethylene) glycol (PEG), poly(ethylene) glycol diacrylate, PEG-THF, polytetrahydrofuran, poly(tert-butyl acrylate), poly(ethylene-co-maleic anhydride), any derivative thereof, or any combination thereof. Crystalline materials can be amorphous when created in conditions that prevent crystallization, and therefore even materials normally considered crystalline can be used in the amorphous state. As a non-limiting example, polycaprolactone is a crystalline polymer, but when mixed with other monomers and polymers, the crystals may not form and thus form amorphous phases.

In some embodiments, the amorphous polymeric material comprises an acrylic monomer, an acrylamide, a methacrylamide, an acrylonitrile, a bisphenol acrylic, a carbohydrate, a fluorinated acrylic, a maleimide, an acrylate, 4-acetoxyphenethyl acrylate, acryloyl chloride, 4-acryloylmorpholine, 2-(acryloyloxy)ethyl]trimethylammonium chloride, 2-(4-benzoyl-3-hydroxyphenoxy)ethyl acrylate, benzyl 2-propylacrylate, butyl acrylate, tert-butyl acrylate, 2[[(butylamino) carbonyl]oxy]ethyl acrylate, tert-butyl 2-bromoacrylate, 2-carboxyethyl acrylate, 2-chloroethyl acrylate, 2-(diethylamino)ethyl acrylate, di(ethylene glycol) ethyl ether acrylate, 2-(dimethylamino)ethyl acrylate, 3-(dimethylamino) propyl acrylate, dipentaerythriol penta-/hexa-acrylate, ethyl acrylate, 2-ethylacryloyl chloride, ethyl 2-(bromomethyl) acrylate, ethyl cis-(beta-cyano)acrylate, ethylene glycol dicyclopentenyl ether acrylate, ethylene glycol methyl ether acrylate, ethylene glycol phenyl ether acrylate, ethyl 2-ethylacrylate, 2-ethylexyl acrylate, ethyl 2-propylacrylate, ethyl 2-(trimethylsilylmethyl)acrylate, hexyl acrylate, 4-hydroxybutyl acrylate, 2-hydroxyethyl acrylate, 2-hydroxy-3-phenoxypropyl acrylate, hydroxypropyl acrylate, isobornyl acrylate, isobutyl acrylate, isodecyl acrylate, isooctyl acrylate, lauryl acrylate, methyl 2-acetamidoacrylate, methyl acrylate, a methylene malonate (e.g., dibutyl methylene malonate, dihexyl methylene malonate, or dicyclohexyl methylene malonate), a methylene malonate macromerer (e.g, a polyester of 2-methylenemalonate such as Forza B3000 XP), methyl α-bromoacrylate, methyl 2-(bromomethyl)acrylate, methyl 2-(chloromethyl)acrylate, methyl 3-hydroxy-2-methylenebutyrate, methyl 2-(trifluoromethyl) acrylate, octadecyl acrylate, pentabromobenzyl acrylate, pentabromophenyl acrylate, pentafluorophenyl acrylate, poly(ethylene glycol) diacrylate, poly(ethylene glycol) methyl ether acrylate, poly(propylene glycol) acrylate, epoxidized soybean oil acrylate, 3-sulfopropyl acrylate, tetrahydrofuryl acrylate, 2-tetrahydropyranyl acrylate, 3-(trimethoxysilyl)propyl acrylate, 3,5,5-trimethylhexyl acrylate, 10-undecenyl acrylate, urethane acrylate, urethane acrylate methacrylate, tricylcodecane diacrylate, isobornyl acrylate, a methacrylate,allyl methacrylate, benzyl methacrylate, (2-boc-amino)ethyl methacrylate, tert-butyl methacrylate, 9H-carbazole-9-ethylmethacrylate, 3-chloro-2-hydroxypropyl methacrylate, cyclohexyl methacrylate, 1,10-decamethylene glycol dimethacrylate, ethylene glycol dicyclopentenyl ether methacrylate, ethylene glycol methyl ether methacrylate, 2-ethylhexyl methacrylate, furfuryl methacrylate, glycidyl methacrylate, glycosyloxyethyl methacrylate, hexyl methacrylate, hydroxybutyl methacrylate, 2-hydroxy-5-N-methacrylamidobenzoic acid, isobutyl methacrylate, methacryloyl chloride, methyl methacrylate, mono-2-methacryloyloxy)ethyl succinate, 2-N-morpholinoethyl methacrylate, 1-naphthyl methacrylate, pentabromophenyl methacrylate, phenyl methacrylate, pentabromophenyl methacrylate, TEMPO methacrylate, 3-sulfopropyl methacrylate, triethylene glycol methyl ether methacrylate, 2-[(1',1',1'-trifluoro-2'-(trifluoromethyl)-2'0hydroxy)propyl]-3-norbornyl methacrylate, 3,3,5-trimethylcyclohexyl methacrylate, (trimethylsilyl)methacrylate, vinyl methacrylate, isobornyl methacrylate, bisphenol A dimethacrylate, an Omnilane OC, tert-butyl acrylate, isodecyl acrylate, tricylcodecane diacrylate, a polyfunctional acrylate, N,N'-methylenebisacrylamide, 3-(acryloyloxy)-2-hydroxypropyl) methacrylate, bis[2-(methacryloyloxy)ethyl] phosphate, 1,3-butanediol diacrylate, 1,4-butanediol diacrylate, diurethane dimethacrylate, N,N'-ethylenebis(acrylamide), glycerol 1,3-diglycerolate diacrylate, 1,6-hexanediol diacrylate, hydroxypivalyl hydroxypivalate bis[6-(acryloyloxy)hexanoate], neopentyl glycol diacrylate, pentaerythritol diacrylate, 1,3,6-triacryloyl hexahydro-1,3,5-triazine, trimethlolpropane ethoxylate, tris[2-(acryloyloxy)ethyl] isocyanurate, any derivative thereof, or a combination thereof. In some embodiments, the amorphous polymeric material comprises a thiol monomer and/or an alkene, and can be used to create a polymer from a thiol-ene reaction. Non-limiting examples of thiols that can be used in the amorphous polymeric material include an aliphatic thiol, an aliphatic thiol having functionality of 2 or greater, an alkyl thiol, or an alkyl thiol having a functionality of 2 or greater. Non-limiting examples of alkenes that can be used in the amorphous polymeric material include acrylates, methacrylates, allyl ethers, vinyl ethers, norbornenes, maleates, fumarates, vinyl esters, silyl enes, alkylenes, a combination thereof, or a derivative thereof. In some embodiments, the alkylene has a functionality of greater than 2.

In some embodiments, the amorphous polymeric material comprises at least one reactive functional group. In certain embodiments, the reactive functional groups allow for further modification of the polymeric material, such as additional polymerization. In some embodiments, the amorphous polymeric material comprises 1, 2, 3, 4, 5, 6, 7, 8, 9, 10, or more than 10 reactive functional groups. The reactive functional groups can be the same, or they can be of different functionality. In some embodiments, the amorphous polymeric material is a telechelic polymer (i.e., a polymer having end functionalization, wherein both ends have the same functionality). In some embodiments, the one or more functional groups are at the terminal end(s) of the amorphous polymeric material. In some embodiments, the one or more reactive functional groups are located at positions other than the terminal end(s) of the amorphous polymeric material (e.g., in-chain and/or pendant functional groups). In some embodiments, the amorphous polymeric material comprises a plurality of reactive functional groups, and the reactive functional groups are located at one or both terminal ends of the amorphous material, in-chain, at a pendant (e.g., a side group attached to the polymer backbone), or any combination thereof. In some embodiments, the plurality of reactive functional groups are the same. In other embodiments, the plurality of reactive functional groups are different from one another. In some embodiments, the plurality of reactive functional groups comprises at least two functional groups that are the same.

Non-limiting examples of reactive functional groups include free radically polymerizable functionalities, photoactive groups, groups facilitating step growth polymerization, thermally reactive groups, and/or groups that facilitate bond formation (e.g., covalent bond formation). In some embodiments, the functional groups comprise an acrylate, a methacrylate, an acrylamide, a vinyl group, a vinyl ether, a thiol, an allyl ether, a norbornene, a vinyl acetate, a maleate, a fumarate, a maleimide, an epoxide, a ring-strained cyclic ether, a ring-strained thioether, a cyclic ester, a cyclic carbonate, a cyclic silane, a cyclic siloxane, a hydroxyl, an amine, an isocyanate, a blocked isocyanate, an acid chloride, an activated ester, a Diels-Alder reactive group, a furan, a cyclopentadiene, an anhydride, a group favorable toward photodimerization (e.g., an anthracene, an acenaphthalene, or a coumarin), a group that photodegrades into a reactive species (e.g., Norrish Type 1 and 2 materials), an azide, a derivative thereof, or a combination thereof.

Additional Resin Components

In some embodiments, the resin further comprises an initiator. In some embodiments, the initiator is a photoinitiator. In some embodiments, photoinitiators may be useful for various purposes, including for curing of polymers, including those that can be activated with light and initiate polymerization of the polymerizable components of the formulation. In embodiments, the photoinitiator is a radical photoinitiator and/or a cationic initiator. In some embodiments, the initiator comprises a photobase generator. In some embodiments, the photoinitiator is a Type I photoinitiator which undergoes a unimolecular bond cleavage to generate free radicals. In an additional embodiment the photoinitiator is a Type II photoinitiator which undergoes a bimolecular reaction to generate free radicals. Common Type I photoinitiators include, but are not limited to benzoin ethers, benzil ketals, α-dialkoxy-acetophenones, α-hydroxy-alkyl phenones and acyl-phosphine oxides. Common Type II photoinitiators include benzophenones/amines and thioxanthones/amines. Cationic initiators include aryldiazonium, diaryliodonium, and triarylsulfonium salts. In some embodiments, the initiator is a thermal initiator. In some embodiments, the resin comprises more than one initiator (e.g., 2, 3, 4, 5, or more than 5 initiators). In some embodiments, the photoinitiator initiates photopolymerization using light energy. In certain embodiments, the photoinitiator initiates photopolymerization with exposure to light energy from 800 nm to 250 nm, from 800 nm to 350 nm, from 800 nm to 450 nm, from 800 nm to 550 nm, from 800 nm to 650 nm, from 600 nm to 250 nm, from 600 nm to 350 nm, from 600 nm to 450 nm, or from 400 nm to 250 nm. In some embodiments, the photoinitiator initiates photopolymerization following absorption of two photons, which can use longer wavelengths of light to initiate the photopolymerization.

In certain embodiments, the resin comprises a crystallizable polymer. In some embodiments, the resin comprises monomers that form a crystallizable polymer. In certain embodiments, the resin comprises monomers that form a crystallizable polymer after curing (also referred to herein as crystallizable monomers). In some embodiments, the resin comprises both a crystallizable polymer and monomers that form a crystallizable polymer after curing. In specific embodiments, the resin comprises a crystallizable polymer and/or monomers that form a crystallizable polymer after curing, and a photoinitiator. In some embodiments, the resin further comprises a linking monomer and/or a modifying polymer.

Linking monomers are monomers that can link to a crystallizable polymer, a crystallizable monomer, and/or a modifying polymer. These linking monomers can link to the crystallizable polymer, crystallizable monomer, and/or modifying polymer following reaction (e.g., a reaction initiated by curing the resin). The linking monomers can comprise qualities similar to the crystallizable polymer or crystallizable monomer in order to promote crystal size and/or growth. The linking monomers can also comprise qualities similar to the crystallizable polymer or crystallizable monomer in order to facilitate interactions between the crystallizable polymers or crystallizable monomers in the crystalline domain. The linking monomers can comprise qualities selected to adjust properties of the resin. As non-limiting examples, linking monomers can be added to the resin to decrease viscosity of the resin, facilitate crosslinking between polymers, extend chains of polymers, form separate phases and driving phase separation, increase toughness, modify the glass transition temperature (Tg) of the crystallizable polymer material, modify the melting point temperature (Tm) of the crystallizable polymer material, modify the Tg of the amorphous polymeric material, modify the Tg and/or Tm of the resin, solubilize the crystallizable polymeric material, or adjust refractive index of amorphous regions.

The linking monomers can be monofunctional, difunctional, trifunctional, or can be multifunctional with greater than 3 functional groups. In certain embodiments, the linking monomers have 1 reactive functional group, 2 reactive functional groups, 3 reactive functional groups, 4 reactive functional groups, 5 reactive functional groups, 6 reactive functional groups, 7 reactive functional groups, 8 reactive functional groups, or greater than 8 reactive functional groups. In some embodiments, the reactive functional groups are the same. In some embodiments, the reactive functional groups comprise more than one type of functional group. In certain embodiments, the reactive functional groups are different.

In some embodiments, more than one type of monomer is used in order to form the linking monomer. As a non-limiting example, methyl methacrylate and vinyl ether can be combined in order to form a linking monomer component. As another non-limiting example, methyl acrylate and ethylene glycol diglycidyl ether can be combined in order to form the linking monomer component. In certain embodiments, 1 type of monomer is used, 2 types of monomers are used, 3 types of monomers are used, 4 types of monomers are used, 5 types of monomers are used, or more than 5 types of monomers are used to form the linking monomer component.

In some embodiments, the linking monomer comprises a monomer selected from the group consisting of methacrylates, acrylamides, vinyl monomers, vinyl ethers, thiols, allyl ethers, norbornenes, vinyl acetates, maleates, fumarates, maleimides, epoxides, ring-strained cyclic ethers, ring-strained thioethers, cyclic esters, cyclic carbonates, cyclic silanes, cyclic siloxanes, hydroxyl monomers, amine monomers, isocyanate monomers, blocked isocyanates, acid chloride monomers, activated ester monomers, furans, cyclopentadiene, anhydrides, monomers comprising Diels-Alder reactive groups (e.g., monomers comprising a diene and/or a dienophile), any derivative thereof, and any combination thereof. Ring-strained cyclic monomers are understood to be those comprising a cyclic ring having a ring size of five or less (i.e., having five or fewer atoms of the ring structure).

Modifying polymers are polymers that are used to modify the properties of the resin and/or to modify the properties of the cured material formed with the resin. In some embodiments, the modifying polymer is not crystallizable and/or is not crystalline. In certain embodiments, the modifying polymer comprises reactive functional groups. In other embodiments, the modifying polymer does not comprise reactive functional groups. In some embodiments, modifying polymers can facilitate the solubilization of crystallizable polymeric material, can aid in controlling crystal size and/or the crystalline domain size, can cause phase separation before, during, or after curing of the resin to form a material, can increase the viscosity of the resin, can decrease the viscosity of the resin, can modify the glass transition temperature of the material produced from the cured resin, can increase the toughness of the material produced from the cured resin, can increase the rate of gelation of the resin, can interact with the crystallizable polymeric material, can interact with the amorphous polymeric material, can modify the refractive index of the amorphous regions, can interface between crystalline domains and surrounding areas (such as amorphous domains), or any combination thereof.

In certain embodiments, the modifying polymer is amorphous, and at least a portion of the modifying polymer is similar to the crystallizable polymeric material. The similarity to the crystallizable polymeric material can facilitate interactions between the modifying polymer and the crystallizable polymeric material. In some embodiments, the modifying polymer is crystallizable when in other systems (e.g., when not in a mixture or when part of other resins not disclosed herein), but remain amorphous in the resins disclosed herein. In certain embodiments, the modifying polymer is crystallizable but remains at least 50% amorphous, at least 60% amorphous, at least 70% amorphous, at least 80% amorphous, at least 90% amorphous, at least 95% amorphous, or at least 99% amorphous (percentage determined by number of monomeric units not in crystalline form, which can be measured, e.g., by X-ray diffraction) in the resins disclosed herein. As a non-limiting example, poly (butylene terephthalate) is typically crystalline as a neat material, but when mixed with other materials the percentage crystallinity drops and it can even become completely amorphous.

In some embodiments, the resin further comprises a thermal initiator, a polymerization catalyst, a polymerization inhibitor, a light blocker, a plasticizer, a solvent, a surface energy modifier (e.g., a mold releasing agent), a pigment, a dye, a filler, a crystallization seed, a crystallization catalyst, a biologically significant chemical, or any combination thereof.

In some embodiments, the resin comprises a thermal initiator. In some embodiments, the thermal initiator comprises an azo compound, an inorganic peroxide, an organic peroxide, or any combination thereof. In some embodiments, the thermal initiator is selected from the group consisting of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy) cyclohexane, 2,5-bis(tert-butylperoxy_2,5-dimethylhexane, 2,5-bis(tert-butylperoxy)-2,5-dimethyl-3-hexyne, bis(1-(tert-butylperoxy)-3,3,5-trimethylcyclohexane, tert-butyl hydroxyperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, a derivative thereof, and a combination thereof. In some embodiments, the thermal initiator comprises a thermal acid generator or a thermal base generator.

In some embodiments, the resin comprises a polymerization catalyst. In some embodiments, the polymerization catalyst comprises a tin catalyst, a platinum catalyst, a rhodium catalyst, a titanium catalyst, a silicon catalyst, a palladium catalyst, a metal triflate catalyst, a boron catalyst, a bismuth catalyst, or any combination thereof. Non-limiting examples of a titanium catalyst include di-n-butylbutoxychlorotin, di-n-butyldiacetoxytin, di-n-butyldilauryltin, dimethyldineodecanoatetin, dioctyldilauryltin, tetramethyltin, and dioctylbis(2-ethylhexylmaleate)tin. Non-limiting examples of a platinum catalyst include platinum-divinyltetramethyl-disiloxane complex, platinum-cyclovinylmethyl-siloxane complex, platinum-octanal complex, and platinum carbonyl cyclovinylmethylsiloxane complex. A non-limiting example of a rhodium catalyst includes tris(dibutylsulfide) rhodium trichloride. Non-limiting examples of a titanium catalyst includes titanium isopropoxide, titanium 2-ethyl-hexoxide, titanium chloride triisopropoxide, titanium ethoxide, and titanium diisopropoxide bis(ethylacetoacetate). Non-limiting examples of a silicon catalyst include tetramethylammonium siloxanolate and tetramethylsilylmethyltrifluoromethanesulfonate. A non-limiting example of a palladium catalyst includes tetrakis(triphenylphosphine) palladium(0). Non-limiting examples of a metal triflate catalyst include scandium trifluoromethanesulfonate, lanthanum trifluoromethanesulfonate, and ytterbium trifluoromethanesulfonate. A non-limiting example of a boron catalyst includes tris(pentafluorophenyl)boron. Non-limiting examples of a bismuth catalyst include bismuth-zinc neodecanoate, bismuth 2-ethylhexanoate, a metal carboxylate of bismuth and zinc, and a metal carboxylate of bismuth and zirconium.

In some embodiments, the resin comprises a polymerization inhibitor in order to stabilize the composition and prevent premature polymerization. In some embodiments, the polymerization inhibitor is a photopolymerization inhibitor (e.g., oxygen). In some embodiments, the polymerization inhibitor is a phenolic compound (e.g., BHT). In some embodiments, the polymerization inhibitor is a stable radical (e.g., 2,2,4,4-tetramethylpiperidinyl-1-oxy radical, 2,2-diphenyl-1-picrylhydrazyl radical, galvinoxyl radical, or triphenylmethyl radical). In some embodiments, more than one polymerization inhibitor is present in the resin. In some embodiments, the polymerization inhibitor acts as a radical scavenger. In certain embodiments, the polymerization inhibitor is an antioxidant, a hindered amine light stabilizer (HAL), a hindered phenol, or a deactivated radical (e.g., a peroxy compound). In some embodiments, the polymerization inhibitor is selected from the group consisting of 4-tert-butylpyrocatechol, tert-butylhydroquinone, 1,4-benzoquinone, 6-tert-butyl-2,4-xylenol, 2-tert-butyl-1,4-benzoquinone, 2,6-di-tert-butyl-p-cresol, 2,6-di-tert-butylphenol, 1,1-diphenyl-2-picrylhydrazyl free radical, hydroquinone, 4-methoxyphenol, phenothiazine, any derivative thereof, and any combination thereof.

In some embodiments, the resin comprises a light blocker in order to dissipate UV radiation. In some embodiments, the light blocker absorbs a specific UV energy value and/or range. In some embodiments, the light blocker is a UV light absorber, a pigment, a color concentrate, or an IR light absorber. In some embodiments, the light blocker comprises a benzotriazole (e.g., 2-(2'-hydroxy-phenyl benzotriazole), a hydroxyphenyltriazine, an oxanilide, a benzophenone, or a combination thereof.

In some embodiments, the resin comprises a filler. In some embodiments, the filler comprises calcium carbonate (i.e., chalk), kaolin, metakolinite, a kaolinite derivative, magnesium hydroxide (i.e., talc), calcium silicate (i.e., wollastonite), a glass filler (e.g., glass beads, short glass fibers, or long glass fibers), a nanofiller (e.g., nanoplates, nanofibers, or nanoparticles), a silica filler (e.g., a mica, silica gel, fumed silica, or precipitated silica), carbon black, dolomite, barium sulfate, ATH $Al(OH)_3$, MDH $Mg(OH)_2$, diatomaceous earth, magnetite, halloysite, zinc oxide, titanium dioxide, cellulose, lignin, a carbon filler (e.g., chopped carbon fiber or carbon fiber), a derivative thereof, or a combination thereof.

In some embodiments, the resin comprises a pigment, a dye, or a combination thereof. A pigment can be a suspended solid that may be insoluble in the resin. A dye can be dissolved in the resin. In some embodiments, the pigment comprises an inorganic pigment. In some embodiments, the inorganic pigment comprises an iron oxide, barium sulfide, zinc oxide, antimony trioxide, a yellow iron oxide, a red iron oxide, ferric ammonium ferrocyanide, chrome yellow, carbon black, or aluminum flake. In some embodiments, the pigment comprises an organic pigment. In some embodiments, the organic pigment comprises an azo pigment, an anthraquinone pigment, a copper phthalocyanine (CPC) pigment (e.g., phthalo blue or phthalo green) or a combination thereof. In some embodiments, the dye comprises an azo dye (e.g., a diarylide or Sudan stain), an anthraquinone (e.g., Oil Blue A or Disperse Red 11), or a combination thereof.

In some embodiments, the resin comprises a surface energy modifier. In some embodiments, the surface energy modifier can aid the process of releasing a polymer from a mold. In some embodiments, the surface energy modifier can act as an antifoaming agent. In some embodiments, the surface energy modifier comprises a defoaming agent, a deairation agent, a hydrophobization agent, a leveling agent, a wetting agent, or an agent to adjust the flow properties of the resin. In some embodiments, the surface energy modifier comprises an aloxylated surfactant, a silicone surfactant, a sulfosuccinate, a fluorinated polyacrylate, a fluoropolymer, a silicone, a star-shaped polymer, an organomodified silicone, or any combination thereof.

In some embodiments, the resin comprises a plasticizer. A plasticizer can be a nonvolatile material that can reduce interactions between polymer chains, which can decrease glass transition temperature, melt viscosity, and elastic modulus. In some embodiments, the plasticizer comprises a dicarboxylic ester plasticizer, a tricarboxylic ester plasticizer, a trimellitate, an adipate, a sebacate, a maleate, or a bio-based plasticizer. In some embodiments, the plasticizer comprises a dicarboxylic ester or a tricarboxylic ester comprising a dibasic ester, a phthalate, bis(2-ethylhexyl) phthalate (DEHP), bis(2-propylheptyl) phthalate (DPHP), diisononyl phthalate (DINP), di-n-butyl phthalate (DBP), butyl benzyl phthalate (BBzP), diisodecyl phthalate (DIDP), dioctyl phthalate (DOP), diisooctyl phthalate (DIOP), diethyl phthalate (DEP), diisobutyl phthalate (DIBP), di-n-hexyl phthalate, a derivative thereof, or a combination thereof. In some embodiments, the plasticizer comprises a trimellitate comprising trimethyl trimellitate (TMTM), tri-(2-ethylhexyl) trimellitate (TEHTM), tri-(n-octyl,n-decyl) trimellitate (ATM), tri-(heptyl,nonyl) trimellitate (LTM), n-octyl trimellitate (OTM), trioctyl trimellitate, a derivative thereof, or a combination thereof. In some embodiments, the plasticizer comprises an adipate comprising bis(2-ethylhexyl) adipate (DEHA), dimethyl adipate (DMAD), monomethyl adipate (MMAD), dioctyl adipate (DOA), Bis[2-(2-butoxyethoxy)ethyl] adipate, dibutyl adipate, diisobutyl adipate, diisodecyl adipate, a derivative thereof, or a combination thereof. In some embodiments, the plasticizer comprises a sebacate comprising dibutyl sebacate (DBS), Bis(2-ethylhexyl) sebacate, diethyl sebacate, dimethyl sebacate, a derivative thereof, or a combination thereof. In some embodiments, the plasticizer comprises a maleate comprising Bis(2-ethylhexyl) maleate, dibutyl maleate, diisobutyl maleate, a derivative thereof, or a combination thereof. In some embodiments, the plasticizer comprises a bio-based plasticizer comprising an acetylated monoglyceride, an alkyl citrate, a methyl ricinoleate, or a green plasticizer. In some embodiments, the alkyl citrate is selected from the group consisting of triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, a derivative thereof, or a combination thereof. In some embodiments, the green plasticizer is selected from the group consisting of epoxidized soybean oil, epoxidized vegetable oil, epoxidized esters of soybean oil, a derivative thereof, or a combination thereof. In some embodiments, the plasticizer comprises an azelate, a benzoate (e.g., sucrose benzoate), a terephthalate (e.g., dioctyl terephthalate), 1,2-cyclohexane dicarboxylic acid diisononyl ester, alkyl sulphonic acid phenyl ester, a sulfonamide (e.g., N-ethyl toluene sulfonamide, N-(2-hydroxypropyl) benzene sulfonamide, N-(n-butyl) benzene sulfonamaide), an organophosphate (e.g., tricresyl phosphate or tributyl phosphate), a glycol (e.g., triethylene glycol dihexanoate or tetraethylene glycol diheptanoate), a polyether, a polymeric plasticizer, polybutene, a derivative thereof, or a combination thereof.

In some embodiments, the resin comprises a solvent. In some embodiments, the solvent comprises a nonpolar solvent. In certain embodiments, the nonpolar solvent comprises pentane, cyclopentane, hexane, cyclohexane, benzene, toluene, 1,4-dioxane, chloroform, diethyl ether, dichloromethane, a derivative thereof, or a combination thereof. In some embodiments, the solvent comprises a polar aprotic solvent. In certain embodiments, the polar aprotic solvent comprises tetrahydrofuran, ethyl acetate, acetone, dimethylformamide, acetonitrile, DMSO, propylene carbonate, a derivative thereof, or a combination thereof. In some embodiments, the solvent comprises a polar protic solvent. In certain embodiments, the polar protic solvent comprises formic acid, n-butanol, isopropyl alcohol, n-propanol, t-butanol, ethanol, methanol, acetic acid, water, a derivative thereof, or a combination thereof.

In some embodiments, the resin comprises a crystallization seed and/or a crystallization catalyst. In some embodiments, the crystallization seed can act as a crystallization catalyst. A crystallization seed can be a foreign seeding material that encourages or instigates nucleation of polymer crystals. In some embodiments, the crystallization seed can comprise an organic salt, an organic acid, carbon black, talc, a layered metal phosphonate, sodium hydroxide, sodium bicarbonate, a carbon nanotube, a pigment, polyglycolide, uracil, orotic acid, a derivative thereof, or a combination thereof. In some embodiments, the crystallization seed is attached to an oligomer or a polymer. Without being limited to the theory, a crystallization seed that is attached to an oligomer or a polymer can be less readily extractable, leading to improved crystallization characteristics. In some embodiments, the crystallization seed comprises less than 5 wt %, less than 4 wt %, less than 3 wt %, less than 2 wt %, less than 1 wt %, less than 0.5 wt %, less than 0.25 wt %, or less than 0.1 wt % of the resin.

In some embodiments, the resin comprises a biologically significant chemical. In some embodiments, the biologically significant chemical comprises a hormone, an enzyme, an active pharmaceutical ingredient, an antibody, a protein, a drug, or any combination thereof. In some embodiments, the biologically significant chemical comprises a pharmaceutical composition, a chemical, a gene, a polypeptide, an enzyme, a biomarker, a dye, a compliance indicator, an antibiotic, an analgesic, a medical grade drug, a chemical agent, a bioactive agent, an antibacterial, an antibiotic, an anti-inflammatory agent, an immune-suppressive agent, an immune-stimulatory agent, a dentinal desensitizer, an odor masking agent, an immune reagent, an anesthetic, a nutritional agent, an antioxidant, a lipopolysaccharide complexing agent or a peroxide.

In some embodiments, the added component (i.e., a thermal initiator, a polymerization catalyst, a polymerization inhibitor, a light blocker, a plasticizer, a solvent, a surface energy modifier, a pigment, a dye, a filler, a crystallization seed, a crystallization catalyst, or a biologically significant chemical) is functionalized so that it can be incorporated into the polymer network so that it cannot readily be extracted from the final cured material. In certain embodiments, the thermal initiator, polymerization catalyst, polymerization inhibitor, light blocker, plasticizer, surface energy modifier, pigment, dye, filler, crystallization seed, and/or crystallization catalyst are functionalized to facilitate their incorporation into the cured polymeric material. In some embodiments, the added component is a thermoplastic filler. In some embodiments, the added component is a filler having tacticity. In some embodiments, the added component is a filler that facilitates the formation of tacticity. A polymer network, as used herein, can refer to a polymer composition comprising a plurality of polymer chains wherein a large portion (e.g., ≥80%) and optionally all the polymer chains are interconnected, for example via covalent crosslinking, to form a single polymer composition. In an embodiment, there is provided a radiopaque polymer in the form of a crosslinked network in which at least some of the crosslinks of the network structure are formed by covalent bonds.

Resin Properties

In certain embodiments, the resins disclosed herein can be used in 3D printing processes to form objects. The resins are capable of being 3D printed, and provide polymer materials having the beneficial properties disclosed further herein.

In some embodiments, the crystallizable resin comprises a crystallizable polymeric material and a photoinitiator. In some embodiments, the crystallizable resin comprises a crystallizable polymeric material, a linking monomer, and a photoinitiator. In some embodiments, the crystallizable resin comprises a crystallizable polymeric material, a modifying polymer, and a photoinitiator. In some embodiments, the crystallizable resin comprises a crystallizable polymeric material, a linking monomer, a modifying polymer, and a photoinitiator. In some embodiments, the crystallizable polymeric material comprises a crystallizable polymer, monomers that form a crystallizable polymer, or a combination thereof. In some embodiments, the crystallizable resin comprises a plurality of crystallizable polymeric materials, the plurality of crystallizable polymeric materials comprising at least two types of crystallizable polymeric material.

In some embodiments, the resin comprises a polymer crystal. In certain embodiments, the polymer crystal comprises the crystallizable polymeric material. In some embodiments, at least a portion of the crystallizable polymeric material is a polymer or an oligomer comprising the monomer of the crystallizable polymeric material. In some embodiments, at least a portion of the amorphous polymeric material is a polymer or an oligomer comprising the monomer of the amorphous polymeric material.

In preferred embodiments, the resin comprises: a monomer of a crystallizable polymeric material, the crystallizable polymeric material having a melting temperature above 20° C. (e.g., a melt temperature above the intended use temperature); a monomer of an amorphous polymeric material, the amorphous polymeric material having a glass transition temperature less than 60° C. (e.g., an amorphous material that has a Tg onset temperature below or at the intended use temperature); and an initiator.

In some embodiments, the crystallizable resin has a viscosity less than 60 PaS, less than 50 PaS, less than 40 PaS, less than 30 PaS, less than 20 PaS, less than 10 PaS, less than 9 PaS, less than 8 PaS, less than 7 PaS, less than 6 PaS, less than 5 PaS, less than 4 PaS, less than 3 PaS, less than 2 PaS, less than 1 PaS, or less than 0.1 PaS at an elevated temperature. In some embodiments, the elevated temperature is a print temperature. In some embodiments, the elevated temperature is at, above, or below room temperature. In some embodiments, the elevated temperature is from 0° C. to 25° C., from 25° C. to 40° C., from 40° C. to 150° C., or from 10° C. to 40° C. In preferred embodiments, the resin has a viscosity from 0.05 PaS to 10 PaS at the print temperature. In some embodiments, the resin has a viscosity from 1 PaS to 10 PaS at the print temperature. In some embodiments, the print temperature can include a temperature or temperatures from 20-120° C. The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. The viscosity of a composition described herein may be measured at 110° C. using a rheometer. For example, an MCR 301 rheometer from Anton Paar may be used for rheological measurement in rotation mode (PP-25, 50 s-1, 50-115° C., 3° C./min).

The resin can, in some embodiments, be characterized by a low number of polymer crystals when the resin is at an elevated temperature (e.g., during the 3D printing process). The low number of polymer crystals can be due, e.g., to the elevated temperature being above the melting temperature of the polymer crystals. In some embodiments, the resin has less than 50% crystalline content, less than 25% crystalline content, or less than 10% crystalline content at the print temperature, as measured by X-ray diffraction. The print temperature can be a temperature from 20-150° C. In some embodiments, at least 90% of the crystallizable polymeric material is in a liquid phase at 90° C. In some embodiments, the resin is a liquid with no crystallinity at the printing temperature and before curing, but may become crystalline during or after curing, and/or when cooling from the cure temperature. When the resin has no crystallinity, the resin can be less viscous. In some embodiments, it is preferred to have the viscosity as low as possible. In other embodiments, it is advantageous to have some crystallinity present the printing temperature. For example, a small amount of crystallinity can facilitate the crystallization process either during printing, or upon cooling down (e.g., they can act as crystallization seeds).

In some embodiments, the resin comprises a ratio of the crystallizable polymeric material to the amorphous polymeric material (vol/vol) of greater than 1:10, greater than 1:9, greater than 1:8, greater than 1:7, greater than 1:6, greater than 1:5, greater than 1:4, greater than 1:3, greater than 1:2, greater than 1:1, greater than 2:1, greater than 3:1, greater than 4:1, greater than 5:1, greater than 6:1, greater than 7:1, greater than 8:1, greater than 9:1, greater than 10:1, greater than 20:1, greater than 30:1, greater than 40:1, greater than 50:1, or greater than 99:1. In some embodiments, the resin comprises a ratio of the crystallizable polymeric material to the amorphous polymeric material (vol/vol) of at least 1:10, at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 20:1, at least 30:1, at least 40:1, at least 50:1, or at least 99:1. In certain embodiments, the resin comprises a ratio of the crystallizable polymeric material to the amorphous polymeric material (vol/vol) of between 1:9 and 99:1, between 1:9 and 9:1, between 1:4 and 4:1, between 1:4 and 1:1, between 3:5 and 1:1, between 1:1 and 5:3, or between 1:1 and 4:1.

Polymeric Materials Comprising a Crystalline Phase

In some embodiments, the present disclosure provides polymeric materials generated from the crystallizable resins described further herein (also referred to herein as "polymeric materials" and "cured polymeric materials"). The cured polymeric materials comprise a crystalline domain (also referred to herein as a "crystalline phase"), which are regions of the polymeric material wherein at least one polymer crystal is present, said polymer crystal comprising the crystallizable polymeric material from the resin or the crystalline polymeric material from the resin. The polymeric materials also comprise an amorphous phase comprising at least one amorphous polymer.

In some embodiments, the polymer crystal has a melting temperature above 20° C., above 30° C., above 40° C., above 50° C., above 60° C., or above 70° C. In some embodiments, the use temperature is different from temperatures near standard room temperatures, and the polymer crystal has a melting temperature greater than or equal to 10° C., greater than or equal to 30° C., greater than or equal to 60° C., greater than or equal to 80° C., greater than or equal to 100° C., or greater than or equal to 150° C. above the use temperature. In preferred embodiments, the polymer crystal has a melting temperature greater than 60° C. In certain embodiments, the amorphous polymer has a glass transition temperature less than 60° C., less than 50° C., less than 40° C., less than 30° C., less than 20° C., less than 10° C., less than 0° C., less than −10° C., or less than −20° C. In preferred embodiments, the amorphous polymer has an onset temperature at or below the use temperature.

The polymeric material formed from the polymerization of the resins disclosed herein can provide advantageous characteristics. These cured materials contain some percentage of crystallinity, which can impart an increased toughness and high modulus to the polymeric material, while in some circumstances being a 3D printable material. Furthermore, the cured materials having an amorphous region (also referred to herein as an amorphous phase or an amorphous domain) can provide increased durability, prevention of crack formation, as well as the prevention of crack propagation. These cured materials can also have low amounts of water uptake, and are solvent resistant. Envisioned is the use of these cured materials for a multitude of applications, including 3D printing, to form materials having favorable properties of both elasticity and stiffness.

In some embodiments, the low amount of hydrogen bonding in the polymeric material facilitates a decreased uptake of water in comparison with comparable polymeric materials having greater amounts of hydrogen bonding. Hydrogen bonding can increase water uptake of a material. In some embodiments, the polymeric material comprises less than 10 wt %, less than 9 wt %, less than 8 wt %, less than 7 wt %, less than 6 wt %, less than 5 wt %, less than 4 wt %, less than 3 wt %, less than 2 wt %, less than 1 wt %, or less than 0.5 wt % water when fully saturated at use temperature. The use temperature can include the temperature of a human mouth (e.g., approximately 35-40° C.). The use temperature can be a temperature selected from −100-250° C., 0-90° C., 0-80° C., 0-70° C., 0-60° C., 0-50° C., 0-40° C., 0-30° C., 0-20° C., 0-10° C., 20-90° C., 20-80° C., 20-70° C., 20-60° C., 20-50° C., 20-40° C., 20-30° C., or below 0° C. Determining the water content when fully saturated at use temperature can comprise exposing the polymeric material to 100% humidity at said use temperature (e.g., 40° C.) for a period of 24 hours, then determining water content by methods known in the art, such as by weight.

In some embodiments, the polymeric material comprises at least one crystalline domain and an amorphous domain, wherein the at least one crystalline domain comprises the crystallizable polymeric material from the resin and the amorphous domain comprises the amorphous polymeric material from the resin. The combination of these two domains can create a polymeric material that has a high modulus phase (e.g., the crystalline material provides a high modulus) and a low modulus phase (e.g., the amorphous polymeric material). By having these two phases, the polymeric material can have high modulus and high elongation, as well as high stress remaining following stress relaxation. In certain embodiments, the amorphous domain and the crystalline domain comprise the same material. As a non-limiting example, a portion of a crystallizable polymeric material can form a polymer crystal, while another portion of the same crystallizable polymeric material can form an amorphous phase.

The polymeric material can be formed by curing the resins disclosed further herein. In some embodiments, the curing comprises a single curing step. In some embodiments, the curing comprises a plurality of curing steps. In preferred embodiments, the curing comprises at least one curing step exposes the crystallizable resin to light. Exposing the crystallizable resin to light can initiate and/or facilitate polymerization (e.g., photopolymerization), especially with the presence of a photoinitiator in the resin. In some embodiments, the resin is exposed to UV (ultraviolet) light, visible light, IR (infrared) light, or any combination thereof. In some embodiments, the cured polymeric material is formed from the crystallizable resin using at least one step comprising exposure to a light source, wherein the light source comprises UV light, visible light, and/or IR light. In some embodiments, the light source comprises a wavelength from 10 nm to 200 nm, from 200 nm to 350 nm, from 350 nm to 450 nm, from 450 nm to 550 nm, from 550 nm to 650 nm, from 650 nm to 750 nm, from 750 nm to 850 nm, from 850 nm to 1000 nm, or from 1000 nm to 1500 nm.

In some embodiments, the curing of the crystallizable resin to form the cured polymeric material initiates and/or facilitates the production and/or growth of crystals (e.g., crystals comprising the crystallizable polymeric material). In certain embodiments, the resin consists substantially of an amorphous phase prior to curing, and following the curing into the cured polymeric material, there exists a percentage of crystalline domains comprising crystals, said crystals comprising the crystallizable polymeric material. As a non-limiting example, a resin comprising polymer crystals and an amorphous polymeric material can be heated to an elevated temperature, at which point the polymer crystals melt; following curing and cooling of the polymer material, the crystallizable polymeric material can form into polymer crystals, while the amorphous polymeric material retains its amorphous character. Curing refers to a process and/or processes that lead to an increase in molecular weight of various chemical species in the resin formulation, and can have an end point of a solid or semi-solid at the temperature the cured polymeric material will be used. As a non-limiting example, the crystallizable polymeric resin can be a solid at room temperature, then heated into a liquid state, then cured (e.g., the resin can be irradiated with light, causing polymerization to occur) in which the material becomes a solid. The curing step may optionally comprise more than one step; for example, the cured material from the previous sentence can be heated (e.g., placed in an oven), and a second polymerization may occur which further polymerizes material.

In some embodiments, the polymeric material can comprise a polymer crystal attached to the amorphous polymer. As non-limiting examples, the polymer crystal can be covalently bonded to, entangled with, crosslinked to, and/or otherwise associated with (e.g., through hydrophobic interactions, pi-stacking, or hydrogen bonding interactions) the amorphous polymeric material.

In some embodiments, the polymer crystals can yield upon application of a strain (e.g., a physical strain, such as twisting or stretching a material). The yielding may include unraveling, unwinding, disentangling, dislocation, coarse slips, and/or fine slips in the crystallized polymer.

In certain embodiments, the polymeric material is crystal free immediately following and/or shortly after the curing step. In some embodiments, the curing of the crystallizable resin is at an elevated temperature, and as the cured polymeric material cools to room temperature (i.e., 25° C.), the cooling can trigger the formation and/or growth of crystals. In some embodiments, the polymeric material is a solid at room temperature and can be crystalline-free, but forms crystalline domains over time. In some embodiments, a crystalline domain forms within 1 hour, within 2 hours, within 4 hours, within 8 hours, within 12 hours, within 18 hours, within 1 day, within 2 days, within 3 days, within 4 days, within 5 days, within 6 days, or within 7 days after cooling. In some embodiments, the crystalline domains form while the cured polymeric material is in a cooled environment, said cooled environment having a temperature from 40° C. to 30° C., from 30° C. to 20° C., from 20° C. to 10° C., from 10° C. to 0° C., from 0° C. to −10° C., from −10° C. to −20° C., from −20° C. to −30° C., or below −30° C. In some embodiments, the polymeric material is heated to an elevated temperature in order to induce crystallization. As a non-limiting example, a polymeric material that is near its glass transition temperature can comprise chains not mobile enough to organize into crystals, and further heating the material can increase mobility.

Discussion herein relating to the properties of the polymeric material, including presence and properties of the crystals and crystalline domains, refers to the material ready for use (e.g., a cured and cooled material to be used for its intended use, such as a cured and cooled aligner intended to provide a treatment to a patient).

In some embodiments, the generation, formation, and/or growth of a polymer crystal is spontaneous. In some embodiments, the generation, formation, and/or growth of a polymer crystal is facilitated by a trigger. In some embodiments, the trigger comprises the addition of a seeding particle (also referred to herein as a "seed"), which can help to induce crystallization. Such seeds can include, for example, finely ground solid material that has some properties similar to the desired crystals. In some embodiments, the trigger comprises a reduction of temperature. In certain embodiments, the reduction of temperature can include cooling the resin to a temperature from 40° C. to 30° C., from 30° C. to 20° C., from 20° C. to 10° C., from 10° C. to 0° C., from 0° C. to −10° C., from −10° C. to −20° C., from −20° C. to −30° C., or below −30° C. In some embodiments, the trigger can comprise an increase in temperature. In certain embodiments, the increase of temperature can include heating the resin to a temperature from 20° C. to 40° C., from 40° C. to 60° C., from 60° C. to 80° C., from 80° C. to 100° C., or above 100° C. In some embodiments, the trigger comprises a force placed on the cured polymeric material. In certain embodiments, the force includes squeezing, compacting, pulling, twisting, or providing any other physical force to the material. In some embodiments, the trigger comprises an electrical charge and/or electrical field applied to the material. In some embodiments, a crystalline domain may be successfully affected by more than one trigger (i.e., more than one type of trigger can facilitate the generation, formation, and/or growth of crystals). In some embodiments, the material comprises a plurality of crystalline domains, and at least two of the crystalline domains may be successfully affected by different triggers. As a non-limiting example, a polymeric material can comprise a first crystallizable domain and a second crystallizable domain; the first crystalline domain exposed to an electrical field can generate crystals, while the first crystallizable domain exposed to a temperature of −20° C. does not generate crystals; the second crystallizable domain exposed to an electrical field does not generate crystals, while the second crystallizable domain exposed to a temperature of −20° C. can generate crystals.

In some embodiments, the polymeric material has a crystalline content (i.e., the volume percentage of polymer crystals) from 1% to 99% by volume. Preferably, the crystalline content is between 10% and 90%. More preferably, the crystalline content is between 30% and 50%, or between 50% and 80%. The crystalline content can be measured by X-ray diffraction.

In some embodiments, the polymeric material comprises a ratio of the crystallizable polymeric material to the amorphous polymeric material (wt/wt) of greater than 1:10, greater than 1:9, greater than 1:8, greater than 1:7, greater than 1:6, greater than 1:5, greater than 1:4, greater than 1:3, greater than 1:2, greater than 1:1, greater than 2:1, greater than 3:1, greater than 4:1, greater than 5:1, greater than 6:1, greater than 7:1, greater than 8:1, greater than 9:1, greater than 10:1, greater than 20:1, greater than 30:1, greater than 40:1, greater than 50:1, or greater than 99:1. In some embodiments, the polymeric material comprises a ratio of the crystallizable polymeric material to the amorphous polymeric material (wt/wt) of at least 1:10, at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 20:1, at least 30:1, at least 40:1, at least 50:1, or at least 99:1. In certain embodiments, the polymeric material comprises a ratio of the crystallizable polymeric material to the amorphous polymeric material (wt/wt) of between 1:9 and 99:1, between 1:9 and 9:1, between 1:4 and 4:1, between 1:4 and 1:1, between 3:5 and 1:1, between 1:1 and 5:3, or between 1:1 and 4:1.

In some embodiments, the polymeric material comprises a ratio of the crystallizable polymeric material to the amorphous polymeric material (vol/vol) of greater than 1:10, greater than 1:9, greater than 1:8, greater than 1:7, greater than 1:6, greater than 1:5, greater than 1:4, greater than 1:3, greater than 1:2, greater than 1:1, greater than 2:1, greater than 3:1, greater than 4:1, greater than 5:1, greater than 6:1, greater than 7:1, greater than 8:1, greater than 9:1, greater than 10:1, greater than 20:1, greater than 30:1, greater than 40:1, greater than 50:1, or greater than 99:1. In some embodiments, the polymeric material comprises a ratio of the crystallizable polymeric material to the amorphous polymeric material (vol/vol) of at least 1:10, at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 20:1, at least 30:1, at least 40:1, at least 50:1, or at least 99:1. In certain embodiments, the polymeric material comprises a ratio of the crystallizable polymeric material to the amorphous polymeric material (vol/vol) of between 1:9 and 99:1, between 1:9 and 9:1, between 1:4 and 4:1, between 1:4 and 1:1, between 3:5 and 1:1, between 1:1 and 5:3, or between 1:1 and 4:1.

In some embodiments, the polymeric material comprises a ratio of the polymer crystals to the amorphous polymer (wt/wt) of greater than 1:10, greater than 1:9, greater than 1:8, greater than 1:7, greater than 1:6, greater than 1:5, greater than 1:4, greater than 1:3, greater than 1:2, greater than 1:1, greater than 2:1, greater than 3:1, greater than 4:1, greater than 5:1, greater than 6:1, greater than 7:1, greater than 8:1, greater than 9:1, greater than 10:1, greater than 20:1, greater than 30:1, greater than 40:1, greater than 50:1, or greater than 99:1. In some embodiments, the polymeric material comprises a ratio of the polymer crystals to the amorphous polymer (wt/wt) of at least 1:10, at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 20:1, at least 30:1, at least 40:1, at least 50:1, or at least 99:1. In certain embodiments, the polymeric material comprises a ratio of the polymer crystals to the amorphous polymer (wt/wt) of between 1:9 and 99:1, between 1:9 and 9:1, between 1:4 and 4:1, between 1:4 and 1:1, between 3:5 and 1:1, between 1:1 and 5:3, or between 1:1 and 4:1.

In some embodiments, the polymeric material comprises a ratio of the polymer crystals to the amorphous polymer (vol/vol) of greater than 1:10, greater than 1:9, greater than 1:8, greater than 1:7, greater than 1:6, greater than 1:5, greater than 1:4, greater than 1:3, greater than 1:2, greater than 1:1, greater than 2:1, greater than 3:1, greater than 4:1, greater than 5:1, greater than 6:1, greater than 7:1, greater than 8:1, greater than 9:1, greater than 10:1, greater than 20:1, greater than 30:1, greater than 40:1, greater than 50:1, or greater than 99:1. In some embodiments, the polymeric material comprises a ratio of the polymer crystals to the amorphous polymer (vol/vol) of at least 1:10, at least 1:9, at least 1:8, at least 1:7, at least 1:6, at least 1:5, at least 1:4, at least 1:3, at least 1:2, at least 1:1, at least 2:1, at least 3:1, at least 4:1, at least 5:1, at least 6:1, at least 7:1, at least 8:1, at least 9:1, at least 10:1, at least 20:1, at least 30:1, at least 40:1, at least 50:1, or at least 99:1. In certain embodiments, the polymeric material comprises a ratio of the polymer crystals to the amorphous polymer (vol/vol) of between 1:9 and 99:1, between 1:9 and 9:1, between 1:4 and 4:1, between 1:4 and 1:1, between 3:5 and 1:1, between 1:1 and 5:3, or between 1:1 and 4:1.

In some embodiments, the polymeric material comprises a crystalline phase that has discontinuous phase transitions (e.g., first-order phase transitions). In some embodiments, the polymeric material has discontinuous phase transitions, due at least in part to the presence of the crystalline domains. As a non-limiting example, a cured polymeric material comprising a crystalline domain and heated to an elevated temperature can have portions that melt at the elevated temperature (e.g., the polymer crystals), as well as portions that remain solid.

In some embodiments, the cured polymeric material comprises crystalline domains that have continuous and/or discontinuous phases. A continuous phase is a phase that can be traced or is connected from one side of a material to another side of the material; for instance, a closed-cell foam has material comprising the foam that can be traced across the sample, whereas the closed cells (bubbles) represent a discontinuous phase of air pockets. In some embodiments, the at least one crystalline phase forms a continuous phase while the at least one amorphous phase is discontinuous across the material. In another embodiment, the crystalline phase discontinuous and the amorphous phase is continuous across the material. In a preferred embodiment, both the crystalline and amorphous phases are continuous across the material.

In some embodiments, the polymeric material comprises a plurality polymer crystals, and some of the polymer crystals are high melting (i.e., have a high melting point) and are in a discontinuous phase, while other polymer crystals are low melting (i.e., have a low melting point) and are in a continuous phase, and an amorphous phase surrounds the different polymer crystals. As disclosed further above, the crystalline domains may consist of a single crystal, or may comprise a plurality of crystals.

In some embodiments, the cured polymeric material comprises a crystalline domain that has a crystal melting point (i.e., the temperature at which the polymer crystals melt) above 40° C. In some embodiments, the crystalline domain has a crystal melting point above 60° C., above 80° C., or above 100° C. In some embodiments, the crystalline domain has a crystal melting point value between 40° C. and 60° C., between 40° C. and 80° C., between 40° C. and 100° C., between 60° C. and 80° C., between 60° C. and 100° C., between 80° C. and 100° C., or greater than 100° C. In some embodiments, the polymeric material comprises a plurality of crystalline domains that have the same crystal melting point. In some embodiments, the cured polymeric material comprises a plurality of crystalline domains that have different crystal melting points. In certain embodiments, different crystalline domains can melt at different temperatures due to, e.g., differences in crystalline domain sizes, impurities, amount of crosslinking, chain lengths, thermal history, rates at which polymerization occurred, and degree of phase separation. In some embodiments, the polymeric material comprises a plurality of crystalline domains having different crystal melting point values, but all the crystal melting point values are between 40° C. and 60° C., between 40° C. and 80° C., between 40° C. and 100° C., between 60° C. and 80° C., between 60° C. and 100° C., between 80° C. and 100° C., or greater than 100° C. In some embodiments, the cured polymeric material comprises a plurality of crystalline domains having different crystal melting point values, and at least some of the crystal melting point values are between 40° C. and 60° C., between 40° C. and 80° C., between 40° C. and 100° C., between 60° C. and 80° C., between 60° C. and 100° C., between 80° C. and 100° C., or greater than 100° C. In some embodiments, the crystalline melt temperature greater than the use temperature. In certain embodiments, the crystalline melt temperature is 10° C. or greater, 20° C. or greater, 50° C. or greater, 100° C. or greater, or 200° C. or greater above the use temperature.

In some embodiments, the polymeric material comprises a plurality of crystalline domains, and at least 80% of the crystalline domains have a crystal melting point at a temperature between 0° C. and 100° C. In some embodiments, the cured polymeric material comprises a plurality of crystalline domains, and at least 80% of the crystalline domains have a crystal melting point at a temperature between 40° C. and 60° C., between 40° C. and 80° C., between 40° C. and 100° C., between 60° C. and 80° C., between 60° C. and 100° C., between 80° C. and 100° C., or greater than 100° C. In some embodiments, the cured polymeric material comprises a plurality of crystalline domains, and at least 90% of the crystalline domains have a crystal melting point at a temperature between 0° C. and 100° C. In some embodiments, the cured polymeric material comprises a plurality of crystalline domains, and at least 90% of the crystalline domains have a crystal melting point at a temperature between 40° C. and 60° C., between 40° C. and 80° C., between 40° C. and 100° C., between 60° C. and 80° C., between 60° C. and 100° C., between 80° C. and 100° C., or greater than 100° C. In some embodiments, the cured polymeric material comprises a plurality of crystalline domains, and at least 95% of the crystalline domains have a crystal melting point at a temperature between 0° C. and 100° C. In some embodiments, the cured polymeric material comprises a plurality of crystalline domains, and at least 95% of the crystalline domains have a crystal melting point at a temperature between 40° C. and 60° C., between 40° C. and 80° C., between 40° C. and 100° C., between 60° C. and 80° C., between 60° C. and 100° C., between 80° C. and 100° C., or greater than 100° C.

In some embodiments, the cured polymeric material comprises a plurality of crystalline domains, and at least 10% of the crystalline domains have a crystal melting point at a temperature below 100° C. In some embodiments, the cured polymeric material comprises a plurality of crystalline domains, from 10% to 20% of the crystalline domains have a crystal melting point at a temperature below 100° C. In some embodiments, the cured polymeric material comprises a plurality of crystalline domains, from 20% to 30% of the crystalline domains have a crystal melting point at a temperature below 100° C. In some embodiments, the cured polymeric material comprises a plurality of crystalline domains, from 30% to 40% of the crystalline domains have a crystal melting point at a temperature below 100° C. In some embodiments, the cured polymeric material comprises a plurality of crystalline domains, from 40% to 50% of the crystalline domains have a crystal melting point at a temperature below 100° C. In some embodiments, the cured polymeric material comprises a plurality of crystalline domains, and from 20% to 50% of the crystalline domains have a crystal melting point at a temperature below 100° C. In some embodiments, the cured polymeric material comprises a plurality of crystalline domains, and from 20% to 50% of the crystalline domains have a crystal melting point at a temperature below 80° C. In some embodiments, the cured polymeric material comprises a plurality of crystalline domains, and from 20% to 50% of the crystalline domains have a crystal melting point at a temperature below 60° C.

In certain embodiments, the temperature at which the polymer crystals of a cured polymeric material melts can be controlled, e.g., by using different crystallizable polymer materials (i.e., polymers and oligomer), and/or by using blocks of polymers (i.e., in copolymers) that have different crystal melting points. As a non-limiting example, two different crystallizable polymers can be mixed to form two or more crystalline domains in the cured polymeric material, which would have two or more crystal melting points.

In some embodiments, it is beneficial to limit the size of polymer crystals in the polymeric material. Small polymer crystals can facilitate light passage and provide a polymeric material that appears clear. In contrast, large polymer crystals can scatter light, for example when the refractive index of the polymer crystal is different from the refractive index of the amorphous phase adjacent to the polymer crystal (e.g., the amorphous material). Accordingly, in some embodiments, it is favorable to have a polymeric material that comprises small polymer crystals, as measured by the longest length of the crystal. In some embodiments, the polymeric material comprises an average polymer crystal size that is less than 5 μm. In some embodiments, the maximum polymer crystal size of the polymeric materials is 5 μm. In some embodiments, at least 50%, at least 60%, at least 70%, at least 80%, at least 90%, at least 95%, or at least 99% of the polymer crystal of the polymeric material have a size less than 5 μm. In preferred embodiments, the polymeric material comprises an average polymer crystal size that is less than 1 μm. In some embodiments, the maximum polymer crystal size of the cured polymeric materials is 1 μm. In some embodiments, at least 50%, at least 60%, at least 70%, at least 80%, at least 90%, at least 95%, or at least 99% of the polymer crystals of the polymeric material have a size less than 1 μm. In even more preferred embodiments, the polymeric material comprises an average polymer crystal size that is less than 500 nm. In some embodiments, the maximum polymer crystal size of the cured polymeric materials is 500 nm. In some embodiments, at least 50%, at least 60%, at least 70%, at least 80%, at least 90%, at least 95%, or at least 99% of the polymer crystal of the polymeric material have a size less than 500 nm.

In some embodiments, the size of the polymer crystals of the polymeric material can be controlled. Non-limiting examples of ways in which the size of the polymer crystal is controlled includes: rapidly cooling the cured polymeric material, annealing the cured polymeric material at an elevated temperature (i.e., above room temperature), annealing the cured polymeric material at a temperature below room temperature, adding crystallization-inducing chemicals or particles (e.g., crystallization seeds), controlling the rate of polymerization, controlling the intensity of light during the curing step using light, controlling and/or adjusting polymerization temperature, exposing the cured polymeric material to sonic vibrations, and/or controlling the presence and amounts of impurities.

In some embodiments, the refractive index of the crystalline domain and/or amorphous domain of the polymeric material can be controlled. A reduction in difference of refractive index between different domains (e.g., reduction in the difference of refractive index between the polymer crystals and the amorphous polymer) can increase clarity of the cured polymeric material, providing a clear or nearly clear material. Light scatter can be decreased by minimizing polymer crystal size, as well as by reducing the difference of refractive index across an interface between an amorphous polymeric material and a polymer crystal. In some embodiments, the difference of refractive index between the polymer crystal and a neighboring domain (e.g., an amorphous material) is less than 0.1, less than 0.01, or less than 0.001. In some embodiments, the difference of refractive index between the polymer crystal and the amorphous polymer is less than 0.1, less than 0.01, or less than 0.001.

In some embodiments, the polymeric material is biocompatible. The amorphous polymeric material and the polymer crystals can be biocompatible. Biocompatible can refer to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity. In some embodiments, the polymeric material is bioinert. Bioinert refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments, the disclosure provides bioinert devices.

Material Properties of the Cured Polymeric Materials

In some embodiments, the presence of a crystalline phase and an amorphous phase provide favorable material properties to the polymeric materials. Property values of the cured polymeric materials can be determined, for example, by using the following methods:

stress relaxation properties can be assessed using an RSA-G2 instrument from TA Instruments, with a 3-point bending, according to ASTM D790; for example, stress relaxation can be measured at 30° C. and submerged in water, and reported as the remaining load after 24 hours, as either the percent (%) of initial load, and/or in MPa;

storage modulus can be measured at 37° C. and is reported in MPa;

$T_g$ of the cured polymeric material can be assessed using dynamic mechanical analysis (DMA) and is provided herein as the tan δ peak;

tensile modulus, tensile strength, elongation at yield and elongation at break can be assessed according to ISO 527-2 5B; and tensile strength at yield, elongation at break, tensile strength, and Young's modulus can be assessed according to ASTM D1708.

In some embodiments, the cured polymeric material is characterized by a tensile stress-strain curve that displays a yield point after which the test specimen continues to elongate, but there is no increase in load. Such yield point behavior can occur "near" the glass transition temperature, where the material is between the glassy and rubbery regimes and may be characterized as having viscoelastic behavior. In embodiments, viscoelastic behavior is observed in the temperature range 20° C. to 40° C. The yield stress is determined at the yield point. In some embodiments, the yield point follows an elastic region in which the slope of the stress-strain curve is constant or nearly constant. In embodiments, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by $\ln(l/l_0)$, which may be approximated by $(l-l_0)/l_0$ at small strains (e.g. less than approximately 10%) and the elongation is $l/l_0$, where $l$ is the gauge length after some deformation has occurred and $l_0$ is the initial gauge length. The mechanical properties can depend on the temperature at which they are measured. The test temperature may be below the expected use temperature for a dental appliance such as 35° C. to 40° C. In some embodiments, the test temperature is 23±2° C.

In some embodiments, the cured polymeric material has a hardness from 60 Shore A to 85 Shore D. In certain embodiments, the cured polymeric material has a hardness from 60-70 Shore A, from 70-80 Shore A, from 80-90 Shore A, from 90-100 Shore A, from 0-10 Shore D, from 10-20 Shore D, from 20-30 Shore D, from 30-40 Shore D, from 40-50 Shore D, from 50-60 Shore D, from 60-70 Shore D, from 70-80 Shore D, or from 80-85 Shore D.

In some embodiments, the cured polymeric material has an elongation at yield greater than 4%. In some embodiments, the polymeric material has an elongation at yield of 4% to 10%. In some aspects, the polymeric material is characterized by an elongation at yield of 5% to 15%.

In some embodiments, the cured polymeric material has an elongation at break value between 5% and 250%. In certain embodiments, the cured polymeric material has an elongation at break value between 10% and 250%, between 20% and 250%, between 30% and 250%, between 40% and 250%, between 50% and 250%, between 75% and 250%, between 100% and 250%, between 150% and 250%, between 200% and 250%, between 10% and 50%, between 50% and 100%, between 100% and 150%, between 150% and 200%, or between 20% and 250%. In preferred embodiments, the polymer material has an elongation at break greater than or equal to 5%. In certain embodiments, the polymer material has an elongation at break greater than 10%, an elongation at break greater than 20%, an elongation at break greater than 30%, an elongation at break of 5% to 250%, an elongation at break of 20% to 250%, or an elongation at break value between 40% and 250%.

In some embodiments, the cured polymeric material has a tensile modulus value greater than or equal to 100 MPa. In some embodiments, the polymeric material is characterized by a tensile modulus from 100 MPa to 2000 MPa or a tensile modulus from 800 MPa to 2000 MPa. In some embodiments, the polymeric material has a tensile modulus between 100 MPa and 5000 MPa. In certain embodiments, the cured polymeric material has a Young's modulus value between 500 MPa and 4000 MPa, between 700 MPa and 3000 MPa, between 1000 MPa and 2500 MPa, between 1200 MPa and 2400 MPa, between 1500 MPa and 2100 MPa, between 1700 MPa and 1900 MPa, between 100 MPa and 500 MPa, between 500 MPa and 1000 MPa, between 1000 MPa and 1500 MPa, between 1500 MPa and 2000 MPa, between 2000 MPa and 2500 MPa, between 2500 MPa and 3000 MPa, between 3000 MPa and 3500 MPa, between 3500 MPa and 4000 MPa, between 4000 MPa and 4500 MPa, or between 4500 MPa and 5000 MPa.

In some embodiments, the cured polymeric material has a storage modulus between 0.1 MPa and 4000 MPa. In preferred embodiments, the cured polymeric material has a storage modulus between 100 MPa and 2000 MPa. In even more preferred embodiments, the cured polymeric material has a storage modulus between 500 MPa and 1500 MPa. In additional preferred embodiments, the polymeric material has a storage modulus greater than or equal to 300 MPa. In certain embodiments, the polymeric material is characterized by a storage modulus of 0.1 MPa to 4000 MPa, a storage modulus of 300 MPa to 3000 MPa, or a storage modulus of 750 MPa to 3000 MPa. In some embodiments, the cured polymeric material has a storage modulus from 0.1 MPa to 3000 MPa, from 0.1 MPa to 2000 MPa, from 0.1 MPa to 1000 MPa, from 10 MPa to 4000 MPa, from 10 MPa to 3000 MPa, from 10 MPa to 2000 MPa, from 10 MPa to 1000 MPa, from 100 MPa to 4000 MPa, from 100 MPa to 3000 MPa, from 100 MPa to 2000 MPa, from 100 MPa to 1000 MPa, from 500 MPa to 4000 MPa, from 500 MPa to 3500 MPa, from 500 MPa to 3000 MPa, from 500 MPa to 2500 MPa, from 500 MPa to 2000 MPa, from 500 MPa to 1500 MPa, or from 500 MPa to 1000 MPa. The storage modulus can be measured at 37° C. and is reported in MPa.

In some embodiments, the resin comprises a polymer crystal having a storage modulus greater than the amorphous polymer. In certain embodiments, the resin comprises a polymer crystal having a storage modulus greater than 2-fold, greater than 3-fold, greater than 4-fold, greater than 5-fold, greater than 6-fold, greater than 7-fold, greater than 8-fold, greater than 9-fold, greater than 10-fold, greater than 20-fold, greater than 30-fold, greater than 40-fold, or greater than 50-fold than the storage modulus of the amorphous polymer.

In some embodiments, the cured polymeric material has a glass transition temperature ($T_g$) from 0° C. to 150° C. In preferred embodiments, the polymeric material has a glass transition temperature from 0° C. to 60° C. In some embodiments, the glass transition temperature is from 0° C. to 120° C., from 0° C. to 140° C., from 0° C. to 20° C., from 20° C. to 40° C., from 40° C. to 60° C., from 60° C. to 80° C., from 80° C. to 100° C., from 0° C. to 35° C., from 35° C. to 65° C., from 65° C. to 100° C., from 0° C. to 50° C., or from 50° C. to 100° C. In some embodiments, the cured polymeric material has a glass transition temperature from 0° C. to 10° C., from 10° C. to 20° C., from 20° C. to 30° C., from 30° C. to 40° C., from 40° C. to 50° C., from 50° C. to 60° C., from 60° C. to 70° C., from 70° C. to 80° C., or from 80° C. to 90° C. In some embodiments, the cured polymeric material has at least one glass transition temperature from −80° C. to 100° C., or preferably from −60° C. to 60° C. for applications near room temperature. In some embodiments, the cured polymeric material has more than one glass transition temperature. In certain embodiments, the cured polymeric material has more than one glass transition temperature, and an onset temperature for the lowest glass transition temperature is less than or equal to the use temperature. As a non-limiting example, a cured polymeric material with a use temperature of about 37° C. (i.e., the temperature of a human subject's mouth) can comprise at least two glass transition temperatures, and the onset temperature for the lowest of the glass transition temperatures is less than or equal to about 37° C.

In some embodiments, the cured polymeric material is clear, substantially clear, mostly clear, or opaque. In certain embodiments, the cured polymeric material is clear. In certain embodiments, the cured polymeric material is substantially clear. In certain embodiments, the cured polymeric material is mostly clear. In some embodiments, greater than 70% of visible light passes through the cured polymeric material. In certain embodiments, greater than 80% of visible light passes through the cured polymeric material. In certain embodiments, greater than 90% of visible light passes through the cured polymeric material. In certain embodiments, greater than 95% of visible light passes through the cured polymeric material. In certain embodiments, greater than 99% of visible light passes through the cured polymeric material. Transparency can be measured using a UV-Vis spectrophotometer. In some embodiments, the transparency is measured by measuring the passage of a wavelength of transparency. In some embodiments, greater than 70%, greater than 80%, greater than 90%, greater than 95%, or greater than 99% of the wavelength of transparency can pass through the cured polymeric material. In some embodiments, the wavelength of transparency is in the visible light range (i.e., from 400 nm to 800 nm), is in the infrared light range, or is in the ultraviolet light range. In some embodiments, the cured polymeric material does not have color. In other embodiments, the cured polymeric material appears white, off-white, or mostly transparent with white coloring, as detected by the human eye. In some embodiments, a color is added. In certain embodiments, the color is added with a dye, a pigment, or a combination thereof.

In some embodiments, the cured polymeric material has a stress relaxation measurement determined by ASTM D790 with 5% deflection on a 3-point bending test. In some embodiments, the stress relaxation can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature is 37±2° C. at 100% relative humidity or a temperature of 37±2° C. in water. Stress relaxation properties may be assessed using an RSA-G2 instrument from TA Instruments, with a 3-point bending, 2% strain method (or sometimes with a 5% strain method). The stress relaxation can be measured at 37° C. and 100% relative humidity and reported as the remaining load after 2 hours, as either the percent (%) of initial load or in MPa). In some embodiments, the cured polymeric material has a stress remaining of greater than or equal to 5% of the initial load. In some embodiments, the cured polymeric material is characterized by a stress remaining of 5% to 45% of the initial load. In certain aspects, the polymeric material is characterized by a stress remaining of 20% to 45% of the initial load. In certain embodiments, the polymeric material is characterized by a stress remaining of greater than or equal to 20% or greater than or equal to 35% of the initial load. In some embodiments, the stress relaxation measurement of the cured polymeric material has a stress remaining value at 24 hours in 30° C. water that is greater than 10% of the initial stress. In some embodiments, the stress relaxation measurement of the cured polymeric material has a stress remaining value at 24 hours in 30° C. water that is greater than 15%, greater than 20%, greater than 25%, greater than 30%, greater than 35%, greater than 40%, greater than 45%, or greater than 50% of the initial stress. In some embodiments, the polymeric material has a stress remaining greater than or equal to 0.01 MPa. In certain embodiments, the polymeric material is characterized by a stress remaining of 0.01 MPa to 15 MPa. In certain aspects, the polymeric material is characterized by a stress remaining of 2 MPa to 15 MPa.

In some embodiments, the cured polymeric material is characterized by a stress remaining of 5% to 85% of the initial load, such as 5% to 45%, 15% to 85%, or 20% to 45% of the initial load. In some embodiments, the polymeric material is characterized by a stress remaining of 0.01 MPa to 15 MPa, such as 2 MPa to 15 MPa. In some embodiments, the polymeric material is characterized by a stress remaining of greater than or equal to 20% of the initial load.

Polymeric materials of the present invention can have a heat deflection temperature of greater than or equal to 20° C., greater than or equal to 40° C., greater than or equal to 80° C., or greater than or equal to 100° C. above of the use temperature. Heat deflection temperatures can be measured using, e.g., Heat Deflection Temperature ASTM D648, ISO 75. In some embodiments, the cured polymeric material is formed using 3D printing (i.e., by additive manufacturing) using photopolymerization. In some embodiments, the cured polymeric materials can be used in coatings, molds, injection molding machines, or other manufacturing methods that use or could use light during the curing process. In some embodiments, the cured polymeric material is well suited for applications that require, e.g., solvent resistance, humidity resistance, water resistance, creep resistance, or heat deflection resistance.

Methods of Producing Cured Polymeric Materials

In some embodiments, the present disclosure provides a method of producing the cured polymeric materials generated from the crystallizable resins as described further herein. In some embodiments, the method comprises the steps of:

providing a crystallizable resin, as disclosed further herein; and curing the crystallizable resin, the curing comprising exposure to light, thereby forming a cured polymeric material.

In some embodiments, the method further comprises the step of fabricating a device or an object using an additive manufacturing device, wherein said additive manufacturing device facilitates the curing. In some embodiments, the curing of the crystallizable resin produces the cured polymeric material. In certain embodiments, the crystallizable resin is cured using an additive manufacturing device to produce the cured polymeric material. In some embodiments, the method further comprises the step of cleaning the cured polymeric material. In certain embodiments, the cleaning of the cured polymeric material includes washing and/or rinsing the cured polymeric material with a solvent, which can remove uncured resin and undesired impurities from the cured polymeric material.

In some embodiments, the crystallizable resins are curable and have melting points <100° C. in order to be liquid and, thus, processable at the temperatures usually employed in currently available additive manufacturing techniques. Said curable crystallizable resins comprise at least one photopolymerization initiator (i.e., a photinitiator) and may be heated to a predefined elevated process temperature ranging from 50° C. to 120° C., such as from 90° C. to 120° C., before becoming irradiated with light of a suitable wavelength to be absorbed by said photoinitiator, thereby causing activation of the photoinitiator to induce polymerization of the curable crystallizable resin to obtain an optionally crosslinked cured polymeric material. In some embodiments, said curable polymeric material (i.e., the resin) comprises at least one multivalent monomer (e.g., the crystallizable polymeric material and/or the amorphous polymeric material) and is polymerized to obtain a polymer, which is optionally crosslinked.

In some embodiments, the methods disclosed herein are part of a high temperature lithography-based photopolymerization process, wherein a curable composition (i.e., the crystallizable resin) comprises at least one photopolymerization initiator and is heated, which makes high temperature lithography-based photopolymerization process more preferably is an additive manufacturing process, most preferably a 3D printing process. The method according to the present disclosure offers the possibility of quickly and facilely producing devices, such as orthodontic appliances, by additive manufacturing such as 3D printing using crystallizable resins as disclosed herein.

Photopolymerization occurs when suitable formulations (e.g., the crystallizable resins disclosed herein) are exposed to radiation (e.g., UV or visible light) of sufficient power and of a wavelength capable of initiating polymerization. The wavelengths and/or power of radiation useful to initiate polymerization may depend on the photoinitiator used. "Light" as used herein includes any wavelength and power capable of initiating polymerization. Some wavelengths of light include ultraviolet (UV) or visible. UV light sources include UVA (wavelength about 400 nanometers (nm) to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous or pulsed light during the process. Both the length of time the system is exposed to UV light and the intensity of the UV light can be varied to determine the ideal reaction conditions.

In some embodiments, the methods disclosed herein use additive manufacturing to produce a device comprising the cured polymeric material. In certain embodiments, the methods disclosed herein use additive manufacturing to produce a device consisting essentially of the cured polymeric material. Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate the appliances herein. In many embodiments, 3D printing involves jetting or extruding one or more materials (e.g., the crystallizable resins disclosed herein) onto a build surface in order to form successive layers of the object geometry. In some embodiments, the crystallizable resins described herein can be used in inkjet or coating applications. Cured polymeric materials may also be fabricated by "vat" processes in which light is used to selectively cure a vat or reservoir of the curable resin (e.g., the crystallizable resins disclosed herein). Each layer of curable resin may be selectively exposed to light in a single exposure or by scanning a beam of light across the layer. Specific techniques include stereolithography (SLA), Digital Light Processing (DLP) and two photon-induced photopolymerization (TPIP).

In some embodiments, the methods disclosed herein use continuous direct fabrication to produce a device comprising the cured polymeric material. In certain embodiments, the methods disclosed herein use continuous direct fabrication to produce a device consisting essentially of the cured polymeric material. A non-limiting exemplary direct fabrication process can achieve continuous build-up of an object geometry by continuous movement of a build platform (e.g., along the vertical or Z-direction) during an irradiation phase, such that the hardening depth of the irradiated photopolymer (e.g., the irradiated crystallizable resin, hardening during the formation of the cured polymeric material) is controlled by the movement speed. Accordingly, continuous polymerization of material (e.g., polymerization of the crystallizable resin into the cured polymeric material) on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which the liquid resin (e.g., the crystallizable resin) is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352) hereby incorporated by reference in its entirety for description of the process. Another example of continuous direct fabrication method can involve extruding a material composed of a curable liquid material surrounding a solid strand. The material can be extruded along a continuous three-dimensional path in order to form the object. Such methods are described in U.S. Patent Publication No. 2014/0061974, the disclosure of which is incorporated herein by reference in its entirety.

In some embodiments, the methods disclosed herein use high temperature lithography to produce a device comprising the cured polymeric material. In certain embodiments, the methods disclosed herein use high temperature lithography to produce a device consisting essentially of the cured polymeric material. "High temperature lithography," as used herein, may refer to any lithography-based photopolymerization processes that involve heating photopolymerizable material(s) (e.g., curable crystallizable resins disclosed herein). The heating may lower the viscosity of the photopolymerizable material(s) before and/or during curing. Non-limiting examples of high-temperature lithography processes include those processes described in WO 2015/075094, WO 2016/078838 and WO 2018/032022. In some implementations, high-temperature lithography may involve applying heat to material to temperatures between 50° C.-120° C., such as 90° C.-120° C., 100° C.-120° C., 105° C.-115° C., 108° C.-110° C., etc. The material may be heated to temperatures greater than 120° C. It is noted other ranges may be used without departing from the scope and substance of the inventive concepts described herein.

In some embodiments, the methods disclosed herein further comprise the step of triggering polymer crystal growth. In some embodiments, the methods disclosed herein further comprise the step of growing polymer crystals. As described further herein, polymer crystals comprise the crystallizable polymeric material. In some embodiments, the methods disclosed herein comprise the step of triggering the formation of at least one polymer crystal comprising the crystallizable polymeric material. In certain embodiments, the triggering comprises cooling the cured material, adding seeding particles to the resin, providing a force to the cured material, providing an electrical charge to the resin, or any combination thereof.

In some embodiments, the triggering step comprises the addition of a seeding particle (also referred to herein as a "seed"), which can help to induce crystallization. In some embodiments, the seeding particle can be added to the resin before the curing step. In some embodiments, the seeding particle can be added to the cured polymeric material (i.e., after the curing step). In some embodiments, the seeding particle can be added during the curing process (e.g., can be added during 3D printing, either prior to, during, or following the exposure to light). In some embodiments, the triggering step comprises reducing the temperature of the cured polymeric material. In certain embodiments, the reduction of temperature can include cooling the cured polymeric material to a temperature from 40° C. to 30° C., from 30° C. to 20° C., from 20° C. to 10° C., from 10° C. to 0° C., from 0° C. to −10° C., from −10° C. to −20° C., from −20° C. to −30° C., or below −30° C. In some embodiments, the triggering step can comprise an increase in temperature. In certain embodiments, the increase of temperature can include heating the cured polymeric material to a temperature from 20° C. to 40° C., from 40° C. to 60° C., from 60° C. to 80° C., from 80° C. to 100° C., or above 100° C. In some embodiments, the triggering step comprises a force placed on the cured polymeric material. In certain embodiments, the force includes squeezing, compacting, pulling, twisting, and/or providing any other physical force to the cured polymeric material. In some embodiments, the triggering step comprises exposing the cured polymeric material to an electrical charge and/or electrical field. In some embodiments, the triggering step comprises applying an electrical charge and/or electrical field to the cured polymeric material. In some embodiments, the methods disclosed herein comprise more than one triggering step. In certain embodiments, the method disclosed herein comprises a plurality of triggering steps, at least two of which are different (e.g., a first triggering step comprising a reduction of temperature, and a second triggering step comprising application of a physical force).

In another embodiment, the methods disclosed herein comprise a continuous direct fabrication step. The continuous direct fabrication step can involve extruding a material composed of a curable liquid material (e.g., the crystallizable resin) surrounding a solid strand. The liquid material can be extruded along a continuous three-dimensional path in order to form an object or device. Such methods are described in U.S. Patent Publication No. 2014/0061974, the disclosure of which is incorporated herein by reference in its entirety.

Devices Using Cured Polymeric Materials

In some embodiments, the present disclosure provides devices comprising the cured polymeric materials generated from the crystallizable resins as described further herein. In some embodiments, the cured polymeric material is used to create a device intended to be placed in the intraoral cavity of a human. Such devices can be, for example, aligners that help to move teeth to new positions. In some embodiments, the devices can be retainers that help to keep teeth from moving to a new position. In some embodiments, the device can be used to expand the palate, move the location of the jaw, or prevent snoring of a human.

In some embodiments, the present disclosure provides methods for producing the devices described herein, said devices comprising a cured polymeric material. In some embodiments, the method comprises a step of shaping a crystallizable resin into a desirable shape prior to a step of curing the crystallizable resin, thereby generating the cured polymeric material having said desirable shape. In some embodiments, the method comprises a step of shaping a crystallizable resin into a desirable shape during a step of curing the crystallizable resin, thereby generating the cured polymeric material having said desirable shape. In some embodiments, the method comprises a step of curing the crystallizable resin, thereby forming the cured polymeric material, then shaping the cured polymeric material into a desirable shape. In some embodiments, the desirable shape is an orthodontic appliance. In some embodiments, the desirable shape is a device and/or object as disclosed herein. In some embodiments, the shaping step comprises extrusion, production of a sheet, production of a film, melt spinning, coating, injection molding, compression and transfer molding, blow molding, rotational blow molding, thermoforming, casting, or a combination thereof.

Exemplary embodiments of devices that can be cured using the materials disclosed herein include dental appliances for use in humans. In some embodiments, such devices can be used as treatment systems for providing an orthodontic treatment.

In certain aspects, the present disclosure provides a method of making an orthodontic appliance comprising a polymeric material comprising polymer crystals, the method comprising providing a curable resin as further described herein; and fabricating the polymeric material by a direct or additive fabrication process. The resin may be exposed to light in said direct or additive fabrication process. The process may further comprise an additional curing step following fabrication of the polymeric material.

In certain aspects, the present disclosure provides an orthodontic appliance comprising a polymeric material comprising polymer crystals as further described herein. The orthodontic appliance may be an aligner, expander or spacer. In some embodiments, the orthodontic appliance comprises a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration, optionally according to a treatment plan. Treatment plans and tracking of tooth movements have been previously described, such as in US Pub. Nos.: US 2008/0306724 and US 2017/0007365, which are incorporated herein by reference in their entireties. As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

The curable resins and cured polymeric materials according to the present disclosure exhibit favorable thermomechanical properties for use as orthodontic appliances, for example, for moving one or more teeth.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. In some cases, the reinforced composites can comprise a polymer matrix reinforced with ceramic or metallic particles, for example. The appliance can be shaped in many ways, such as with thermoforming or direct fabrication as described herein, for example. Alternatively or in combination, the appliance can be fabricated with machining such as an appliance fabricated from a block of material with computer numeric control machining Preferably, the appliance is fabricated using a curable resin according to the present disclosure.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw, and comprises the cured polymeric material disclosed herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance are repositioned by the appliance while other teeth can provide a base or anchor region for holding the appliance in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309, 215 and 6,830,450.

Figure 1B:
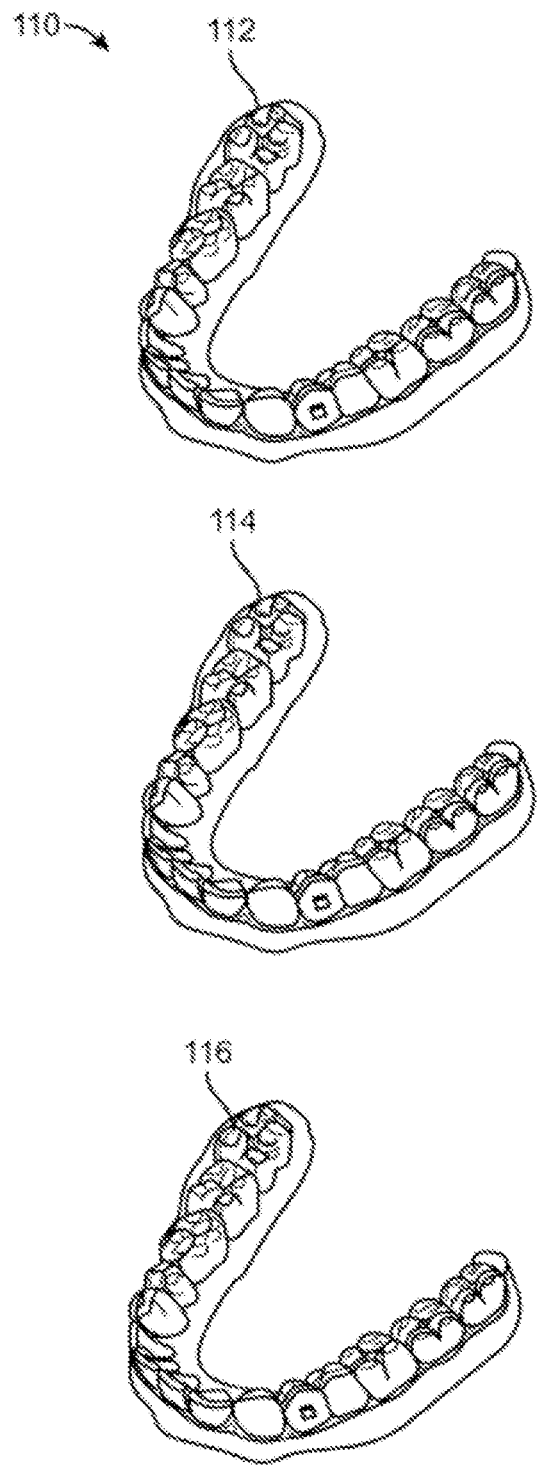
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
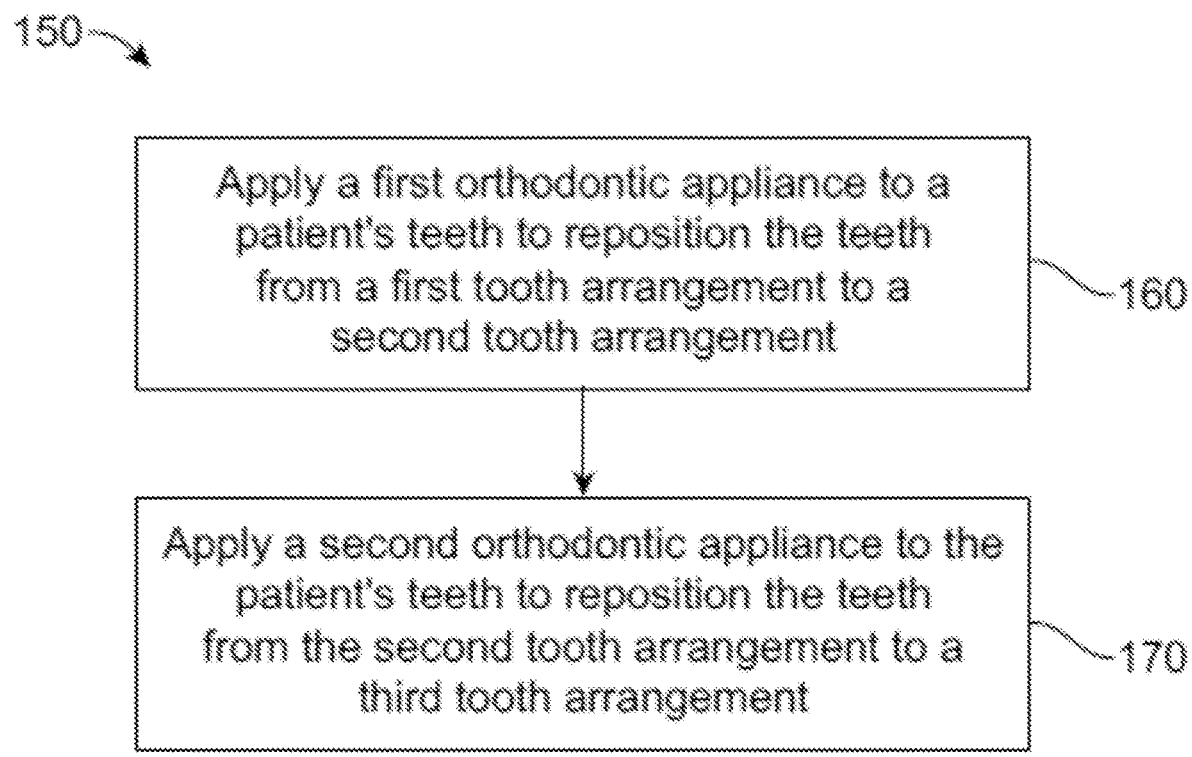
FIG. 1C illustrates a method of orthodontic treatment using a plurality of appliances, in accordance with embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

Machine parameters can include curing parameters. For digital light processing (DLP)-based curing systems, curing parameters can include power, curing time, wavelength (color), and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm, or greater than 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
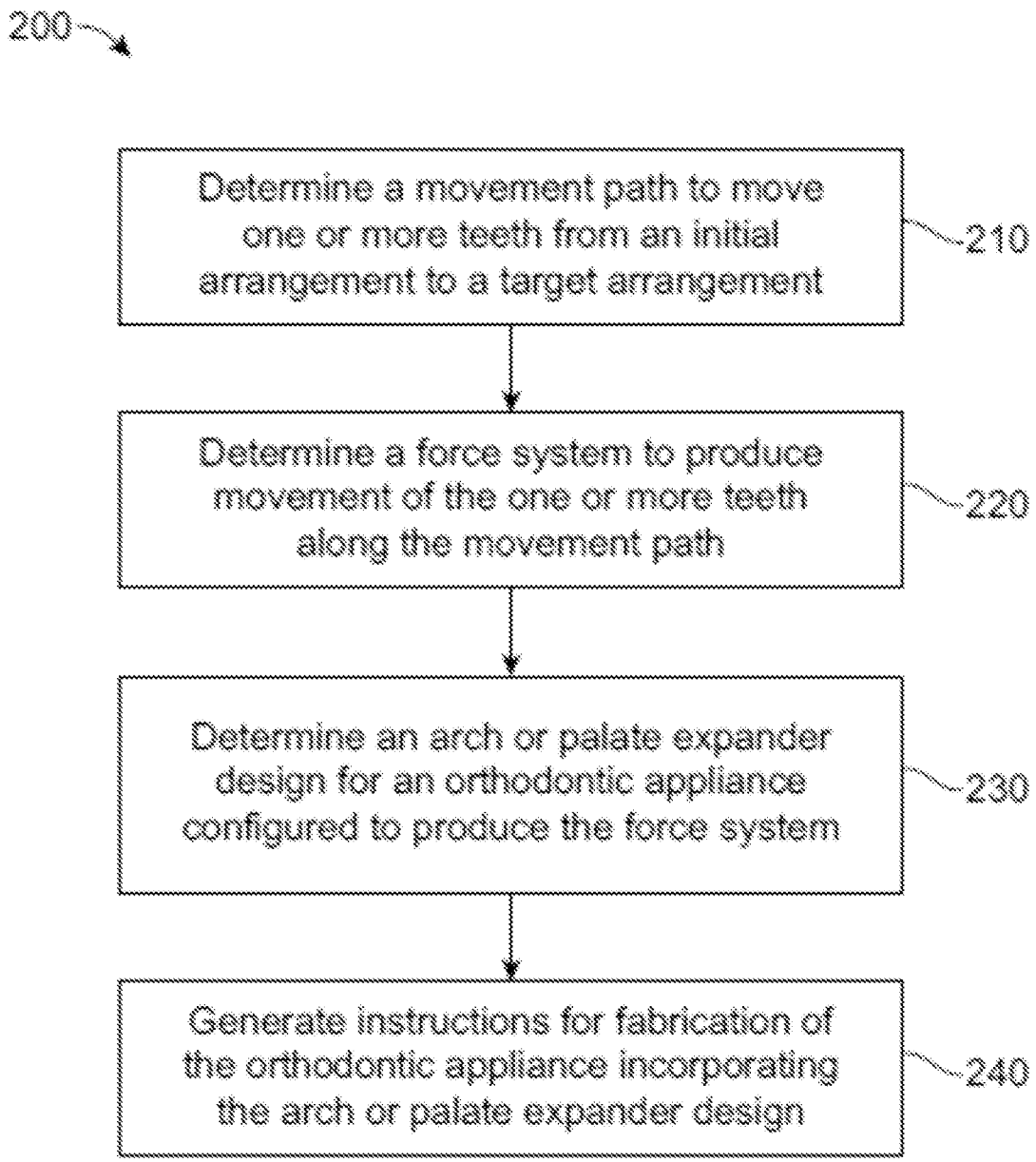
FIG. 2 illustrates a method for designing an orthodontic appliance, in accordance with embodiments.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA(Abaqus) software products from Dassault Systémes of Waltham, Mass.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three-dimensional data of the palate and upper arch; 2) The three dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
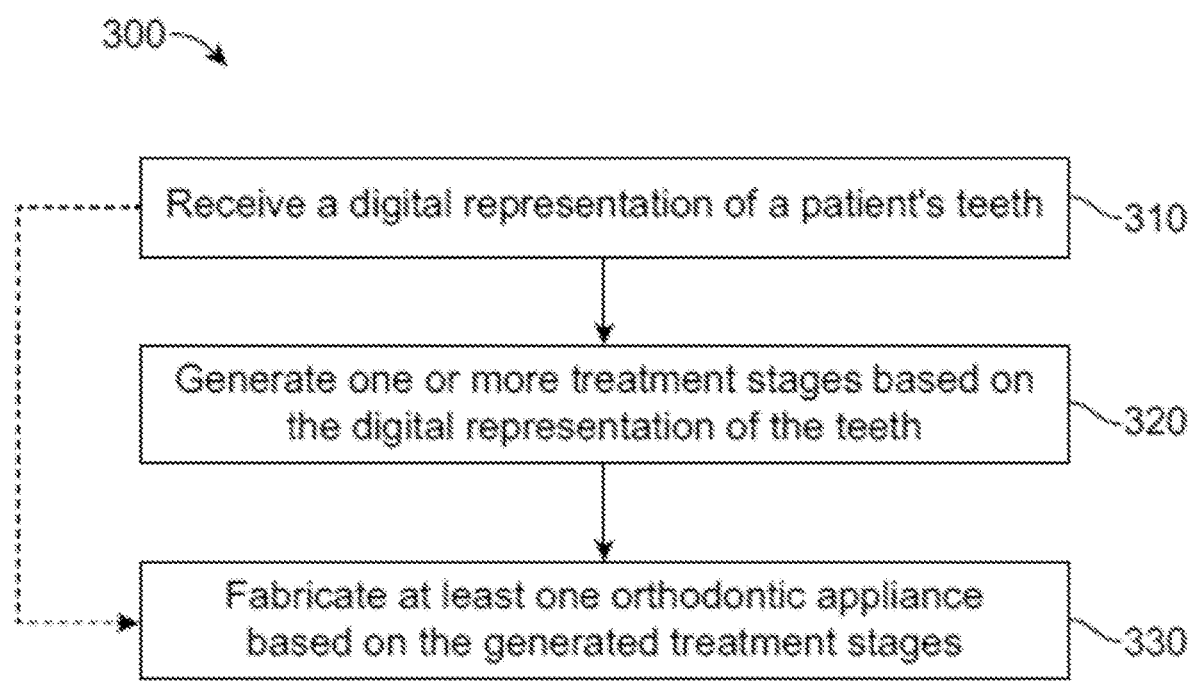
FIG. 3 illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

On-Track Treatment

Figure 4:
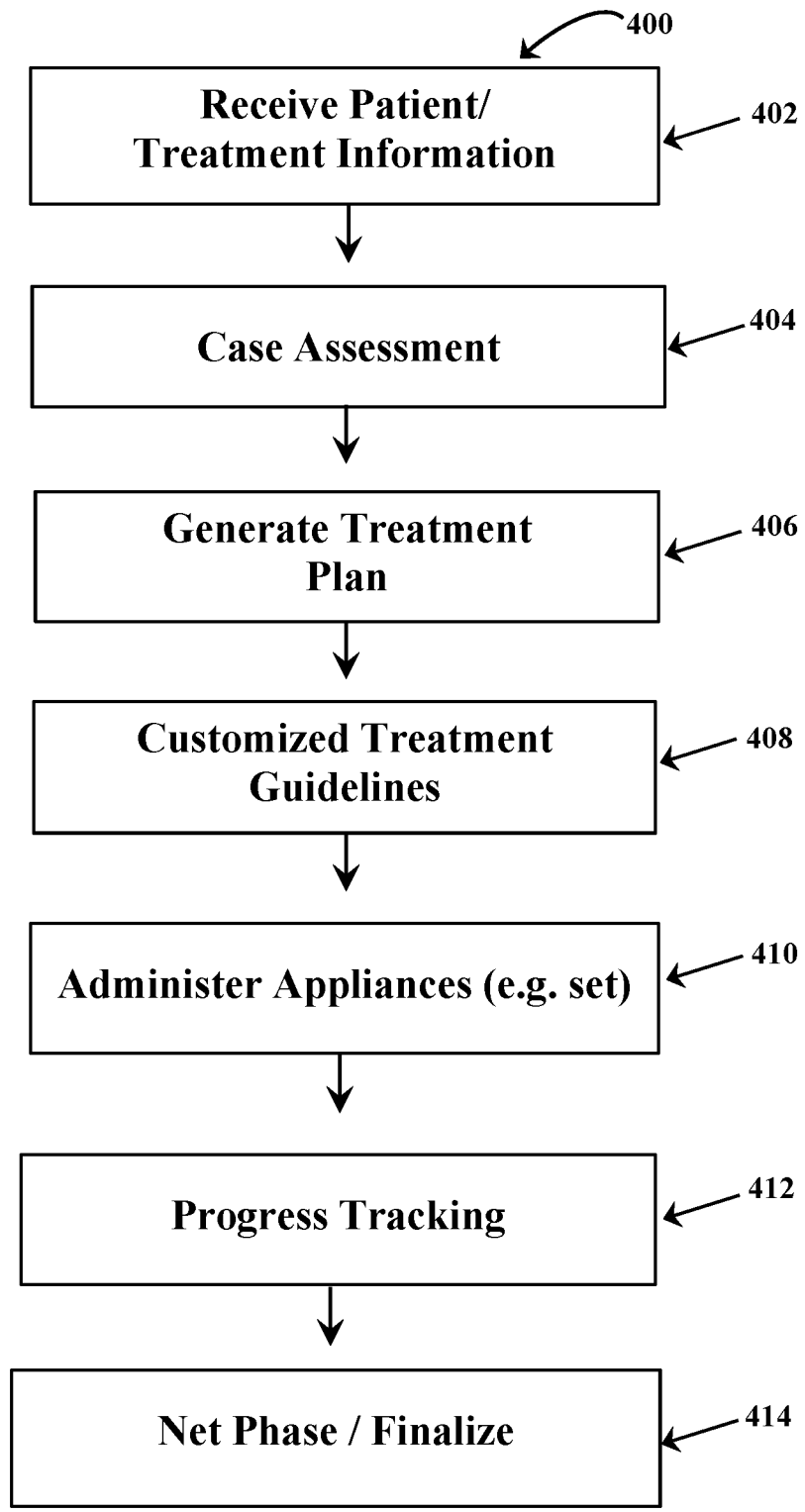
FIG. 4 shows generating and administering treatment according to an embodiment of the present invention.

Referring to FIG. 4, a process 400 according to the present invention is illustrated. Individual aspects of the process are discussed in further detail below. The process includes receiving information regarding the orthodontic condition of the patient and/or treatment information (402), generating an assessment of the case (404), and generating a treatment plan for repositioning a patient's teeth (406). Briefly, a patient/treatment information includes data comprising an initial arrangement of the patient's teeth, which includes obtaining an impression or scan of the patient's teeth prior to the onset of treatment and can further include identification of one or more treatment goals selected by the practitioner and/or patient. A case assessment can be generated (404) so as to assess the complexity or difficulty of moving the particular patient's teeth in general or specifically corresponding to identified treatment goals, and may further include practitioner experience and/or comfort level in administering the desired orthodontic treatment. In some cases, however, the assessment can include simply identifying particular treatment options (e.g., appointment planning, progress tracking, etc.) that are of interest to the patient and/or practitioner. The information and/or corresponding treatment plan includes identifying a final or target arrangement of the patient's teeth that is desired, as well as a plurality of planned successive or intermediary tooth arrangements for moving the teeth along a treatment path from the initial arrangement toward the selected final or target arrangement.

The process further includes generating customized treatment guidelines (408). The treatment plan may include multiple phases of treatment, with a customized set of treatment guidelines generated that correspond to a phase of the treatment plan. The guidelines can include detailed information on timing and/or content (e.g., specific tasks) to be completed during a given phase of treatment, and can be of sufficient detail to guide a practitioner, including a less experienced practitioner or practitioner relatively new to the particular orthodontic treatment process, through the phase of treatment. Since the guidelines are designed to specifically correspond to the treatment plan and provide guidelines on activities specifically identified in the treatment information and/or generated treatment plan, the guidelines are said to be customized. The customized treatment guidelines are then provided to the practitioner so as to help instruct the practitioner as how to deliver a given phase of treatment. As set forth above, appliances can be generated based on the planned arrangements and can be provided to the practitioner and ultimately administered to the patient (410). The appliances can be provided and/or administered in sets or batches of appliances, such as 2, 3, 4, 5, 6, 7, 8, 9, or more appliances, but are not limited to any particular administrative scheme. Appliances can be provided to the practitioner concurrently with a given set of guidelines, or appliances and guidelines can be provided separately.

After the treatment according to the plan begins and following administration of appliances to the patient, treatment progress tracking, e.g., by teeth matching, is done to assess a current and actual arrangement of the patient's teeth compared to a planned arrangement (412). If the patient's teeth are determined to be "on-track" and progressing according to the treatment plan, then treatment progresses as planned and treatment progresses to the next stage of treatment (414). If the patient's teeth have substantially reached the initially planned final arrangement, then treatment progresses to the final stages of treatment (414). Where the patient's teeth are determined to be tracking according to the treatment plan, but have not yet reached the final arrangement, the next set of appliances can be administered to the patient.

The threshold difference values of a planned position of teeth to actual positions selected as indicating that a patient's teeth have progressed on-track are provided below in Table 1. If a patient's teeth have progressed at or within the threshold values, the progress is considered to be on-track. If a patient's teeth have progressed beyond the threshold values, the progress is considered to be off-track.

TABLE 1

| Type Movement | Difference Actual/Planned |
|---|---|
| Rotations | |
| Upper Central Incisors | 9 degrees |
| Upper Lateral Incisors | 11 degrees |
| Lower Incisors | 11 degrees |
| Upper Cuspids | 11 degrees |
| Lower Cuspids | 9.25 degrees |
| Upper Bicuspids | 7.25 degrees |
| Lower First Bicuspid | 7.25 degrees |
| Lower Second Bicuspid | 7.25 degrees |
| Molars | 6 degrees |
| Extrusion | |
| Anterior | 0.75 mm |
| Posterior | 0.75 mm |
| Intrusion | |
| Anterior | 0.75 mm |
| Posterior | 0.75 mm |
| Angulation | |
| Anterior | 5.5 degrees |
| Posterior | 3.7 degrees |
| Inclination | |
| Anterior | 5.5 degrees |
| Posterior | 3.7 degrees |
| Translation | |
| BL Anterior | 0.7 mm |
| BL Posterior Cuspids | 0.9 mm |
| MD Anterior | 0.45 mm |
| MD Cuspids | 0.45 mm |
| MD Posterior | 0.5 mm |

The patient's teeth are determined to be on track by comparison of the teeth in their current positions with teeth in their expected or planned positions, and by confirming the teeth are within the parameter variance disclosed in Table 1. If the patient's teeth are determined to be on track, then treatment can progress according to the existing or original treatment plan. For example, a patient determined to be progressing on track can be administered one or more subsequent appliances according to the treatment plan, such as the next set of appliances. Treatment can progress to the final stages and/or can reach a point in the treatment plan where bite matching is repeated for a determination of whether a patient's teeth are progressing as planned or if the teeth are off track.

In some embodiments, as further disclosed herein, this disclosure provides methods of treating a patient using a 3D printed orthodontic appliance. As a non-limiting example, orthodontic appliances comprising crystalline domains, polymer crystals, and/or materials that can form crystalline domains or polymer crystals can be 3D printed and used to reposition a patient's teeth. In certain embodiments, the method of repositioning a patient's teeth (or, in some embodiments, a singular tooth) comprises: generating a treatment plan for the patient, the plan comprising a plurality of intermediate tooth arrangements for moving teeth along a treatment path from an initial arrangement toward a final arrangement; producing a 3D printed orthodontic appliance; and moving on-track, with the orthodontic appliance, at least one of the patient's teeth toward an intermediate arrangement or a final tooth arrangement. In some embodiments, producing the 3D printed orthodontic appliance uses the crystallizable resins disclosed further herein. On-track performance can be determined, e.g., from Table 1, above.

In some embodiments, the method further comprises tracking the progression of the patient's teeth along the treatment path after administration of the orthodontic appliance. In certain embodiments, the tracking comprises comparing a current arrangement of the patient's teeth to a planned arrangement of the teeth. As a non-limiting example, following the initial administration of the orthodontic appliance, a period of time passes (e.g., two weeks), a comparison of the now-current arrangement of the patient's teeth (i.e., at two weeks of treatment) can be compared with the teeth arrangement of the treatment plan. In some embodiments, the progression can also be tracked by comparing the current arrangement of the patient's teeth with the initial configuration of the patient's teeth. The period of time can be, for example, greater than 3 days, greater than 4 days, greater than 5 days, greater than 6 days, greater than 7 days, greater than 8 days, greater than 9 days, greater than 10 days, greater than 11 days, greater than 12 days, greater than 13 days, greater than 2 weeks, greater than 3 weeks, greater than 4 weeks, or greater than 2 months. In some embodiments, the period of time can be from at least 3 days to at most 4 weeks, from at least 3 days to at most 3 weeks, from at least 3 days to at most 2 weeks, from at least 4 days to at most 4 weeks, from at least 4 days to at most 3 weeks, or from at least 4 days to at most 2 weeks. In certain embodiments, the period of time can restart following the administration of a new orthodontic appliance.

In some embodiments, greater than 50%, greater than 55%, greater than 60%, greater than 65%, greater than 70%, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the patient's teeth are on track with the treatment plan after a period of time of using an orthodontic appliance as disclosed further herein. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

As disclosed further herein, orthodontic appliances disclosed herein have advantageous properties, such as increased durability, and an ability to retain resilient forces to a patient's teeth for a prolonged period of time. In some embodiments of the method disclosed above, the 3D printed orthodontic appliance has a retained repositioning force (i.e., the repositioning force after the orthodontic appliance has been applied to or worn by the patient over a period of time), and the retained repositioning force to at least one of the patient's teeth after the period of time is at least 10%, at least 20%, at least 30%, at least 40%, at least 50%, at least 55%, at least 60%, at least 65%, at least 70%, at least 75%, at least 80%, at least 85%, at least 90%, at least 95%, at least 96%, at least 97%, at least 98%, or at least 99% of the repositioning force initially provided to the at least one of the patient's teeth (i.e., with initial application of the orthodontic appliance). In some embodiments, the period of time is 1 day, 2 days, 3 days, 4 days, 5 days, 6 days, 7 days, 8 days, 9 days, 10 days, 11 days, 12 days, 13 days, 2 weeks, 3 weeks, 4 weeks, or greater than 4 weeks. In some embodiments, the repositioning force applied to at least one of the patient's teeth is present for a time period of less than 24 hours, from about 24 hours to about 2 months, from about 24 hours to about 1 month, from about 24 hours to about 3 weeks, from about 24 hours to about 14 days, from about 24 hours to about 7 days, from about 24 hours to about 3 days, from about 3 days to about 2 months, from about 3 days to about 1 month, from about 3 days to about 3 weeks, from about 3 days to about 14 days, from about 3 days to about 7 days, from about 7 days to about 2 months, from about 7 days to about 1 month, from about 7 days to about 3 weeks, from about 7 days to about 2 weeks, or greater than 2 months. In some embodiments, the repositioning force applied to at least one of the patient's teeth is present for about 24 hours, for about 3 days, for about 7 days, for about 14 days, for about 2 months, or for more than 2 months.

In preferred embodiments, the orthodontic appliances disclosed herein can provide on-track movement of at least one of the patient's teeth. On-track movement has been described further herein, e.g., at Table 1. In some embodiments, the orthodontic appliances disclosed herein can be used to achieve on-track movement of at least one of the patient's teeth to an intermediate tooth arrangement. In some embodiments, the orthodontic appliances disclosed herein can be used to achieve on-track movement of at least one of the patient's teeth to a final tooth arrangement.

In some embodiments, prior to moving, with the orthodontic appliance, at least one of the patient's teeth toward an intermediate arrangement or a final tooth arrangement, the orthodontic appliance has characteristics which are retained following the use of the orthodontic appliance. In some embodiments, prior to the moving step, the orthodontic appliance comprises a first flexural modulus. In certain embodiments, after the moving step, the orthodontic appliance comprises a second flexural modulus. In some embodiments, the second flexural modulus is at least 99%, at least 98%, at least 97%, at least 96%, at least 95%, at least 94%, at least 93%, at least 92%, at least 91%, at least 90%, at least 85%, at least 80%, at least 75%, at least 70%, at least 65%, at least 60%, at least 50%, or at least 40% of the first flexural modulus. In preferred embodiments, the second flexural modulus is greater than 50% of the first flexural modulus. In some embodiments, this comparison is performed following a period of time in which the appliance is applied. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

In some embodiments, prior to the moving step, the orthodontic appliance comprises a first elongation at break. In certain embodiments, after the moving step, the orthodontic appliance comprises a second elongation at break. In some embodiments, the second elongation at break is at least 99%, at least 98%, at least 97%, at least 96%, at least 95%, at least 94%, at least 93%, at least 92%, at least 91%, at least 90%, at least 85%, at least 80%, at least 75%, at least 70%, at least 65%, at least 60%, at least 50%, or at least 40% of the first elongation at break. In preferred embodiments, the second elongation at break is greater than 50% of the first elongation at break. In some embodiments, this comparison is performed following a period of time in which the appliance is applied. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

As provided herein, the methods disclosed can use the orthodontic appliances further disclosed herein. Said orthodontic appliances can be directly fabricated using, e.g., the crystallizable resins disclosed herein. In certain embodiments, the direct fabrication comprises cross-linking the crystallizable resin.

The appliances formed from the crystallizable resins disclosed herein provide improved durability, strength, and flexibility, which in turn improve the rate of on-track progression in treatment plans. In some embodiments, greater than 60%, greater than 70%, greater than 80%, greater than 90%, or greater than 95% of patients treated with the orthodontic appliances disclosed herein (e.g., an aligner) are classified as on track in a given treatment stage. In certain embodiments, greater than 60%, greater than 70%, greater than 80%, greater than 90%, or greater than 95% of patients treated with the orthodontic appliances disclosed herein (e.g., an aligner) have greater than 50%, greater than 55%, greater than 60%, greater than 65%, greater than 70%, greater than 75%, greater than 80%, greater than 85%, greater than 90%, or greater than 95% of their tooth movements classified as on-track.

As disclosed further herein, the cured polymeric material contains favorable characteristics that, at least in part, stem from the presence of polymeric crystals. These cured polymeric materials can have increased resilience to damage, can be tough, and can have decreased water uptake when compared to similar polymeric materials. The cured polymeric materials can be used for devices within the field of orthodontics, as well as outside the field of orthodontics. For example, the cured polymeric materials disclosed herein can be used to make devices for use in aerospace applications, automobile manufacturing, the manufacture of prototypes, and/or devices for use in durable parts production.

EXAMPLES

The specific compositions, synthesis, formulations, and descriptions of any of the materials, devices, systems, and components thereof, of the present disclosure can be readily varied depending upon the intended application, as will be apparent to those of skill in the art in view of the disclosure herein. Moreover, it is understood that the examples and aspects described herein are for illustrative purposes only and that various modifications or changes in light thereof can be suggested to persons skilled in the art and are included within the spirit and purview of this application and scope of the appended claims. Numerous different combinations of aspects described herein are possible, and such combinations are considered part of the present disclosure. In addition, all features discussed in connection with any one aspect herein can be readily adapted for use in other aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

Example 1

Synthesis of a Crystallizable Polymeric Material

This example describes the synthesis of a crystallizable polymeric material. As shown below in Scheme 1, this example discloses the synthesis of polycaprolactone diacrylate (1), which is a crystallizable polymeric material.

Scheme 1

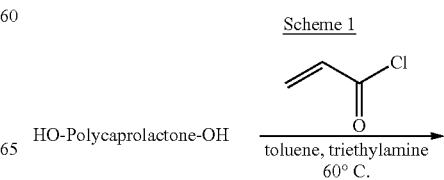

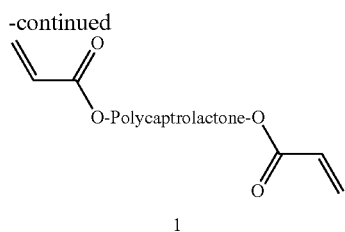

Polycaprolactone diol (60 g, 6.0 mmol, avg. Mn 10,000) was placed in a two-liter reaction vessel equipped with a mechanical stirrer. Into the vessel was added toluene (600 mL) and triethylamine (2.5 mL, 18 mmol). The mixture was placed under inert atmosphere (argon), and was heated to 60° C. and stirred until homogenous (30 minutes). Acryoyl chloride (1.2 mL, 15 mmol) was slowly added, and a white solid began to form. The mixture was stirred for 1 hour, then cooled to ambient temperature. Ethyl acetate (750 mL) was added to the mixture, and the mixture was transferred to a 4 liter separatory funnel. Aqueous citric acid (0.5 M, 500 mL) was added and the mixture was shaken. The resulting emulsion was cleared with the addition of saturated aqueous sodium chloride (100 mL). The organic layer was isolated, then washed with saturated aqueous sodium bicarbonate (750 mL), then washed with saturated aqueous sodium chloride (500 mL). The organic layer was then dried over anhydrous sodium sulfate. The mixture was filtered to remove sodium sulfate. Butylated hydroxytoluene (520 mg, 0.9% wt/wt product) was added to the mixture, and most of the solvent was removed under reduced pressure. The mixture was transferred to a 500 mL amber glass jar, and dried under high vacuum for 2 hours at 45° C. The white solid was dried under high vacuum until a constant weight was obtained, affording 56 g of polycaprolactone diacrylate (1).

The obtained polycaprolactone diacrylate (1) has a melting temperature around 60° C., and has a low viscosity when melted. This compound was used in the formulation of curable crystallizable resins.

Example 2

Preparation and Curing of a Crystallizable Resin Comprising a Crystallizable Polymeric Material This example describes the preparation of a crystallizable resin using the crystallizable polymeric material (1) synthesized in Example 1. This example also describes the curing of the resin to obtain a cured polymeric material, and discloses properties of the cured polymeric material.

Into a flask was added a mixture consisting of: 99 wt % polycaprolactone diacrylate (1), having an average molecular weight of approximately 10,000; and 1 wt % ethyl (2,4,6-trimethylbenzoyl) phenylphosphinate (TPO-L). The mixture was heated to 80° C. and stirred for 10 minutes, until homogenous, thus forming a curable crystallizable resin. The homogenous mixture was then placed between two glass sides, spaced 800 µm apart, and cured at 80° C. in a Dymax light chamber (with a broadband UV-Vis light source) for 3 minutes. The resulting cured polymeric material was cooled to room temperature.

Initially, the material appeared to the human eye to be clear with a slight haze. Over a period of 15 minutes, the level of observed haze increased, and the cured polymeric material became somewhat opaque. The increasing level of haziness corresponded with the increased level of crystallization, as the polycaprolactone chains crystallized, forming crystals that grew over time. As the crystallization level increased, the cured polymeric material transitioned from a rubbery material to a stiff one. The resulting cured polymeric material, once crystal growth had ended (i.e., is ready for an intended use), had a storage modulus of 450 MPa and an elongation to break of 330%. The resulting cured polymeric material is a tough material that is crosslinked, and does not flow when heated, though the crystalline domains can be melted and reformed. The resin is of low enough viscosity to use in various 3D printers that can be heated to greater than 60° C.

Example 3

Preparation and Curing of a Crystallizable Resin Comprising an Amorphous Polymeric Material This example describes the preparation of a crystallizable resin using the crystallizable polymeric material (1) synthesized in Example 1, and comprises an amorphous polymeric material (tricyclodecanediol dimethacrylate). This example also describes the curing of the resin to obtain a cured polymeric material, and discloses properties of the cured polymeric material.

Into a flask was added a mixture consisting of: 79 wt % polycaprolactone diacrylate (1), having an average molecular weight of approximately 10,000; 20 wt % tricyclodecanediol dimethacrylate; and 1 wt % TPO-L. The mixture was heated to 100° C. and stirred for 10 minutes, until homogenous, thus forming a curable crystallizable resin. The resin can be cooled to below 60° C. (e.g., 40° C.) and still not form crystals in an at least 30-minute period. The homogenous mixture was then placed between two glass sides, spaced 800 µm apart, and cured at 90° C. in a Dymax light chamber (with a broadband UV-Vis light source) for 3 minutes. The resulting cured polymeric material was cooled to room temperature.

Initially, the material appeared to the human eye to be clear with a slight haze. Over a period of 15 minutes, the level of observed haze increased, and the cured polymeric material became somewhat opaque. The increasing level of haziness corresponded with the increased level of crystallization, as the polycaprolactone chains crystallized, forming crystals that grew over time. As the crystallization level increased, the cured polymeric material transitioned from a rubbery material to a stiff one. The resulting cured polymeric material, once crystal growth had ended, had a storage modulus of 550 MPa and an elongation to break of 150%. Stress relaxation tests were performed in water for 48 hours at 38° C., and 33% remaining stress was measured. Water uptake of the sample was less than 0.5% by weight (i.e., less than a 0.5% increase of weight prior to the water test). The resulting cured polymeric material is a tough material that is crosslinked and does not flow when heated to, e.g., 180° C. or greater. It is a rubbery material above 60° C. and a stiff material below 60° C. after crystallization has occurred. The viscosity is low enough to use in various 3D printers that can be heated to greater than 50° C.

Example 4

Preparation and Curing of a Crystallizable Resin Comprising a Filler

This example describes the preparation of a crystallizable resin using the crystallizable polymeric material (1) synthesized in Example 1, and comprises an amorphous polymeric material (tricyclodecanediol dimethacrylate) as well as a filler (strontium glass particles). This example also describes the curing of the resin to obtain a cured polymeric material, and discloses properties of the cured polymeric material.

Into a flask was added a mixture consisting of: 68 wt % polycaprolactone diacrylate (1), having an average molecular weight of approximately 10,000; 18 wt % strontium glass particles, having an average diameter of 20 μm; 13 wt % tricyclodecanediol dimethacrylate; and 1 wt % TPO-L. The mixture was heated to 80° C. and was stirred for 10 minutes, until homogenous, forming a curable crystallizable resin. The homogenous mixture was then placed between two glass sides, spaced 800 μm apart, and cured at 80° C. in a Dymax light chamber (with a broadband UV-Vis light source) for 3 minutes. The resulting cured polymeric material was cooled to room temperature.

The resulting cured polymeric material was white and opaque, having a storage modulus of 650 MPa and an elongation to break of 100%. The resulting cured polymeric material from Formulation 3 is a tough material that is crosslinked and does not flow when heated.

Example 5

Preparation of Block Copolymer Crystallizable Material

An ABA block copolymer was constructed with "A" block composed of Polycaprolactone (Mn 3000) and with "B" block composed of Poly(hexane terephthalate) (Mn 6000). The hydroxyl end groups were acrylated using acryloyl chloride and triethyl amine. The ABA block copolymer product was dissolved in dichloromethane, salts were filtered off, and precipitated in methanol. The resultant ABA Block copolymer diacrylate had two melting points, one associated with the polycaprolactone around 65° C., and one associated with the polyterephthalate around 135° C. Once the material was fully melted, it would remain in a liquid state down to 90° C. for at least an hour. To the melted block copolymer product, 1 wt % TPO was mixed in, and the mixture was cured using a Semray 395 nm LED light source at full power. Resulting samples were 1 mm thick and were slightly hazy materials when at room temperature, and had a rubbery feel. Upon sitting for 1 week, the material increased its haziness and stiffness. The final cured material had tan delta peaks at 60° C. and 100° C.

Example 6

Treatment Using an Orthodontic Appliance

This example describes the use of a directly 3D printed orthodontic appliance to move a patient's teeth according to a treatment plan. This example also describes the characteristics that the orthodontic appliance can have following its use, in contrast to its characteristics prior to use.

A patient in need of, or desirous of, a therapeutic treatment to rearrange at least one tooth has their teeth arrangement assessed. An orthodontic treatment plan is generated for the patient. The orthodontic treatment plan comprises a plurality of intermediate tooth arrangements for moving teeth along a treatment path, from the initial arrangement (e.g., that which was initially assessed) toward a final arrangement. The treatment plan includes the use of an orthodontic appliance, fabricated using the crystallizable resins and methods disclosed further herein, to provide orthodontic appliances having a plurality of polymer crystals. In some embodiments, a plurality of orthodontic appliances are used, each of which can be fabricated using the crystallizable resins and methods disclosed further herein.

The orthodontic appliances are provided, and iteratively applied to the patient's teeth to move the teeth through each of the intermediate tooth arrangements toward the final arrangement. The patient's tooth movement is tracked. A comparison is made between the patient's actual teeth arrangement and the planned intermediate arrangement. Where the patient's teeth are determined to be tracking according to the treatment plan, but have not yet reached the final arrangement, the next set of appliances can be administered to the patient. The threshold difference values of a planned position of teeth to actual positions selected as indicating that a patient's teeth have progressed on-track are provided above in Table 1. If a patient's teeth have progressed at or within the threshold values, the progress is considered to be on-track. Favorably, the use of the appliances disclosed herein increases the probability of on-track tooth movement.

The assessment and determination of whether treatment is on-track can be conducted, for example, 1 week (7 days) following the initial application of an orthodontic appliance. Following this period of application, additional parameters relating to assessing the durability of the orthodontic appliance can also be conducted. For example, relative repositioning force (compared to that which was initially provided by the appliance), intactness of amorphous polymer chains (e.g., the percent of amorphous polymer chains that are not broken), percent of elongated polymer crystals, relative flexural modulus, and relative elongation at break can be determined.

What is claimed is:

1. A resin comprising:
   a monomer of a crystallizable polymeric material, the crystallizable polymeric material having a melting temperature above 20° C.;
   a monomer of an amorphous polymeric material, the amorphous polymeric material having a glass transition temperature less than 40° C.;
   an initiator: and
   a polymer crystal, said polymer crystal comprising the monomer of the crystallizable polymeric material,
   wherein the resin has a viscosity from 0.5 PaS to 20 PaS at 90° C. and is capable of being 3D printed to form a 3D-printed polymeric material, wherein the 3D-printed polymeric material forms an orthodontic appliance.

2. The resin of claim 1, wherein the amorphous polymeric material has a glass transition temperature less than 30° C., less than 20° C., less than 10° C., or less than 0° C.

3. The resin of claim 1, wherein the crystallizable polymeric material has a melting temperature above 30° C., above 40° C., above 50° C., above 60° C., or above 70° C.

4. The resin of claim 1, wherein the crystallizable polymeric material comprises greater than 40 wt %, greater than 50 wt %, greater than 60 wt %, greater than 70 wt %, greater than 80 wt %, or greater than 90 wt % of linear polymers and/or linear oligomers.

5. The resin of claim 1, wherein at least a portion of the crystallizable polymeric material is a polymer or an oligomer comprising the monomer of the crystallizable polymeric material.

6. The resin of claim 1, wherein at least a portion of the amorphous polymeric material is a polymer or an oligomer comprising the monomer of the amorphous polymeric material.

7. The resin of claim 1, wherein the resin has less than 10% crystalline content at 90° C., as measured by X-ray diffraction.

8. The resin of claim 1, wherein the monomer of the crystallizable material comprises an aromatic polyester.

9. The resin of claim 8, wherein the resin comprises greater than 25% of the aromatic polyester, by weight.

10. The resin of claim 8, wherein the aromatic polyester is selected from the group consisting of a polyethylene terephthalate, a polytrimethylene terepthalate, a polypropylene terephthalate, a polyhexylene terephthalate, a polyethylene naphthalate, a polybutylene naphthalate, a polyhexylene naphthalate, a polycyclohexylenedimethylene terephthalate, a polybutylene terephthalate, any combination thereof, and any derivative thereof.

11. The resin of claim 1, wherein the monomer of the crystallizable polymeric material comprises a naphthalate group.

12. The resin of claim 11, wherein the naphthalate group comprises 6,6'-bis(2-(allyloxy) ethyl) O'2,O2-(((naphthalene-2,6-dicarbonyl)bis(oxy))bis(butane-4,1-diyl)) bis(naphthalene-2,6-dicarboxylate), bis(2-mercaptoethyl) naphthalene-2,6-dicarboxylate, or a combination thereof.

13. The resin of claim 1, wherein the monomer of the crystallizable polymeric material comprises a polycaprolactone.

14. The resin of claim 13, wherein the monomer of the crystallizable material has one of the following structures:

Formula (I)

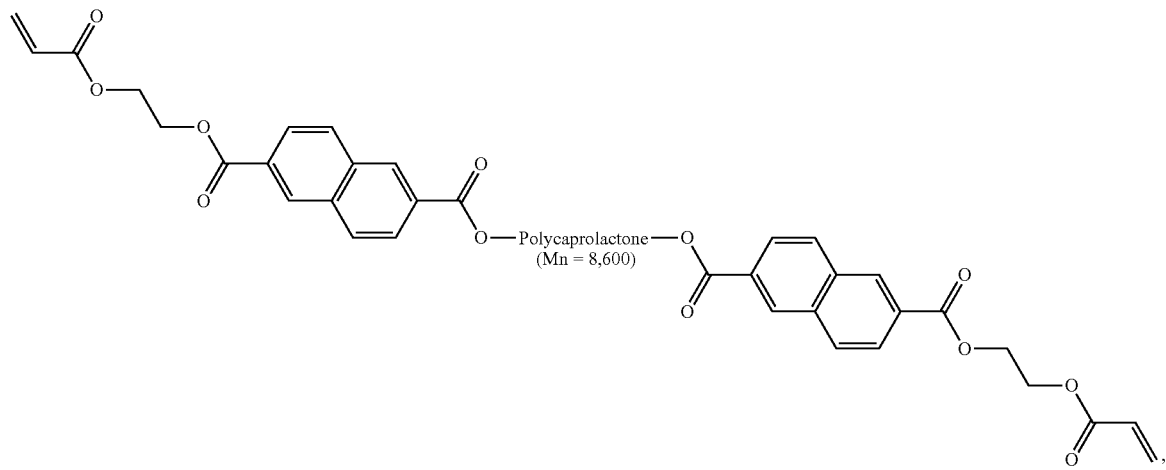

Formula (II)

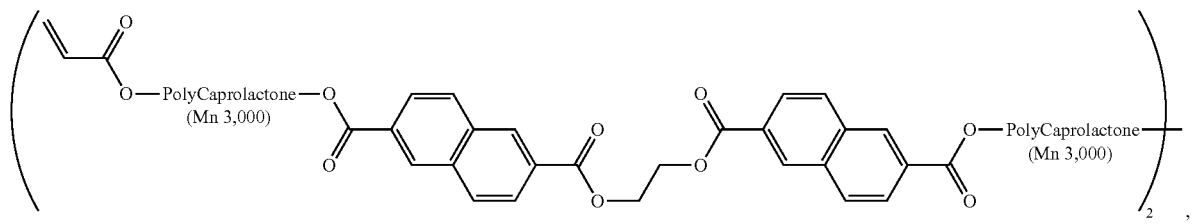

Formula (III)

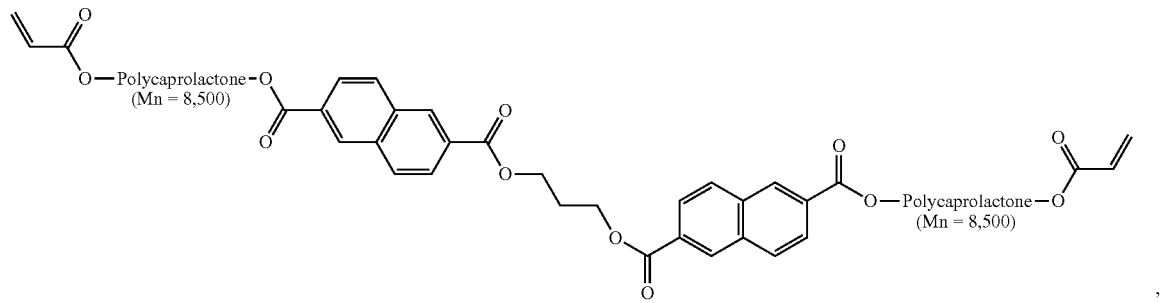

-continued

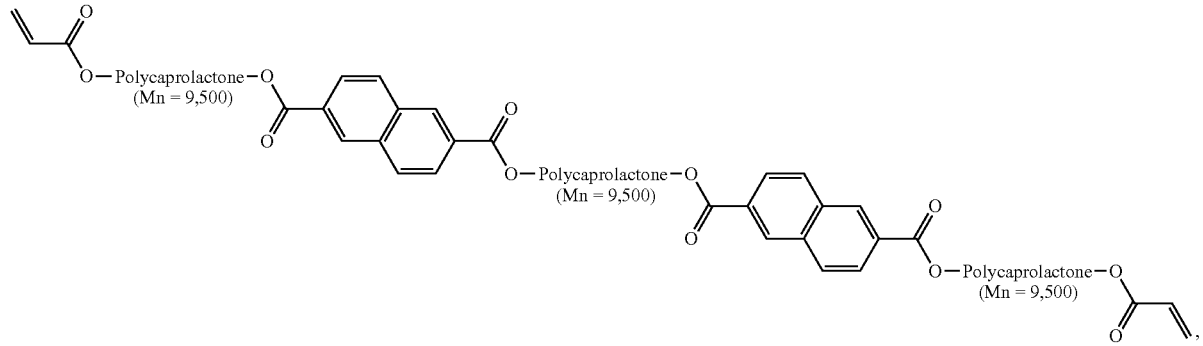

Formula (IV)

a derivative thereof, or a combination thereof.

15. The resin of claim 1, wherein at least 90% of the monomer of the crystallizable polymeric material is in a liquid phase at an elevated temperature.

16. The resin of claim 15, wherein the elevated temperature is between 40° C. and 100° C.

17. The resin of claim 1, further comprising a linking monomer, a modifying polymer, or a combination thereof.

18. The resin of claim 1, wherein the initiator is a photoinitiator.

19. The resin of claim 1, further comprising at least one of a thermal initiator, a polymerization catalyst, an inhibitor, a light blocker, a plasticizer, a solvent, a surface energy modifier, a pigment, a dye, a filler, a crystallization seed, a crystallization catalyst, or a biological agent.

20. The resin of claim 1, wherein at least a portion of the monomer of the crystallizable polymeric material is a liquid at 60° C.

21. A method of forming a cured polymeric material, the method comprising:
providing the resin of claim 1; and
curing the resin with a light source, thereby forming the cured polymeric material.

22. The method of claim 21, further comprising growing at least one polymer crystal in a crystalline domain of the cured polymeric material, the at least one crystal comprising the crystallizable polymeric material.

23. The method of claim 21, further comprising fabricating an orthodontic appliance with the cured polymeric material.

24. The method of claim 23, wherein the fabricating comprises printing with a 3D printer.

25. The method of claim 23, wherein the orthodontic appliance is an aligner, expander or spacer.

26. The method of claim 23, wherein the orthodontic appliance comprises a plurality of tooth receiving cavities configured to reposition teeth from a first configuration toward a second configuration.

27. The method of claim 23, wherein the orthodontic appliance is one of a plurality of orthodontic appliances configured to reposition the teeth from an initial configuration toward a target configuration.

28. The method of claim 23, wherein the orthodontic appliance is one of a plurality of orthodontic appliances configured to reposition the teeth from an initial configuration toward a target configuration according to a treatment plan.

29. The method of claim 23, wherein the orthodontic appliance is an aligner.

30. The method of claim 21, further comprising triggering the formation of at least one polymer crystal, the at least one polymer crystal comprising the crystallizable polymeric material.

31. The method of claim 30, wherein the triggering comprises cooling the cured material, adding seeding particles to the resin, providing a force to the cured material, providing an electrical charge to the resin, or any combination thereof.

32. The method of claim 22, wherein the at least one polymer crystal forms spontaneously.

33. A cured polymeric material formed from the method of claim 21.

34. The resin of claim 8, wherein the aromatic polyester is a polyalkylene naphthalate.

35. A resin comprising:
a monomer of a crystallizable polymeric material, the crystallizable polymeric material having a melting temperature above 20° C.;
a monomer of an amorphous polymeric material, the amorphous polymeric material having a glass transition temperature less than 40° C.;
an initiator; and
a polymer crystal, said polymer crystal comprising the monomer of the crystallizable polymeric material,
wherein the resin has a viscosity from 0.5 PaS to 20 PaS at 90° C. and is capable of being 3D printed to form a 3D-printed polymeric material, wherein the 3D-printed polymeric material forms an orthodontic appliance, wherein the monomer of the crystallizable material comprises an aromatic polyester.

* * * * *